US00RE42156E

(19) United States
(12) Reissued Patent
Hirota et al.

(10) Patent Number: US RE42,156 E
(45) Date of Reissued Patent: Feb. 22, 2011

(54) EXHAUST EMISSION CONTROL SYSTEM OF AN INTERNAL COMBUSTION ENGINE

(75) Inventors: Shinya Hirota, Susono (JP); Toshiaki Tanaka, Numazu (JP); Satoshi Iguchi, Mishima (JP); Shunsuke Toshioka, Susono (JP)

(73) Assignee: Toyota Jidosha Kabushiki Kaisha, Toyota-shi (JP)

(21) Appl. No.: 10/410,386

(22) Filed: Apr. 10, 2003

Related U.S. Patent Documents

Reissue of:
(64) Patent No.: 6,212,885
Issued: Apr. 10, 2001
Appl. No.: 09/300,686
Filed: Apr. 27, 1999

(51) Int. Cl.
*F01N 3/00* (2006.01)

(52) U.S. Cl. ..... 60/288; 60/274; 60/285; 60/287; 60/296; 60/297; 60/324

(58) Field of Classification Search ..... 60/274, 60/276, 277, 285, 286, 287, 288, 296, 297, 60/300, 302, 303, 324
See application file for complete search history.

(56) References Cited

U.S. PATENT DOCUMENTS

| | | | | | |
|---|---|---|---|---|---|
| 2,898,202 | A | * | 8/1959 | Eriksson et al. | 422/115 |
| 2,946,651 | A | * | 7/1960 | Houdry | 423/212 |
| 3,072,457 | A | * | 1/1963 | Bloch | 60/288 |
| 3,867,508 | A | * | 2/1975 | Hass | 423/213.7 |
| 4,875,336 | A | * | 10/1989 | Hayashi et al. | 60/286 |
| 5,123,243 | A | * | 6/1992 | Baddour | 60/274 |
| 5,140,811 | A | * | 8/1992 | Minami et al. | 60/288 |
| 5,233,830 | A | * | 8/1993 | Takeshima et al. | 60/288 |
| 5,305,602 | A | * | 4/1994 | Kojima et al. | 60/286 |
| 5,331,809 | A | * | 7/1994 | Takeshima et al. | 60/288 |
| 5,349,816 | A | * | 9/1994 | Sanbayashi et al. | 60/277 |
| 5,388,406 | A | * | 2/1995 | Takeshima et al. | 60/288 |
| 5,390,492 | A | * | 2/1995 | Levendis | 60/288 |
| 5,398,503 | A | * | 3/1995 | Danno et al. | 60/288 |
| 5,517,820 | A | * | 5/1996 | Kuroda et al. | 60/274 |
| 5,768,888 | A | * | 6/1998 | Matros et al. | 60/274 |
| 6,314,722 | B1 | * | 11/2001 | Matros et al. | 60/274 |
| 6,568,178 | B2 | * | 5/2003 | Hirota et al. | 60/297 |

FOREIGN PATENT DOCUMENTS

| | | |
|---|---|---|
| EP | 0 580 398 A1 | 1/1994 |
| EP | 0 702 134 A2 | 3/1996 |
| JP | A 6-173652 | 6/1994 |
| JP | 6173652 A | 6/1994 |
| JP | A 7-259542 | 10/1995 |
| JP | 7259542 A | 10/1995 |

* cited by examiner

*Primary Examiner*—Tu M Nguyen
(74) *Attorney, Agent, or Firm*—Kenyon & Kenyon LLP

(57) ABSTRACT

An exhaust emission control system of an internal combustion engine desorbs $SO_x$ by reversing a flow of an exhaust gas through an $NO_x$ storage-reduction catalyst, of which a structure is simplified as follows. A first exhaust pipe connected to an engine is connected to a first port of an emission switching valve having four ports. A second exhaust pipe 10, through which the exhaust gas is discharged into the atmospheric air, is connected to a second port, a third exhaust pipe connected to an inlet of a catalytic converter is connected to a third port. A fourth exhaust pipe connected to an outlet of the catalytic converter 30 is connected to a fourth port. When the emission switching valve is set in a forward flow position, the first exhaust pipe is connected to the third exhaust pipe, and the second exhaust pipe is connected to the fourth exhaust pipe, whereby the exhaust gas flows toward the outlet from the inlet within the catalytic converter. When the emission switching valve is set in a backward flow position, the first exhaust pipe is connected to the fourth exhaust pipe, and the second exhaust pipe is connected to the third exhaust pipe, whereby the exhaust gas flows toward the inlet from the outlet within the catalytic converter.

17 Claims, 29 Drawing Sheets

EXHAUST EMISSION CONTROL SYSTEM OF AN INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to an exhaust emission control system of an internal combustion engine and, more particularly, to an exhaust emission control system of an internal combustion engine which is capable of switching over a flow direction of an exhaust gas flowing through an exhaust gas purifying element according to the necessity.

2. Related Background Art

In general, an exhaust emission control system for purifying an exhaust gas discharged from an internal combustion engine is provided at an exhaust passageway of the internal combustion engine. When the exhaust gas from the internal combustion engine flows through this exhaust emission control system, a deposit is gradually adhered from an upstream side in the exhaust emission control system. A classification of what this deposit is all about might differ depending upon a composition of the exhaust gas, or a construction of the exhaust emission control system or an exhaust gas purifying mechanism, and what can be exemplified as the deposit may be, e.g., an oxide, a sulfide, nitrate and sulfate. This deposit might cause a decline of a purging performance of the exhaust emission control system and also an increase in an exhaust resistance, and therefore needs to be removed at a predetermined timing.

For example, the exhaust emission control system for purging the exhaust gas of $NO_x$ which is discharged from the internal combustion engine for performing a combustion at a lean air/fuel ratio, may involve the use of an $NO_x$ storage-reduction catalyst. This $NO_x$ storage-reduction catalyst absorbs $NO_x$ when the air/fuel ratio of the inflow exhaust gas is lean, and desorbs $NO_x$ absorbed thereto when a concentration of oxygen in the inflow exhaust gas decreases, thus effecting reduction to $N_2$. The $NO_x$ storage-reduction catalyst is disposed in an exhaust passageway, and absorbs a nitrogen oxide ($NO_x$) contained in the exhaust gas exhibiting the lean air/fuel ratio. After absorbing $NO_x$, the air/fuel ratio of the exhaust gas flowing into the $NO_x$ storage-reduction catalyst is made rich by increasing a quantity of the fuel supplied to the internal combustion engine, thereby desorbing $NO_x$ absorbed thereto from the $NO_x$ storage-reduction catalyst. Desorbed $NO_x$ is reduced to $N_2$ with a reducing component such as unburned HC, CO etc contained in the exhaust gas.

By the way, generally speaking, the fuel of the internal combustion engine contains a sulfur content, and, when the fuel is burned in the internal combustion engine, the sulfur content is burned, resulting in a production of sulfur oxide ($SO_x$). The $NO_x$ storage-reduction catalyst absorbs SOX contained in the exhaust gas with the same mechanism as absorbing $NO_x$. Therefore, if the $NO_x$ storage-reduction catalyst is disposed in the exhaust passageway of the internal combustion engine, the $NO_x$ storage-reduction catalyst absorbs $SO_x$ as well as $NO_x$.

$SO_x$ absorbed to the $NO_x$ storage-reduction catalyst, however, generates stable sulfate with a passage of time. $SO_x$ is therefore dissolved and desorbed with a difficulty and has a tendency of being easily accumulated within the $NO_x$ storage-reduction catalyst under a condition of executing desorption, reduction and purging of $NO_x$ out of the $NO_x$ storage-reduction catalyst (which is hereinafter termed a $NO_x$ desorbing/reducing process). If there augments a $SO_x$ accumulation quantity within the $NO_x$ storage-reduction catalyst, a $NO_x$ absorption quantity of the $NO_x$ storage-reduction catalyst decreases, and it is therefore unfeasible to sufficiently purge the exhaust gas of $NO_x$, with the result that so-called $SO_x$ poisoning occurs, wherein a $NO_x$, purging rate declines. Such being the case, it is required that $SO_x$ absorbed to the catalyst be desorbed therefrom at a proper timing in order to keep high the $NO_x$ purging rate of the $NO_x$ storage-reduction catalyst for a long period of time.

It has already proved that the air/fuel ratio of the inflow exhaust gas needs to be rich and the $NO_x$ storage-reduction catalyst is required to be set at a higher temperature than in the $NO_x$ desorbing/reducing process for desorbing $SO_x$ absorbed to the $NO_x$ storage-reduction catalyst.

Incidentally, a distribution of a $SO_x$ absorption quantity in the $NO_x$ storage-reduction catalyst exhibits a higher concentration in the closer proximity to the inlet of the exhaust gas in the $NO_x$ storage-reduction catalyst. Hence, when desorbing $SO_x$ absorbed to the $NO_x$ storage-reduction catalyst, in the case of flowing the exhaust gas having the rich air/fuel ratio in the same direction as a flow direction of the exhaust gas when absorbing $NO_x$, though $SO_x$ absorbed is desorbed on the inlet side in the $NO_x$ storage-reduction catalyst, $SO_x$ desorbed therefrom merely migrates to the outlet side of the exhaust gas through the $NO_x$ storage-reduction catalyst and is reabsorbed to the $NO_x$ storage-reduction catalyst. The problem is therefore such that $SO_x$ can not be discharged from the $NO_x$ storage-reduction catalyst.

Under such circumstances, a technology disclosed in Japanese Patent Application Laid-Open Publication No.7-259542, is that when desorbing $SO_x$ absorbed to the $NO_x$ storage-reduction catalyst, the exhaust gas having the rich air/fuel ratio flows through the $NO_x$ storage-reduction catalyst in a direction opposite to the direction when absorbing $NO_x$. In the case of incorporating a backward flow function of desorbing $SO_x$ by reversing the flow of the exhaust gas as described above, $SO_x$ desorbed from the $NO_x$ storage-reduction catalyst has a shorter migration distance within the $NO_x$ storage-reduction catalyst, and is immediately discharged out of the $NO_x$ storage-reduction catalyst. It is therefore feasible to prevent desorbed $SO_x$ from being reabsorbed to the $NO_x$ storage-reduction catalyst.

The following is an explanation of a construction of the exhaust mission control system of the internal combustion engine which incorporates the backward flow function disclosed in the above Publication. An upstream-side exhaust passageway connected to an inlet of the $NO_x$ storage-reduction catalyst is connected to a downstream-side exhaust gas passageway connected to an outlet of the $NO_x$ storage-reduction catalyst via a bypass passageway for bypassing the $NO_x$ storage-reduction catalyst. A first emission flow switching valve is provided at a confluent portion between the upstream-side exhaust passageway and the bypass passageway. A second emission flow switching valve is provided at a confluent portion between the downstream-side exhaust passageway and the bypass passageway. The first emission flow switching valve is capable of making a changeover to let the exhaust gas flowing from upstream flow through the $NO_x$ storage-reduction catalyst or let the exhaust gas flow into the bypass passageway. The second emission flow switching valve is capable of making a changeover to let the exhaust gas flowing through the $NO_x$ storage-reduction catalyst flow out toward the downstream-side exhaust passageway disposed more downstream than the second emission flow switching valve or let the exhaust gas flowing though the bypass passageway flow out toward the downstream-side exhaust passageway disposed more downstream than the second emission flow switching valve. Further, an exhaust passageway for suction is bypassed from the upstream-side exhaust passageway between the $NO_x$ storage-reduction catalyst and the first emission flow switching valve, and is connected to an intake port of an exhaust pump, and a discharge port of the exhaust pump is connected to the above bypass passageway. Moreover, a reducing agent supply device for supplying a reducing agent is provided at the downstream-side exhaust passageway between the $NO_x$ storage-reduction catalyst and the second emission flow switching valve.

Then, when in the $NO_x$ absorbing process, the first and second emission flow switching valves are switched over to close the bypass passageway so that an entire quantity of exhaust gas from the internal combustion engine flows toward the outlet from the inlet of the $NO_x$ storage-reduction catalyst. On the other hand, when desorbing $SO_x$ from the $NO_x$ storage-reduction catalyst, the first and second emission flow switching valves are switched over to close the bypass passageway so that substantially the entire quantity of exhaust gas from the internal combustion engine flows to the bypass passageway. Simultaneously, the exhaust gas in the upstream-side exhaust passageway between the $NO_x$ storage-reduction catalyst and the first emission flow switching valve is sucked and discharged to the bypass passageway by operating the exhaust pump, thereby causing a flow of the exhaust gas flowing backward from the outlet toward the inlet through the $NO_x$ storage-reduction catalyst. Besides, the reducing agent is supplied to the downstream-side exhaust passageway by operating a reducing agent supply device. The exhaust gas exhibiting the rich air/fuel ratio is thereby flowed backward through the $NO_x$ storage-reduction catalyst, thus desorbing $SO_x$ from the $NO_x$ storage-reduction catalyst.

The conventional backward-flow-function-incorporated exhaust emission control system of the internal combustion engine requires the exhaust pump and the plurality of emission flow switching valves and therefore involves the use of an increased number of parts, resulting in a rise in costs. Further, the increased number of parts leads to a good deal of labors for maintenance and inspection, correspondingly.

Moreover, the $SO_x$ desorbing process involving the backward flow in the $NO_x$ storage-reduction catalyst may be defined as a processing method giving attention to avoidance of the $SO_x$ reabsorption by decreasing the $SO_x$ migration distance when desorbing $SO_x$. While on the other hand, if this processing method is adopted, there increases a distance till the exhaust gas arrives at the $NO_x$ storage-reduction catalyst, and hence there must be a large drop in temperature of the exhaust gas during a period for which the exhaust gas flows through this long route. The above processing method is not necessarily, as the case may be, considered the best method of desorbing $SO_x$ in terms of a temperature condition when desorbing $SO_x$.

SUMMARY OF THE INVENTION

It is a primary object of the present invention, which was devised to obviate the above problems inherent in the prior art, to provide an exhaust emission control system of an internal combustion engine, which is capable of reducing costs by simplifying its own structure and decreasing the number of parts thereof.

It is another object of the present invention to provide an exhaust emission control system of an internal combustion engine, which is capable of establishing a $SO_x$ desorption processing technology with respect to an $NO_x$ storage-reduction catalyst $NO_x$.

To accomplish the above objects, according to a first aspect of the present invention, an exhaust emission control system of an internal combustion engine comprises an exhaust gas purifying element provided in an exhaust passageway of the internal combustion engine, a flow direction switching device including four ports and provided at an exhaust passageway disposed more upstream than the exhaust gas purifying element, a first exhaust passageway connected to the internal combustion engine and further to a first portion of the flow direction switching device, a second exhaust passageway communicating with the atmospheric air and further to a second port of the flow direction switching device, a third exhaust passageway connected to one side of the exhaust gas purifying element and further to a third port of the flow direction switching device, and a fourth exhaust passageway connected to the other side of the exhaust gas purifying element and further to a fourth port of the flow direction switching element. The flow direction switching device can be switched over to a first position for permitting the exhaust gas to flow in a *first* direction through the exhaust gas purifying element by connecting the first port to the third port and connecting the second port to the fourth port, and to a second position for permitting the exhaust gas to flow in a direction opposite to the first direction through the exhaust gas purifying element by connecting the first port to the fourth port and connecting the second port to the third port.

In the thus constructed exhaust emission control system of the internal combustion engine, the flow direction switching device is selectively switched over to the first position or the second position, thereby making the exhaust gas flow in the forward or backward direction through the exhaust gas purifying element. A determination of a changeover of which flow direction the exhaust gas flows in when satisfying what condition, is made based on characteristics of the whole exhaust emission control system and of the exhaust gas purifying element.

A gasoline engine and a diesel engine may be exemplified as the internal combustion engine according to the present invention.

The exhaust gas purifying element according to the present invention may take any structures and forms on condition that it has a function of purifying the exhaust gas, and there may be exemplified a catalyst and a filter (e.g., a diesel particulate filter). Further, if there change a purifying mechanism of the exhaust gas purifying element and a composition of the exhaust gas from the internal combustion engine, an adhered substance adhered to the exhaust gas purifying element might differ in its classification. What is exemplified as the adhered substance may be an oxides, a sulfide, nitrate and sulfate.

Then, there may also be taken a using method of switching over the flow direction switching device in order to desorb the adhered substance adhered to the exhaust gas purifying device. In this case, it might be required that a temperature of the exhaust gas purifying device be raised when desorbing the adhered substance depending upon a type of the exhaust gas purifying device and the classification of the adhered substance, or that the air/fuel ratio of the exhaust gas be stoichiometric or rich, or that both of such operations be carried out.

According to a second aspect of the present invention, in the exhaust emission control system of the internal combustion engine according to the first aspect of the invention, the flow direction switching device can be switched over to a third position in which the first port is connectable to the second port. A determination of the way of using the flow direction switching device by setting this device in the third position and what state this should be done in, is made based on the characteristics of the whole exhaust emission control system and of the exhaust gas purifying element.

According to a third aspect of the present invention, in the exhaust emission control system of the internal combustion engine according to the first aspect of the invention, the exhaust gas purifying element may be an $NO_x$ storage-reduction catalyst $NO_x$ catalyst for absorbing $NO_x$ when an air/fuel ratio of the inflow exhaust gas is lean, and desorbing $NO_x$ absorbed thereto when a concentration of oxygen in the inflow exhaust gas decreases.

According to a fourth aspect of the present invention, in the exhaust emission control system of the internal combustion engine according to the third aspect of the invention, when in a $SO_x$ desorbing process of desorbing $SO_x$ absorbed to the $NO_x$ storage-reduction catalyst from the $NO_x$ storage-reduction catalyst, the flow direction switching device is switched over to the first position or the second position, thereby making a flow direction of the exhaust gas flowing through the $NO_x$ storage-reduction catalyst opposite to the direction when absorbing $NO_x$.

This is based on such a conception that the exhaust gas flows through the $NO_x$ storage-reduction catalyst, and $SO_x$ contained in the exhaust gas is adhered to the $NO_x$ storage-reduction catalyst, in which case the $SO_x$ absorption starts from an upstream portion of the $NO_x$ storage-reduction catalyst, and the $SO_x$-absorbed area gradually expands toward the downstream side. If $SO_x$ is thus distributed over the $NO_x$ storage-reduction catalyst, when in the $SO_x$ desorbing process, $SO_x$ can be desorbed from the $NO_x$ storage-reduction catalyst at a high efficiency by flowing the exhaust gas in the direction opposite to the direction when absorbing $NO_x$. Note that when in the $SO_x$ desorbing process, the air/fuel ratio of the exhaust gas is set stoichiometric or rich. Further, when in the $SO_x$ desorbing process, it is preferable that the exhaust gas temperature or the temperature of the $NO_x$ storage-reduction catalyst be high to enable the $SO_x$ desorption to be executed at the high efficiency.

According to a fifth aspect of the present invention, in the exhaust emission control system of the internal combustion engine according to the fourth aspect of the invention, the exhaust gas purifying element composed of the $NO_x$ storage-reduction catalyst *is such that, a $NO_x$ storage-reduction catalyst disposed on inlet side in the flow direction of the exhaust gas when absorbing $NO_x$* exhibits higher $SO_x$ absorbing power than that of an $NO_x$ storage-reduction catalyst disposed on an outlet side in the flow direction of the exhaust gas when absorbing $NO_x$. With this contrivance, a greater amount of $SO_x$ is adhered on the inlet side of the exhaust gas when absorbing $NO_x$ in the $NO_x$ storage-reduction catalyst [$NO_x$ catalyst,] and, when in the $SO_x$ desorbing process executed by reversing the flow direction of the exhaust gas, $SO_x$ is desorbed at a higher efficiency from the $NO_x$ storage-reduction catalyst.

According to a sixth aspect of the present invention, the exhaust emission control system of the internal combustion engine according to the fourth aspect of the invention, may further comprise a heating element for heating a portion close to an inlet of the $NO_x$ storage-reduction catalyst in the flow direction of the exhaust gas when the $NO_x$ storage-reduction catalyst absorbs $NO_x$. With this construction, the $SO_x$ desorption out of the $NO_x$ storage-reduction catalyst is more speeded up.

According to a seventh aspect of the present invention, in the exhaust emission control system of the internal combustion engine according to the fourth aspect of the invention, the switch-over of the flow direction switching device when in the $SO_x$ desorbing process is executed when an exhaust gas temperature or a catalytic temperature of the $NO_x$ storage-reduction catalyst rises. The $NO_x$ storage-reduction catalyst has a nature of easily absorbing $NO_x$ and $SO_x$ when the exhaust gas temperature lowers, and desorbing $NO_x$ and $SO_x$ when the exhaust gas temperature rises, and hence the $SO_x$ desorption is facilitated by taking the above switching timing.

The switching timing by the flow direction switching device is not, however, limited to what has been described above. The switching timing may also include a timing when a quantity of $SO_x$ absorbed to the $NO_x$ storage-reduction catalyst reaches a predetermined quantity. Further, if applied to a gasoline engine (a so-called lean-burn gasoline engine) capable of performing the combustion at a lean air/fuel ratio, the combustion in the engine can be switched over to a combustion at the lean air/fuel ratio and to a combustion at a rich air/fuel ratio, depending upon an operation state of the engine. Hence, the changeover of the flow direction switching device may be controlled corresponding to the operation state of the engine.

According to an eighth aspect of the present invention, in the exhaust emission control system of the internal combustion engine according to the fourth aspect of the invention, lengths of the third exhaust passageway and of the fourth exhaust passageway are set so that a distance from the internal combustion engine to the $NO_x$ storage-reduction catalyst is shorter [when absorbing $NO_x$ than when in the $SO_x$ desorbing process] *when in the $SO_x$ desorbing process when absorbing $NO_x$* by switching over the flow direction switching device to the first position or the second position. With this contrivance, it is feasible to minimize a drop in the exhaust gas temperature till the exhaust gas arrives at the $NO_x$ storage-reduction catalyst during the $SO_x$ desorbing process and to speed up the rise in the temperature of the $NO_x$ storage-reduction catalyst. As a result, the $SO_x$ desorption can be speeded up.

According to a ninth aspect of the present invention, in the exhaust emission control system of the internal combustion engine according to the third aspect of the invention, a sweeper may be provided at the second exhaust passageway. With this configuration, even when the flow of the exhaust gas is bypassed without flowing through the exhaust gas purifying element in the process of the switching-over of the flow direction switching device, the exhaust gas is purified by the sweeper and is discharged into the atmospheric air.

According to a tenth aspect of the present invention, in the exhaust emission control system of the internal combustion engine according to the ninth aspect of the invention, the sweeper is a selective reduction type $NO_x$ catalyst for reducing or dissolving $NO_x$ under an existence of hydro carbon in an over-oxygen atmosphere.

According to an eleventh aspect of the present invention, in the exhaust emission control system of the internal combustion engine according to the ninth aspect of the invention, another catalyst may be provided in the first exhaust passageway, and the flow direction switching device may be switched over to the third position for connecting the first port to the second port for an initial predetermined time during the $SO_x$ desorbing process and, after the predetermined time has elapsed, switched over to make the flow direction of the exhaust gas flowing though the $NO_x$ storage-reduction catalyst opposite to the direction when absorbing $NO_x$. With this contrivance, even when $SO_x$ is desorbed from another catalyst at an initial stage of the $SO_x$ desorbing process, $SO_x$ desorbed therefrom does not flow to the $NO_x$ storage-reduction catalyst, whereby the $NO_x$ storage-reduction catalyst can be prevented from suffering $SO_x$ poisoning. Besides, the sweeper can purge the exhaust gas of $SO_x$ desorbed out of another catalyst.

According to a twelfth aspect of the present invention, in the exhaust emission control system of the internal combustion engine according to the ninth aspect of the invention, the $NO_x$ storage-reduction catalyst and the sweeper are integrated into one unit so that the exhaust gas can not flow therebetween and the heat can be transmitted therebetween. With this construction, a temperature of the sweeper can be kept high.

According to a thirteenth aspect of the present invention, in the exhaust emission control system of the internal combustion engine according to the first aspect of the invention, lengths of the third exhaust passageway and of the fourth exhaust passageway are set so that a distance from the internal combustion engine to the exhaust gas purifying element becomes different by switching over the flow direction switching device to the first position or the second position. With this setting, the drop in the temperature of the exhaust gas flowing into the exhaust gas purifying element can be made smaller when selecting the flow path having the shorter distance from the internal combustion engine to the exhaust gas purifying element than when selecting the flow path having the longer distance. A determination of what state the flow direction switching device switches over the flow direction of the exhaust gas, is made based on the characteristics of the whole exhaust emission control system and of the exhaust gas purifying element.

According to a fourteenth aspect of the present invention, in the exhaust emission control system of the internal combustion engine according to the thirteenth aspect of the invention, the switch-over of the flow direction switching device is executed based on an exhaust gas temperature or a temperature of the exhaust gas purifying element. A determination about what temperature condition the flow direction switching device switches over the flow direction of the exhaust gas, is made based on the characteristics of the whole exhaust emission control system and of the exhaust gas purifying element.

According to a fifteenth aspect of the present invention, in the exhaust emission control system of the internal combustion engine according to the fourteenth aspect of the invention, the exhaust gas purifying element may be an $NO_x$ storage-reduction catalyst $NO_x$ catalyst for absorbing $NO_x$ when an air/fuel ratio of the inflow exhaust gas is lean, and desorbing $NO_x$ absorbed thereto when a concentration of oxygen in the inflow exhaust gas decreases.

According to a sixteenth aspect of the present invention, in the exhaust emission control system of the internal combustion engine according to the fifteenth aspect of the invention, the flow direction switching device is switched over by selecting a flow path having a shorter distance from the internal combustion engine to the $NO_x$ storage-reduction catalyst when in the $SO_x$ desorbing process of desorbing $SO_x$ desorbed to the $NO_x$ storage-reduction catalyst from the $NO_x$ storage-reduction catalyst. In the case of desorbing $SO_x$ from the $NO_x$ storage-reduction catalyst, a $SO_x$ desorbing efficiency is higher when the temperature of the $NO_x$ storage-reduction catalyst is higher. When selecting the flow path having the shorter distance from the internal combustion engine to the $NO_x$ storage-reduction catalyst, there is decreased the drop in the exhaust gas temperature till the exhaust gas arrives at the $NO_x$ storage-reduction catalyst, and the higher-temperature exhaust gas can flow into the $NO_x$ storage-reduction catalyst. As a result, $SO_x$ can be desorbed more efficiently.

According to a seventeenth aspect of the present invention, in the exhaust emission control system of the internal combustion engine according to the fifteenth aspect of the invention, the flow direction switching device may be switched over by selecting a flow path having a longer distance from the internal combustion engine to the $NO_x$ storage-reduction catalyst when the $NO_x$ storage-reduction catalyst absorbs $NO_x$ and when the exhaust gas temperature or the catalytic temperature of the $NO_x$ storage-reduction catalyst is over a predetermined temperature, and selecting a flow path having a shorter distance from the internal combustion engine to the $NO_x$ storage-reduction catalyst when the $NO_x$ storage-reduction catalyst absorbs $NO_x$ and when the exhaust gas temperature or the catalytic temperature is lower than the predetermined temperature. If the distance from the internal combustion engine to the $NO_x$ storage-reduction catalyst is long, there must be a large drop in the temperature of the exhaust gas till the exhaust gas arrives at the $NO_x$ storage-reduction catalyst. Reversely, if the distance from the internal combustion engine to the $NO_x$ storage-reduction catalyst is short, there must be a small drop in the temperature of the exhaust gas till the exhaust gas arrives at the $NO_x$ storage-reduction catalyst. Accordingly, the long route and the short route are separately used by switching over the flow direction switching device as described above, whereby the $NO_x$ storage-reduction catalyst can be kept within a temperature range preferable to the $NO_x$ absorption, and the $NO_x$ purging rate can be enhanced.

According to an eighteenth aspect of the present invention, in the exhaust emission control system of the internal combustion engine according to the fifteenth aspect of the invention, a sweeper may be provided at the second exhaust passageway, and the flow direction switching device can be switched over to a third position in which the first port can be connected to the second port. When *the exhaust gas temperature or* the catalytic temperature of the $NO_x$ storage-reduction catalyst is higher than a $NO_x$ absorbable temperature range of the $NO_x$ storage-reduction catalyst, the flow direction switching device may be selectively switched over to the third position. If *the exhaust gas temperature or* the catalytic temperature of the $NO_x$ storage-reduction catalyst is higher than the $NO_x$ absorbable temperature range of the $NO_x$ storage-reduction catalyst, the exhaust gas is not purged of $NO_x$ contained therein [eve] by flowing the exhaust gas through the $NO_x$ storage-reduction catalyst, and besides the $NO_x$ storage-reduction catalyst is deteriorated due to the high temperature. Then, in such a case, the flow direction switching device is switched over to the third position, whereby the exhaust gas takes a short path from the first exhaust passageway to the second exhaust passageway without flowing through the $NO_x$ storage-reduction catalyst. The $NO_x$ storage-reduction catalyst is thereby prevented from being deteriorated. Further, the sweeper purges the exhaust gas of HC and CO contained therein.

According to a nineteenth aspect of the present invention, in the exhaust emission control system of the internal combustion engine according to the seventeenth aspect of the invention, a cooling device for cooling the exhaust gas may be provided at either the third exhaust passageway or the fourth exhaust passageway, which increases the distance from the internal combustion engine to the $NO_x$ storage-reduction catalyst. The cooling device is capable of forcibly cooling the exhaust gas, which enables the $NO_x$ storage-reduction catalyst to be more surely kept within the temperature range preferable to the $NO_x$ absorption.

According to a twentieth aspect of the present invention, in the exhaust emission control system of the internal combustion engine according to the third aspect of the invention, the first exhaust passageway may be provided with a $SO_x$ absorbing agent for absorbing $SO_x$ when the air/fuel ratio of the inflow exhaust gas is lean, and desorbs $SO_x$ absorbed thereto when a concentration of oxygen in the inflow exhaust gas decreases. The flow direction switching device can be switched over to the third position in which to connect the first port to the second port, and may be selectively switched over to the third position when the internal combustion engine comes to a continuous stoichiometric ratio operation. The internal combustion engine comes into the continuous stoichiometric ratio operation, and the exhaust gas having the stoichiometric ratio flows into the $SO_x$ absorbing agent. Then, $SO_x$ is desorbed from the $SO_x$ absorbing agent, and at this time the flow direction switching device is switched over to the third position, with the result that the exhaust gas containing $SO_x$ desorbed from the $SO_x$ adsorbing agent flows along the short path from the first exhaust passageway to the second exhaust passageway and is charged into the atmospheric air without flowing into the $NO_x$ storage-reduction catalyst. Accordingly, the $NO_x$ storage-reduction catalyst can be prevented from the $SO_x$ poisoning.

According to a twenty first aspect of the present invention, in the exhaust emission control system of the internal combustion engine according to the twentieth aspect of the invention, the $SO_x$ absorbing agent and the $NO_x$ storage-reduction catalyst may be concentrically disposed. With this arrangement, the exhaust emission control system can be made compact.

According to twenty second aspect of the present invention, in the exhaust emission control system of the internal combustion engine according to the third aspect of the invention, the first exhaust passageway may be provided with a three-way catalyst exhibiting $SO_x$ absorbing power, and the flow direction switching device can be switched over to the third position in which the first port is connectable to the second port, and may be selectively switched over to the third position when the internal combustion engine comes to a continuous stoichiometric ratio operation. The internal combustion engine comes into the continuous stoichiometric ratio operation, and the exhaust gas having the stoichiometric ratio flows into the three-way catalyst exhibiting the $SO_x$ absorbing power, whereby $SO_x$ is desorbed from the three-way catalyst. At this time, however, if the flow direction switching valve is switched over to the third position as described above, the exhaust gas containing $SO_x$ desorbed from the three-way catalyst takes the short path from the first exhaust passageway to the second exhaust passageway and is charged into the atmospheric air without flowing into the $NO_x$ storage-reduction catalyst. Hence, the $NO_x$ storage-reduction catalyst can be prevented from the $SO_x$ poisoning. Further, at this time, the exhaust gas is purified by three-way activation of the three-way catalyst.

According to a twenty third aspect of the present invention, in the exhaust emission control system of the internal combustion engine according to the first aspect of the invention, the exhaust gas purifying element may be a catalyst, any one of the third exhaust passageway and the fourth exhaust passageway is provided with an HC adsorbing agent for adsorbing hydro carbon, and the flow direction switching device may be switched over to select a flow path on which the catalyst is positioned more upstream than the HC adsorbing agent when the temperature of the exhaust gas or of the HC adsorbing agent is in a temperature region where the HC adsorbing agent adsorbs the hydro carbon, and to select a flow path on which the HC adsorbing agent is positioned more upstream than the catalyst when the temperature of the exhaust gas or of the HC adsorbing agent is in a temperature region where the HC adsorbing agent desorbs the hydro carbon. With this contrivance, when the exhaust gas temperature or the temperature of the HC [absorbing] *adsorbing* agent is in the temperature region where the HC [absorbing] *adsorbing* agent adsorbs the hydro carbon, HC is adsorbed to the HC adsorbing agent even if the catalyst is not activated and HC contained in the exhaust gas flows through the catalyst. Moreover, when the exhaust gas temperature or the temperature of the HC [absorbing] *adsorbing* agent is in the temperature region where the HC [absorbing] *adsorbing* agent desorbs the hydro carbon, HC is desorbed from the HC adsorbing agent when the exhaust gas flows through the HC adsorbing agent. Furthermore, the exhaust gas is purged of HC when passing through the catalyst of which a temperature reaches an active temperature.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of an exhaust emission control system of an internal combustion engine according to the present invention will hereinafter be described with reference to FIGS. 1 through 46.

First Embodiment

Figure 1:
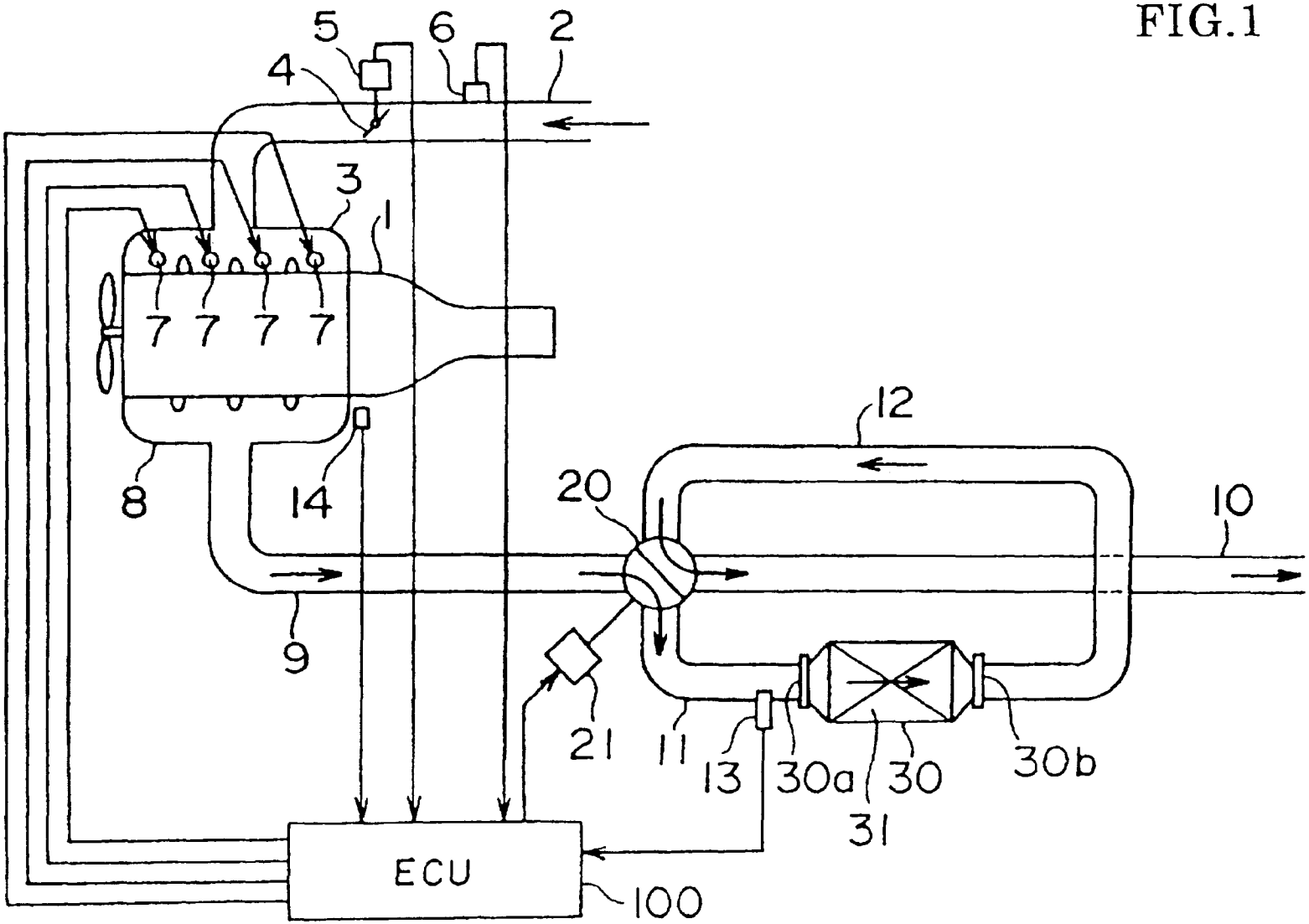
FIG. 1 is a schematic diagram of a construction of an exhaust emission control system of an internal combustion engine in a first embodiment of the present invention, showing a state where an emission switching valve is located in a forward flow direction.

FIG. 1 is a diagram schematically showing a construction of the exhaust emission control system of the internal combustion engine according to the present invention in an embodiment where the same control system is applied to a gasoline engine (a so-called lean-burn gasoline engine) capable of burning at a lean air/fuel ratio.

Referring to FIG. 1, an engine 1 is classified as a straight-four-cylinder engine, wherein intake air is supplied to each of the cylinders via an intake pipe 2 and an intake manifold 3. The intake pipe 2 is provided with a throttle valve 4 for opening and closing an intake passageway within the intake pipe 2, interlocking with an unillustrated accelerator pedal. Attached to this throttle valve 4 is a throttle position sensor 5 for outputting an output signal corresponding to an aperture of the throttle valve 4 to an engine-control-oriented electronic control unit (ECU) 100.

An airflow meter 6 for outputting to the ECU 100 an output signal corresponding to an intake air quantity (intake air mass) Q of the air flowing inside the intake pipe 2, is attached to the intake pipe 2 more upstream than the throttle valve 4 along the intake pipe 2.

A fuel (gasoline) is injected out of a fuel injection valve 7 into each intake passageway communicating with each cylinder. A valve closing timing and a valve opening period of the fuel injection valve 7 are controlled by the ECU 100 in accordance with an operation state of the engine 1.

An exhaust gas discharged from each cylinder of the engine 1 is exhausted via an exhaust manifold 8 and an exhaust pipe (a first exhaust passageway) 9. The exhaust pipe 9 is connected to a first port of an emission switching valve (a switching unit) 20 formed with four ports. A second port of the emission switching valve 20 is connected to an exhaust pipe (a second exhaust passageway) 10 for discharging the exhaust gas into the atmospheric air. A third port of the emission switching valve 20 is connected to an inlet 30a of a catalytic converter (an exhaust gas purifying unit) 30 via an exhaust pipe (a third exhaust passageway) 11. A fourth port of the emission switching valve 20 is connected to an outlet 30b of the catalytic converter 30 via an exhaust pipe (a fourth exhaust passageway) 12. The catalytic converter 30 contains an $NO_x$ storage-reduction catalyst (hereinafter abbreviated to the $NO_x$ catalyst) 31. The $NO_x$ catalyst 31 will be explained in greater details later on.

Figure 2:
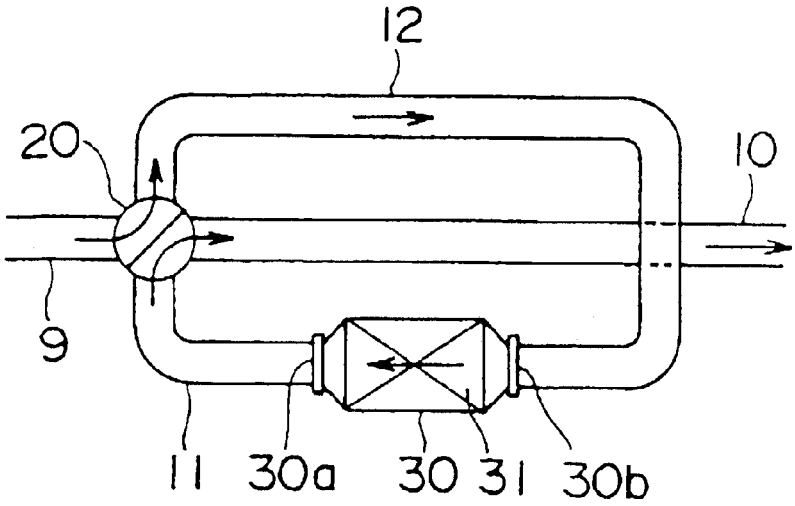
FIG. 2 is a diagram showing principal components of the exhaust emission control system in the first embodiment when the emission switching valve is located in a backward flow position.

The emission switching valve 20 is capable of changing a *direction* of the exhaust gas flowing through the catalytic converter 30 by switching a valve member thereof to a forward flow position shown in FIG. 1 and to a backward flow position shown in FIG. 2. When the valve member is located in the forward flow position, the emission switching valve 20 connects the exhaust pipe 9 to the exhaust pipe 11, and connects the exhaust pipe 10 to the exhaust pipe 12, at which time the exhaust gas flows in the sequence such as the exhaust pipe 9→the exhaust pipe 11→the catalytic converter 30→the exhaust pipe 12→the exhaust pipe 10, and is released into the atmospheric air. What is referred to as a "forward flow" in the following discussion is a flow of the exhaust gas flowing from the inlet 30a of the catalytic converter 30 toward the outlet 30b thereof. Further, when the valve member of the emission switching valve 20 is located in the backward flow position shown in FIG. 2, the emission switching valve 20 connects the exhaust pipe 9 to the exhaust pipe 12, and connects the exhaust pipe 10 to the exhaust pipe 11, at which time the exhaust gas flows in the sequence such as the exhaust pipe 9→the exhaust pipe 12→the catalytic converter 30→the exhaust pipe 11→the exhaust pipe 10, and is released into the atmospheric air. What is referred to as a "backward flow" in the following discussion is a flow of the exhaust gas flowing from the outlet 30b of the catalytic converter 30 toward the inlet 30a thereof.

This emission switching valve 20 is driven by an actuator 21, thereby switching a position of the valve member, and the actuator 21 is controlled by the ECU 100. In this embodiment, the actuator 21 and the ECU 100 are combined to constitute a control module. The switching control of the position of the valve member of the emission switching valve 20 will be discussed hereinafter in greater details.

An exhaust gas temperature sensor 13 for outputting to the ECU 100 an output signal corresponding to a temperature of the exhaust gas flowing within the exhaust pipe 11, is attached to the exhaust pipe 11 in the vicinity of the inlet 30a of the catalytic converter 30.

The digital-computer-based ECU 100 includes a ROM (Read-Only Memory), a RAM (Random Access Memory, a CPU (Central Processing Unit), an input port and an output port, which are connected to each other via a bidirectional bus. The ECU 100 performs basic control processes such as controlling the air/fuel ratio of the engine 1 and besides an $SO_x$ desorbing process control of the catalytic converter 30.

Inputted to the input port of the ECU 100 for these control processes are an input signal from the airflow meter 6, an input signal from the exhaust gas temperature sensor 13 and in addition an input signal from an engine speed sensor 14. The engine speed sensor 14 outputs to the ECU 100 an output signal corresponding to an engine speed of the engine 1, and the ECU 100 calculates an engine speed N on the basis of this output signal. Further, the ECU 100 calculates an intake air quantity Q from the output signal of the airflow meter 6, and thereby calculates an engine load Q/N (intake air quantity Q/engine speed N). Then, the ECU 100 judges an operation state of the engine 1 from the engine load Q/N as well as from the engine speed N, and controls a quantity of the fuel injected from the fuel injection valve in accordance with the operation state, thus controlling the air/fuel ratio to a lean air/fuel ratio and a stoichiometric ratio or a rich air/fuel ratio. One exemplification of this air/fuel ratio control is a control method by which the air/fuel ratio is set to the stoichiometric ratio or the rich air/fuel ratio when in a warm-up operation and in a high-load operation region, and set to the lean air/fuel ratio in a low- and middle-load operation region.

The $NO_x$ catalyst 31, i.e., the NO, storage-reduction catalyst contained in the catalytic converter 30 involves the use of, e.g., aluminum serving as a carrier. Elements borne on this carrier are at least one element chosen from alkali metals such as, e.g., potassium K, sodium Na, lithium Li and cesium Cs, alkaline earth elements such as barium Ba and calcium Ca, and rare and rare earth elements such as lanthanum La and yttrium Y, and a precious metal such as platinum Pt.

This $NO_x$ catalyst 31 absorbs $NO_x$ when the air/fuel ratio of the inflow exhaust gas (which is hereinafter be referred to as an exhaust air/fuel ratio) is lean, and desorbs $NO_x$ when an oxygen concentration in the inflow exhaust gas decreases, and reduces it to $N_2$. Note that the exhaust air/fuel ratio implies a ratio of a total of the air supplied to the exhaust passageway, an engine combustion chamber and the intake passageway which are disposed upstream of the $NO_x$ catalyst 31 to a total of the fuel (hydro carbon). Accordingly, if the fuel and a reducing agent or the air are not supplied into the exhaust passageway disposed upstream of the $NO_x$ catalyst 31, the exhaust air/fuel ratio coincides with an air/fuel ratio of an air-fuel mixture supplied into the engine combustion chamber.

In accordance with the first embodiment, what is used as an internal combustion engine is so-called lean-burn gasoline engine capable of burning at the lean air/fuel ratio, and the air/fuel ratio of the air-fuel mixture is controlled corresponding to an operation state of the engine 1. Therefore, when the engine 1 is operated at the lean air/fuel ratio, the exhaust air/fuel ratio becomes lean, and the oxygen concentration increases. On the other hand, when the engine 1 is operated at a stoichiometric ratio or a rich air/fuel ratio, the exhaust air/fuel ratio comes to the stoichiometric ratio or the rich air/fuel ratio, and the oxygen concentration in the exhaust ga remarkably decreases, with the result that components such as unburned HC and CO discharged from the engine 1 augment.

Figure 3:
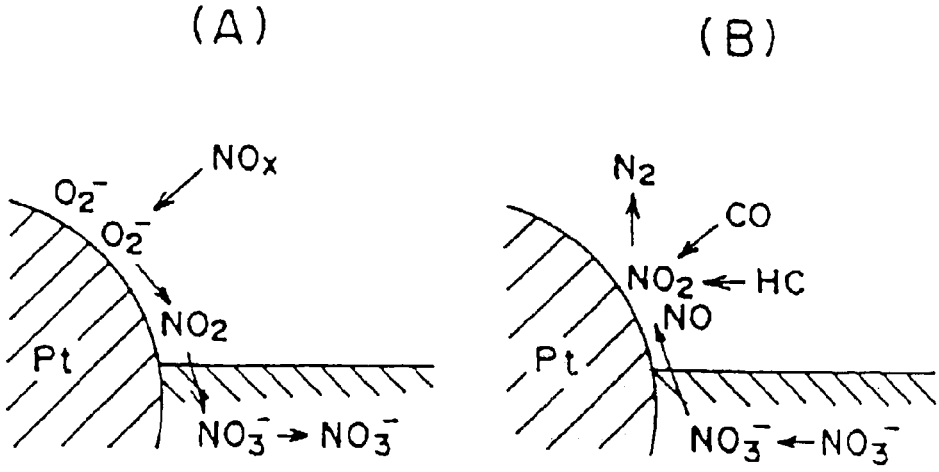
FIG. 3 is an explanatory diagram showing $NO_x$ absorbing/desorbing/reducing action of an $NO_x$ storage-reduction catalyst.

It is assumed that the $NO_x$ catalyst 31 absorbs and desorbs $NO_x$ by a mechanism as illustrated in FIG. 3, though this mechanism of $NO_x$ absorbing/desorbing action is partly unclear. This mechanism will be discussed by exemplifying a case where platinum Pt and barium Ba are borne on the carrier, however, the same mechanism might be attained by use of other precious metals, alkali metals, alkaline earth elements and rare earth elements.

To start with, when the inflow exhaust gas exhibits a considerably lean A/F ratio, the oxygen concentration in the inflow exhaust gas remarkably increases, and hence, as shown in FIG. 3(A), oxygen $O_2$ is adhered in the form of $O_2^-$ or $O^{2-}$ to the surface of platinum Pt. Next, NO contained in the exhaust gas reacts to $O_2^-$ or $O^{2-}$ on the surface of platinum Pt, thereby turning out to be $NO_2$ ($2NO+O_2 \rightarrow 2NO_2$).

Thereafter, as far as a $NO_x$ absorbing capability of the $NO_x$ catalyst 31 is not saturated, $NO_2$ which has thus been generated is absorbed within the $NO_x$ catalyst 31 while being oxidized on platinum Pt, then coupled to barium oxide BaO, and diffused in the form of sodium ion $NO_3^-$ as shown in FIG. 3(A). Thus, $NO_x$ is absorbed within the $NO_x$ catalyst 31.

By contrast, when the oxygen concentration in the inflow exhaust gas decreases, a generation quantity of $NO_2$ decreases, and, with reversal reaction ($NO_3^- \rightarrow NO_2$) to the above reaction, sodium ion $NO_3^-$ in the $NO_x$ catalyst 31 is desorbed in the form of $NO_2$ or NO from the $NO_x$ catalyst 31.

While on the other hand, if there exist a reducing component such as HC, CO etc in the inflow exhaust gas, these components react to oxygen $O_2^-$ or $O^{2-}$ on platinum Pt and thereby oxidized enough to dissipate the oxygen in the exhaust gas, whereby the oxygen concentration in the exhaust gas decreases. Further, $NO_2$ or NO desorbed from the $NO_x$ catalyst 31 with the decrease in the oxygen concentration in the exhaust gas, reacts to HC, CO and thereby reduced as shown in FIG. 3(B). When $NO_2$ or NO on platinum Pt thus disappears, $NO_2$ or NO is successively desorbed from the $NO_x$ catalyst 31.

Namely, HC, Co in the inflow exhaust gas immediately react at first to oxygen $O_2^-$ or $O^{2-}$ on platinum Pt and thus oxidized, and subsequently, if HC, Co are still left even when oxygen $O_2^-$ or $O^{2-}$ on platinum Pt is dissipated, $NO_x$ desorbed from the $NO_x$ catalyst 31 and $NO_x$ discharged from the engine are reduced to $NO_2$ with such HC and CO.

As described above, when the exhaust air/fuel ratio becomes lean, the $NO_x$ is absorbed to the $NO_x$ catalyst 31. When the exhaust air/fuel ratio becomes stoichiometric or rich, the $NO_x$ is desorbed from the $NO_x$ catalyst 31 in a short period of time and reduced to $NO_2$. It is therefore feasible to hinder $NO_x$ from being discharged into the atmospheric air.

Given next is an explanation of an $SO_x$ poisoning mechanism in the $NO_x$ catalyst 31. When sulfur oxide ($SO_x$) is contained in the exhaust gas, the $NO_x$ catalyst 31 absorbs $SO_x$ in the exhaust gas by the same mechanism as the $NO_x$ absorbing mechanism. Namely, when the exhaust air/fuel ratio is lean, oxygen $O_2$ is adhered in the form of $O_2^-$ or $O^{2-}$ to the surface of platinum Pt of the $NO_x$ catalyst 31, and $SO_x$ (e.g., $SO_2$) in the inflow exhaust gas is oxidized on the surface of platinum Pt and thereby turned out to be $SO_3$.

Thereafter, $SO_2$ which has been generated is absorbed within the $NO_x$ catalyst 31 while being oxidized on the surface of platinum Pt, then coupled to barium oxide BaO, and diffused in the form of sulphate ion $SO4^{2-}$ thereby forming sulfate $BaSO_4$. Crystal of sulfate $BaSO_4$ is easy to roughen and comparatively easy to stabilize. Once the sulfate is produced, it is difficult to dissolve and desorb it. Hence, if a generation quantity of $BaSO_4$ in the $NO_x$ catalyst 31 increases with an elapse of time, a quantity of BaO capable of getting involved in the absorption of the $NO_x$ catalyst 31 decreases, resulting in a decline of $NO_x$ absorbing capability. Namely, this is what is called the $SO_x$ poisoning. Accordingly, it is required for keeping high the $NO_x$ absorbing capability of the $NO_x$ catalyst 31 that $SO_x$ absorbed to the $NO_x$ catalyst 31 be desorbed at a proper timing.

It has proved that the oxygen concentration of the exhaust gas may be reduced as in the case of desorbing the $NO_x$ in order to desorb the $SO_x$ from the $NO_x$ catalyst 31. Further, it has also proved that the desorption thereof is easier as a temperature of the $NO_x$ catalyst 31 becomes higher.

It has proved from the study of the present applicant that the desorption of $SO_x$ absorbed to the $NO_x$ catalyst 31 requires setting the inflow exhaust gas air/fuel ratio to the stoichiometric ratio or the rich air/fuel ratio and also making the temperature of the $NO_x$ catalyst 31 higher than in a normal $NO_x$ desorbing/reducing process of desorbing $NO_x$ from the $NO_x$ catalyst 31.

Furthermore, as for an $SO_x$ absorbing state in the catalytic converter 30, the $NO_x$ catalyst 31 positioned closer to the inlet 30a of the catalytic converter 30 absorbs a larger amount of $SO_x$ than the $NO_x$ catalyst 31 positioned farther away from the inlet 30. Therefore, when $SO_x$ is desorbed from the $NO_x$ catalyst 31, $SO_x$ can be desorbed in a short time by setting the exhaust air/fuel ratio to the stoichiometric ratio or the rich air/fuel ratio and by flowing the high-temperature exhaust gas toward the inlet 30a from the outlet 30b of the catalytic converter 30.

Such being the case, in the first embodiment, the of the exhaust gas in the catalytic converter is so controlled as to be switched over by operating the emission switching valve 20, thus setting in the forward flow the flow of the exhaust gas in the catalytic converter 30 when absorbing $NO_x$ and $SO_x$ and setting in the backward flow the flow of the exhaust gas in the catalytic converter when desorbing $NO_x$ and $SO_x$.

Next, an operation of the exhaust emission control system in the first embodiment will be described. As explained above, the engine 1 is classified as the lean-burn engine, and the ECU 100 controls the air/fuel ratio in accordance with the operation state of the engine 1. When the engine 1 is operated at the lean air/fuel ratio, the exhaust air/fuel ratio becomes lean, and the oxygen concentration increases. When the engine 1 is operated at the stoichiometric ratio or the rich air/fuel ratio, the exhaust air/fuel ratio becomes stoichiometric or rich, and the oxygen concentration in the exhaust gas largely decreases. Further, the components of unburned HC and CO discharged from the engine 1 augment.

Then, when the engine 1 is operated at the lean air/fuel ratio, the ECU 100 controls the operation of the actuator 21 so that the valve member of the emission switching valve 20 is kept in the forward flow position shown in FIG. 1. Under this control, the exhaust gas of the engine 1 flows in the sequence such as the exhaust pipe 9→the exhaust pipe 11→the catalytic converter 30→the exhaust pipe 12→the exhaust pipe 10, and is released into the atmospheric air. In the catalytic converter 30. The exhaust gas flows along the forward flow from the inlet 30a toward the outlet 30b. At this time, $NO_x$ catalyst 31 of the catalytic converter 30 absorbs $NO_x$ and $SO_x$ contained in the exhaust gas.

Then, when the engine 1 is operated at the stoichiometric ratio or the rich air/fuel ratio, the ECU 100 controls the operation of the actuator 21 so that the valve member of the emission switching valve 20 is kept in the backward flow position shown in FIG. 2. Under this control, the exhaust gas of the engine 1 flows in the sequence such as the exhaust pipe 9→the exhaust pipe 12→the catalytic converter 30→the exhaust pipe 11→the exhaust pipe 10, and is released into the atmospheric air. In the catalytic converter 30, the exhaust gas flows along the backward flow from the outlet 30b toward the inlet 30a. Further, when the engine 1 is operated at the stoichiometric ratio or the rich air/fuel ratio, the ECU 100 controls the operation of the engine 1 so that the exhaust gas temperature comes to such a temperature as to facilitate desorbing $SO_x$ out of the $NO_x$ catalyst 31.

The high-temperature exhaust gas exhibiting the stoichiometric ratio or the rich air/fuel ratio flows through within the catalytic converter 30 in the direction opposite to the one when absorbing $NO_x$ and $SO_x$, whereby $NO_x$ is desorbed from the $NO_x$ catalyst 31. Further, the exhaust gas is purified by its being reduced to N2 with unburned HC and CO contained in the exhaust gas. Moreover, the exhaust gas flows back through the catalytic converter 30, whereby $SO_x$ absorbed to the $NO_x$ catalyst 31 can be desorbed out of the $NO_x$ catalyst 31 in a short time.

Further, if the lean air/fuel ratio operation continues for a long period of time under the operating condition of the engine 1, the engine 1 is so controlled as to be operated forcibly at the stoichiometric ratio or the rich air/fuel ratio, and, as described above, there is executed the process of desorbing $NO_x$ and $SO_x$, whereby the catalytic converter 30 is not saturated with $NO_x$ and $SO_x$. This air/fuel ratio control method of the engine 1 is referred to as lean/rich spike control in the following discussion. Note that in the case of explaining the lean/rich spike control by specifically exemplifying numerical values thereof, if the "lean air/fuel ratio operation" of the engine 1 continues for several tens of seconds (e.g., 40 to 60 sec), a "stoichiometric ratio or rich air/fuel ratio operation" continues for several seconds (e.g., 2 to 3 sec), this "lean air/fuel ratio operation" and the "stoichiometric ratio or rich air/fuel ratio operation" are alternately executed.

In the first embodiment, the lean-burn gasoline engine constitutes the internal combustion engine, the $NO_x$ catalyst 31 forms an exhaust gas purifying element, and $SO_x$ forms an adhered substance which the exhaust gas purifying element ($NO_x$ catalyst 31) should be purged of. Furthermore, the control of the operation of the engine 1 serves to obtain the (stoichiometric or rich) air/fuel ratio and the (high) exhaust gas temperature which are needed for purging the exhaust gas purifying element of $SO_x$, and hence the control of the operation of the engine 1 serves as a purging function in the first embodiment.

In accordance with the first embodiment, a reducing agent adding device for adding the reducing agent is provided at the exhaust passageway (i.e., the exhaust passageway 12 or 9) positioned more upstream than the catalytic converter 30 when the exhaust gas flowing through the catalytic converter 30 is flowed backward. When executing the process of desorbing $NO_x$ and $SO_x$, the reducing agent adding device adds the reducing agent into the exhaust gas, thereby making it feasible to speed up the release and reduction of $NO_x$ and also the release of $SO_x$. In this case, in addition to the control of the operation of the engine 1, the reducing adding device and the operation control thereof perform the purging function.

Incidentally, in the first embodiment, the processes of desorbing $NO_x$ and $SO_x$ from the $NO_x$ catalyst 31 are executed simultaneously, however, a quantity of $SO_x$ contained in the exhaust gas of the engine especially of the gasoline engine is extremely small, and hence there is no necessity for executing the process of desorbing $SO_x$ at the same frequency as the $NO_x$ desorbing process. Then, in the case of carrying out the $NO_x$ desorbing process, when in the operation state of the engine 1 wherein the exhaust gas temperature is comparatively low even in the operation region of the stoichiometric ratio or rich air/fuel ratio, the exhaust gas flows through the catalytic converter 30 along the same forward flow as it flows when absorbing $NO_x$, thereby desorbing $NO_x$ from the $NO_x$ catalyst 31 and thus reducing it. On the other hand, when in the operation state (such as an acceleration and a high-load operation) of the engine 1 wherein the exhaust gas temperature rises high as well as in the operation region of the stoichiometric ratio or rich air/fuel ratio, i.e., only when the exhaust gas is in a state of exhibiting the stoichiometric ratio or rich air/fuel ratio advantageous for desorbing $SO_x$ as well as being at a high temperature, the valve member of the emission switching valve 20 is switched over to the backward flow position, and the exhaust gas flow though the catalytic converter 30 is set to the backward flow, thus performing the control to execute the $SO_x$ desorbing process.

Further, the ECU judges whether or not the process of desorbing $SO_x$ from the $NO_x$ catalyst 31 is required. When judging that the $SO_x$ desorbing process is not required, the valve member of the emission switching valve 20 is kept in the forward flow position, and the exhaust gas flow through the catalytic converter 30 is set to the forward flow. When judging that the $SO_x$ desorbing process is required, the valve member of the emission switching valve 20 is switched over to the backward flow position, and the exhaust gas flow through the catalytic converter 30 is set to the backward flow. Besides, the ECU 100 calculates a target air/fuel ratio and a target catalyst temperature that are optimal to the release of $SO_x$, and further, if the above-mentioned reducing agent adding device is provided, calculates a target reducing agent quantity. The $SO_x$ desorbing process may be executed by controlling the engine 1 and the reducing agent adding device etc to attain those target values. A method of judging whether the $SO_x$ desorbing process is needed or not may be exemplified such as making the ECU 100 integrate an operation time of the engine 1 and judging that the $SO_x$ desorbing process is needed when an integrated value thereof reaches a predetermined time, or making the ECU 100 integrate an amount of $SO_x$ absorbed to the $NO_x$ catalyst 31 and judging that the $SO_x$ desorbing process is needed when an integrated value there of reaches a predetermined quantity.

Figure 4:
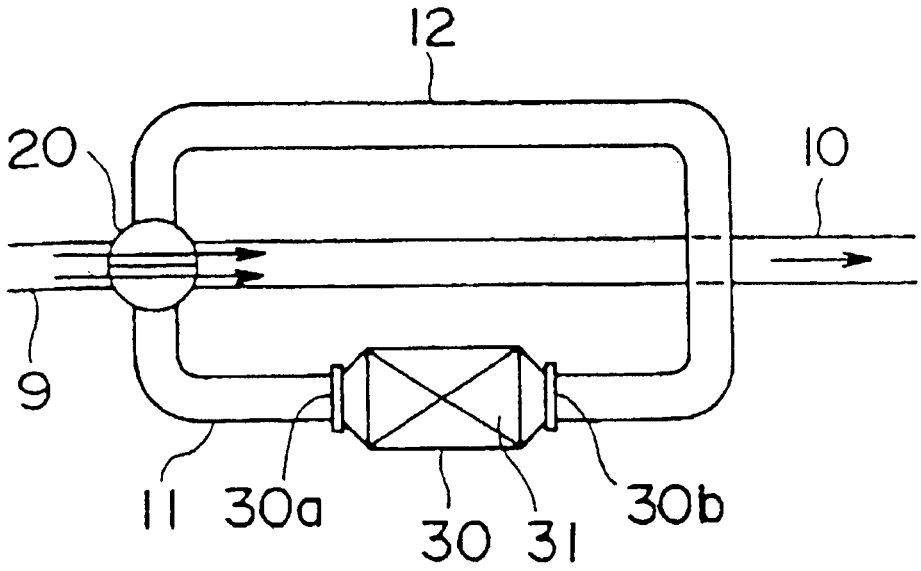
FIG. 4 is a diagram showing the principal components of the exhaust emission control system in the first embodiment when the emission switching valve is located in a neutral position between the forward flow position and the backward flow position.

Moreover, as discussed above, the ECU 100, when judging that the $SO_x$ desorbing process is necessary, sets the exhaust gas flow though the catalytic converter 30 in the backward flow by switching over the position of the valve member of the emission switching valve 20, and sets the operation to the stoichiometric ratio or rich air/fuel ratio operation, thus desorbing $SO_x$, in which case it is preferable that the air/fuel ratio be lean during the operation of switching over the position of the valve member of the emission switching valve 20. The following is an elucidation of the reason why so. The emission switching valve 20 is structured such that when switching over the valve member position from the forward flow position to the backward flow position and vice versa, there must be invariably, as shown in FIG. 4, a state where the exhaust pipe 9 communicates with the exhaust pipe 10 in the middle of the switching operation thereof. Thus, in the state where the exhaust pipe 9 communicates with the exhaust pipe 10, the exhaust gas flows along a short path from the exhaust pipe 9 to the exhaust pipe 10 in terms of a flow resistance, and there might be a possibility in which HC and CO contained in the exhaust gas are discharged into the atmospheric air. Such being the case, in order to reduce HC and CO to the greatest possible degree which are to be discharged into the atmospheric air during the operation of switching over the position of the valve member of the emission switching valve 20, the exhaust air/fuel ratio is controlled lean during the operation of switching over the position of the valve member of the emission switching valve 20.

As discussed above, according to the exhaust emission control system in the first embodiment, it is feasible to switch over the flow direction of the exhaust gas flowing through the catalytic converter 30 to the forward flow or backward flow simply by changing over the position of the valve member of only the single emission switching valve 20, which structure is simple enough to attain at low costs.

The drawings in FIGS. 5 through 15 are diagrams illustrating modified examples of the first embodiment of the exhaust emission control system of the internal combustion engine. Each of these modified examples will hereinafter be discussed.

Figure 5:
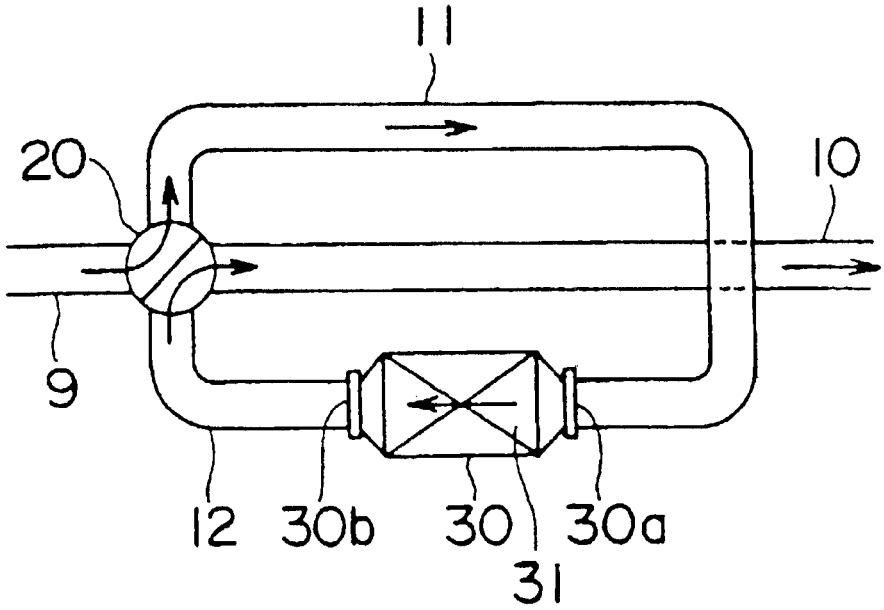
FIG. 5 is a diagram showing the principal components of the exhaust emission control system in a modified example of the first embodiment when the emission switching valve is located in the forward flow position.

<Modified Example Shown in FIG. 5>

According to the above-described mode illustrated in FIG. 1, a pipe length of the exhaust pipe 12 for connecting the emission switching valve 20 to the outlet 30b of the catalytic converter, is set larger than a pipe length of the exhaust pipe 11 for connecting the emission switching valve 20 to the inlet 30a of the catalytic converter. In the modified example illustrated in FIG. 5, however, the pipe length of the exhaust pipe 12 for connecting the emission switching valve 20 to the outlet 30b of the catalytic converter, is set smaller than the pipe length of the exhaust pipe 11 for connecting the emission switching valve 20 to the inlet 30a of the catalytic converter.

Figure 6:
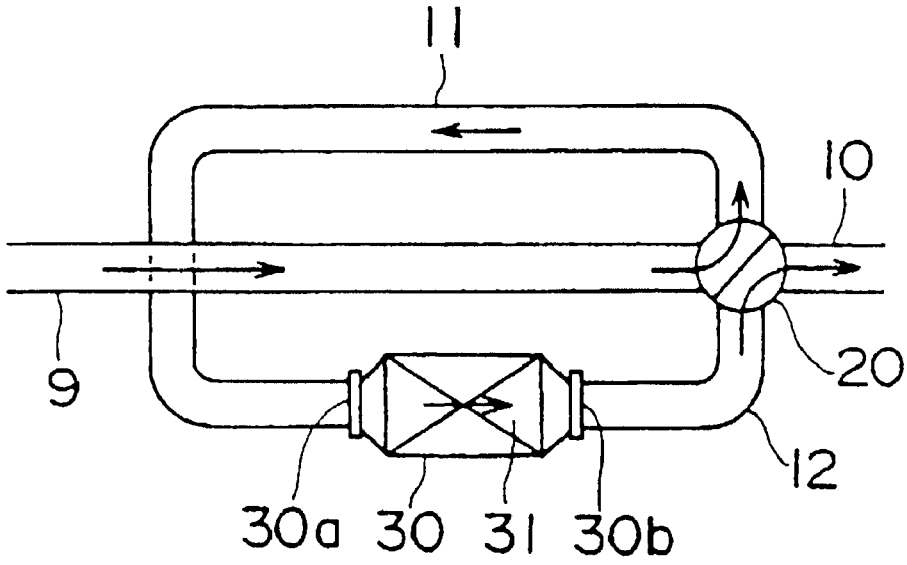
FIG. 6 is a diagram showing the principal components of the exhaust emission control system in the modified example of the first embodiment when the emission switching valve is located in the forward flow position.
Figure 7:
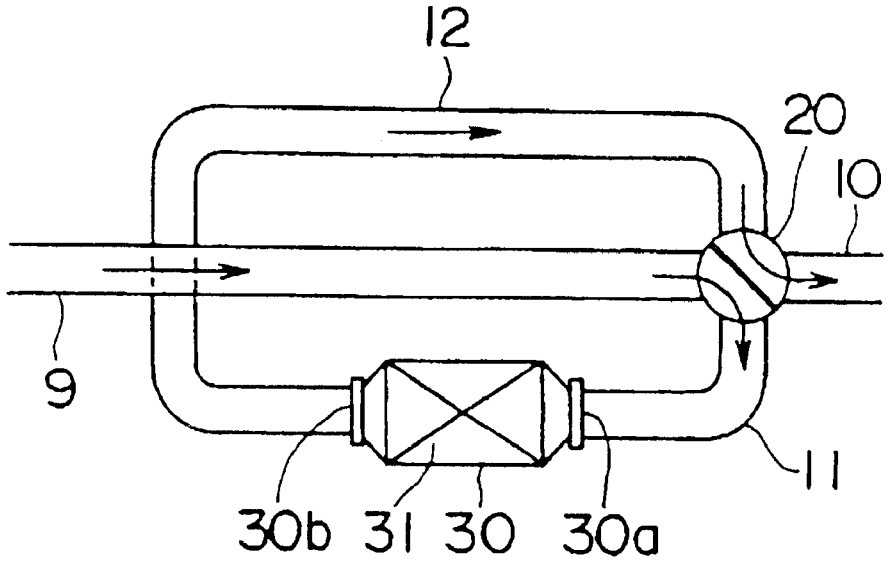
FIG. 7 is a diagram showing the principal components of the exhaust emission control system in the modified example of the first embodiment when the emission switching valve is located in the forward flow position.

<Modified Examples Shown in FIGS. 6 and 7>

Modified examples shown in FIG. 6 and 7 are each slightly different from the example shown in FIG. 1 or 5 in terms of the position in which to dispose the emission switching valve 20. If the emission switching valve 20 is disposed in a position as shown in FIG. 6 or 7, the pipe length of the exhaust pipe 9 for connecting the exhaust manifold 8 to the emission switching valve 20, can be larger than in the example showing in FIG. 1 or 5.

<Modified Examples Shown in FIGS. 8 to 11>

Modified examples shown in FIGS. 8 to 11 each exemplify a case where the emission switching valve 20 in the mode illustrated in FIG. 6, the exhaust pipes 9 to 12 and the catalytic converter 30 are constructed into one unit.

Figure 10:
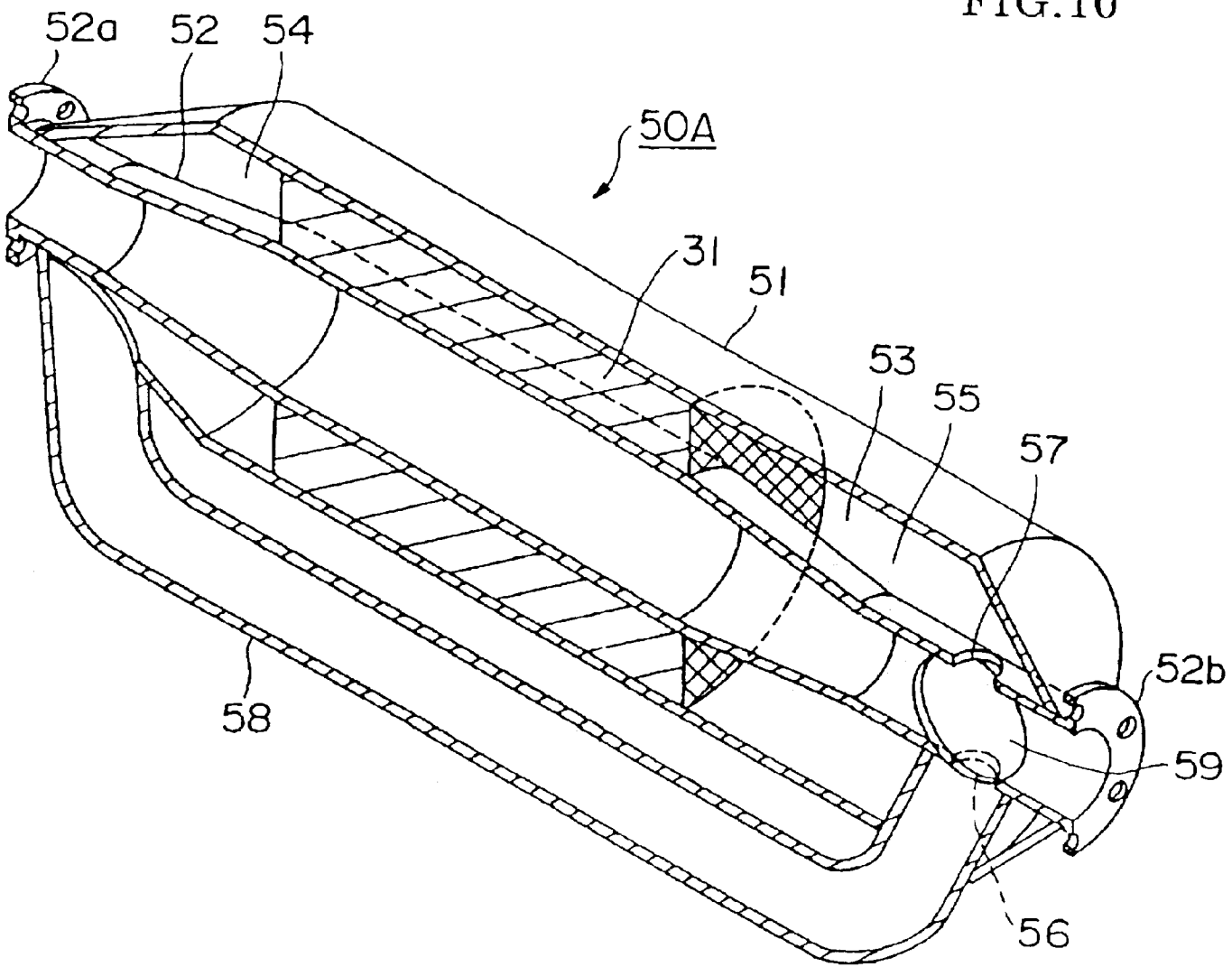
FIG. 10 is a perspective cutaway view of the modified example shown in FIG. 8.

This exhaust gas purifying unit 50A is constructed as follows. As illustrated in FIG. 10, a small-diameter 52 concentrically penetrates a large-diameter casing 51 of which both ends are closed, and is fixed therein. An annular space 53 is formed between the casing 51 and the pipe 52. A $NO_x$ catalyst 31 is disposed approximately in the middle position within the annular space 53 in an axial direction of the casing 51, and the space 53 is sectioned by the $NO_x$ catalyst 31 into two sub-spaces 54, 55.

A flange 52a provided at one end of the pipe 52 protruding from the casing 51 is connected to the exhaust pipe 9 communicating with the exhaust manifold 8. A flange 52b provided at the other end of the pipe 52 protruding from the casing 51 is connected to the exhaust pipe 10 open to the atmospheric air.

At portions, contiguous to one sub-space 55, of the pipe 52, a pair of openings 56, 57 are formed in face-to-face positions with the pipe 52 axial center being at the middle therebetween. One opening 56 is open to one end of a connection pipe 58, and the other end of this connection pipe 58 penetrates the sub-space 55 and the casing 51, and communicates with the other sub-space 54 along the external portion of the casing 51. Further, a valve member 59 is rotatably disposed at a space formed with the openings 56, 57 in the interior of the pipe 52. The valve member 59 is rotated by an actuator 21.

Figure 11:
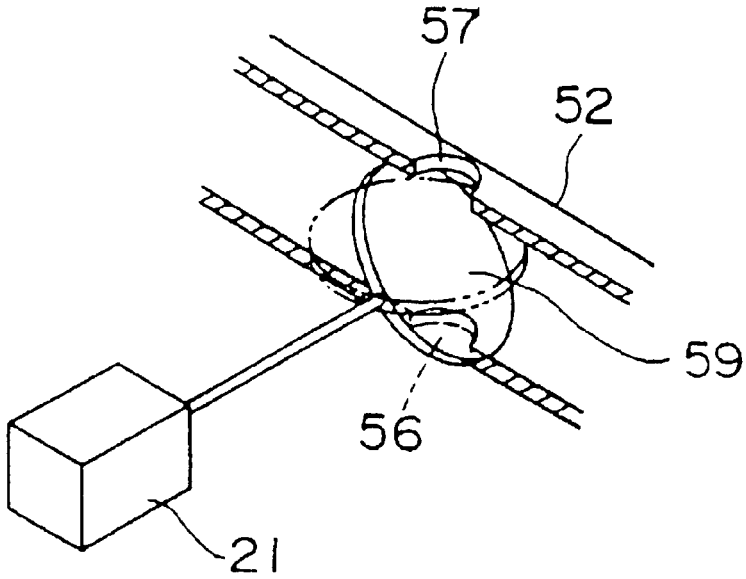
FIG. 11 is a detailed perspective view with a portion cutaway in the vicinity of the valve member in the modified example shown in FIG. 8.

As shown in FIG. 11, the valve member 59 can be held in two closing position for closing the pipe 52. When the valve member 59 is held in the first closing position indicated by the solid line in FIG. 11, a portion of the pipe 52, which is closer to the flange 52a than the valve member 59, is connected via the opening 56 to the connection pipe 58. A portion of the pipe 52, which is closer to the flange 52b than the valve member 59, is connected via the opening 57 to the sub-space 55. In contrast with this, when the valve member 59 is held in the second closing position indicated by the two-dotted line in FIG. 11, the portion of the pipe 52, which is closer to the flange 52a than the valve member 59, is connected via the opening 57 to the sub-space 55. The portion of the pipe 52, which is closer to the flange 52b than the valve member 59, is connected via the opening 56 to the connection pipe 58.

The thus constructed exhaust gas purifying unit 50A has a corresponding relationship with what is constructed in the mode shown in FIG. 6, which is given as below. A valve member 59 of the exhaust gas purifying unit 50A corresponds to the valve member of the emission switching valve 20 in the mode shown in FIG. 6. A portion of the pipe 52 of the exhaust gas purifying unit 50A, which is more proximal to the flange 52a than the valve member 59, corresponds to a part of the exhaust pipe 9 in the mode illustrated in FIG. 6. A portion, which is more proximal to the flange 52b than the valve member 59, corresponds to a part of the exhaust pipe 10 in the mode illustrated in FIG. 6. The sub-space 54 and the connection pipe 58 of the exhaust gas purifying unit 50A correspond to the exhaust pipe 11 in the mode shown in FIG. 6, and the sub-space 55 of the exhaust gas purifying unit 50A corresponds to the exhaust pipe 12 in the mode illustrated in FIG. 6.

Figure 8:
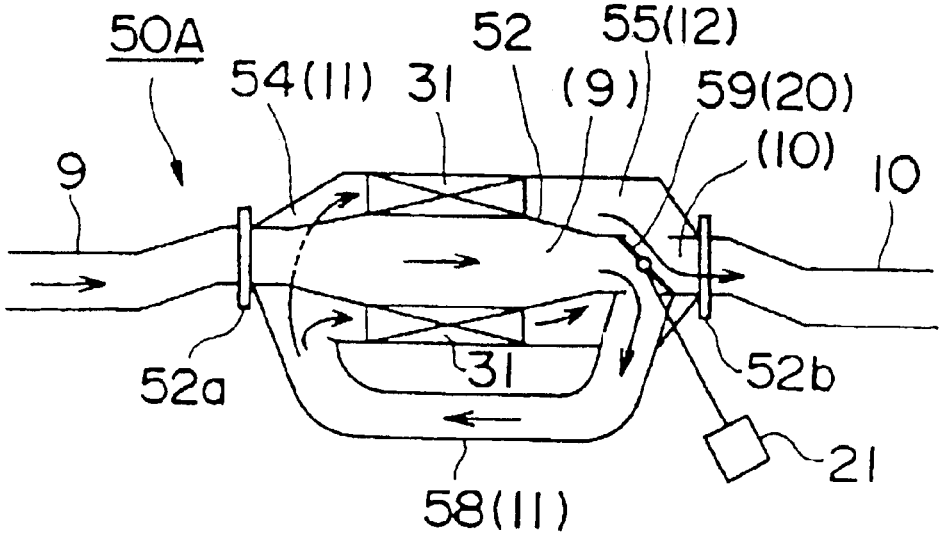
FIG. 8 is a diagram showing the principal components of the exhaust emission control system in the modified example of the first embodiment when the emission switching valve is located in the forward flow position.
Figure 9:
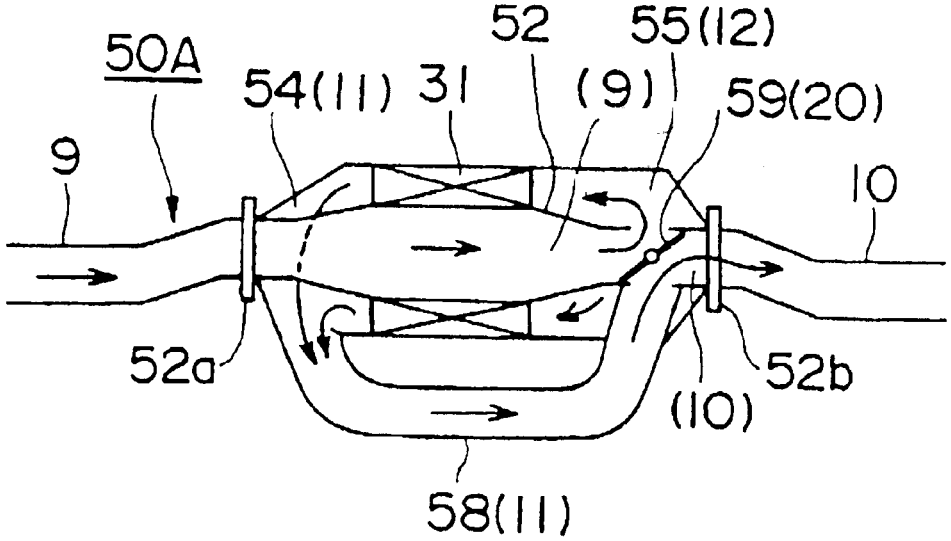
FIG. 9 is a diagram showing the principal components in the modified example shown in FIG. 8 when a valve member is located in the backward flow position.

FIGS. 8 and 9 are sectional views each showing the exhaust gas purifying unit 50A, wherein the bracketed numerals indicate components corresponding to those in FIG. 6. FIG. 8 illustrates a state where the exhaust gas flows through the $NO_x$ catalyst 31 along the forward flow. FIG. 9 illustrates a state where the exhaust gas flows through the $NO_x$ catalyst 31 along the backward flow. Note that in the case of being constructed as exemplified in this exhaust gas purifying unit 50A, its operation as an exhaust emission control system is the same as that in the first embodiment, of which the explanation is therefore omitted.

<Modified Examples Shown in FIGS. 12 through 15>Modified examples shown in FIGS. 12 to 15 each shows a case where the control system is structured in a more compact configuration by eliminating the connection pipe 58 from the exhaust gas purifying unit 50A illustrated in FIGS. 8 through 11. Differences from the mode illustrated in FIGS. 8 to 11 are explained hereinafter, and the same components are marked with the same numerals with an omission of their explanation.

In an exhaust gas purifying unit 50B in this modified example, an annular space formed between the casing 51 and the pipe 52 is sectioned into three spatial areas, i.e., an annular sub-space 60 formed at an end portion on the side of the flange 52a, and sub-spaces 62, 63 each taking a sectionally semicircular shape which are vertically divided into two spatial areas by a partition plate 61 extending from the casing 51 to the pipe 52 and fixed thereto.

Figure 14:
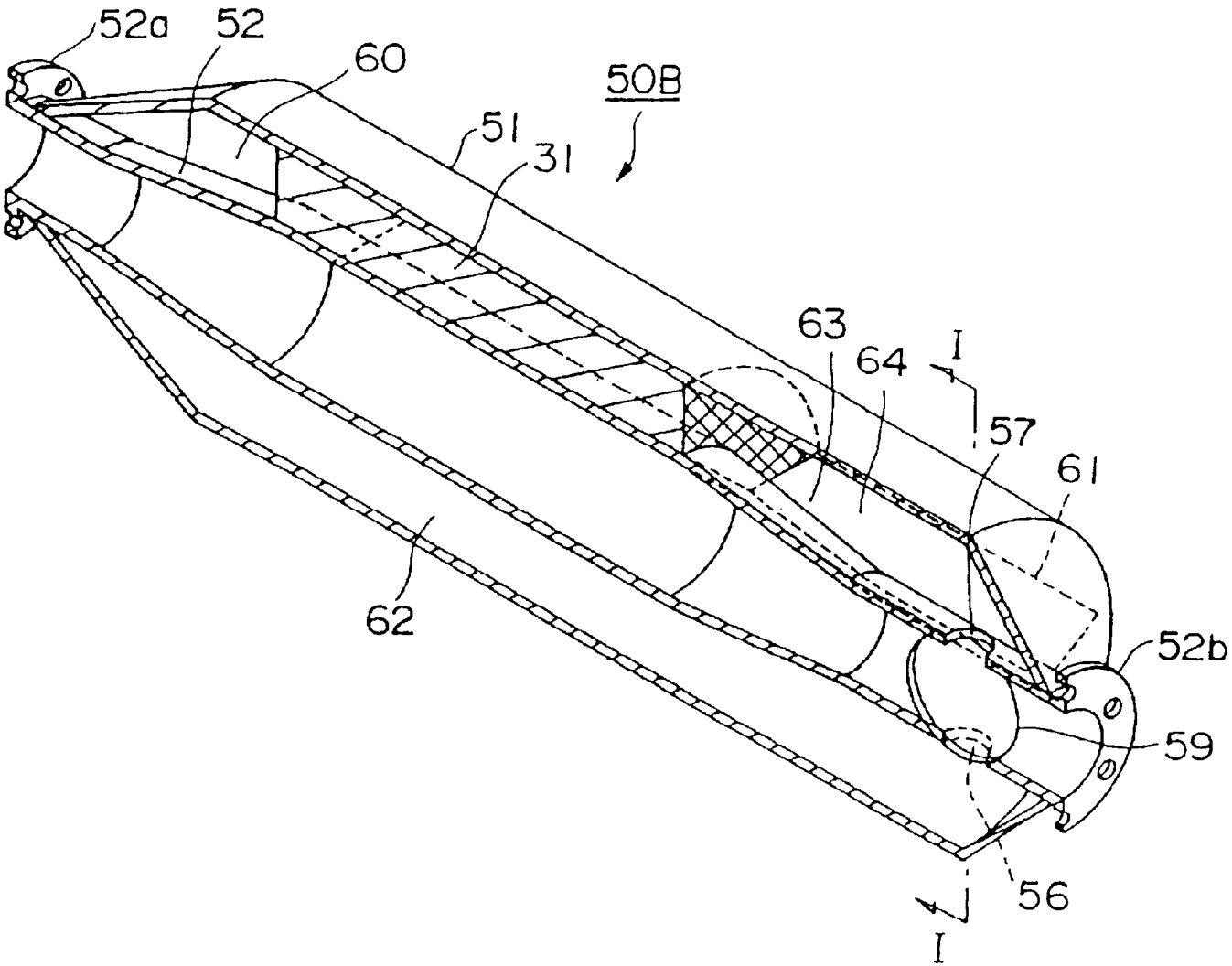
FIG. 14 is a perspective cutaway view of the modified example shown in FIG. 12.
Figure 15:
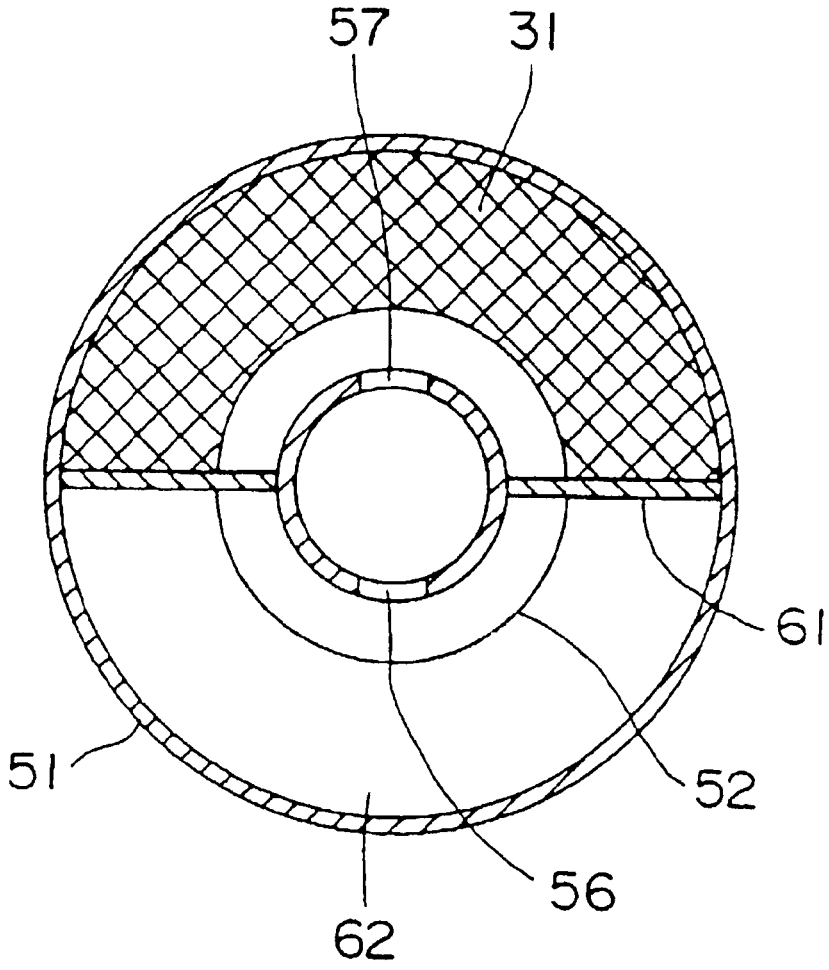
FIG. 15 is a sectional view taken in the arrow direction I—I in FIG. 14.

Then, referring to FIG. 14, the $NO_x$ catalyst 31 is disposed, in close proximity to the sub-space 60, within the semicircular sub-space 63 positioned upward. The sub-space 64 is formed in an area closer to the flange 52b than the $NO_x$ catalyst 31 within the subspace 63, and the opening 57 of the pipe 52 communicates with the sub-space 64. On the other hand, referring again to FIG. 14, the semicircular sub-space 62 positioned downward communicates with the annular sub-space 60 and with the opening 56 of the pipe 52.

A positional relationship between the valve member 59 and the openings 56, 57, and two closing positions of the valve member 59 for closing the pipe 52, are absolutely the same as those in the exhaust gas purifying unit 50A illustrated in FIGS. 8 to 11. Then, explaining the case of the exhaust gas purifying unit 50B in the present modified example with reference to FIG. 11, when the valve member 59 is held in the first closing position indicated by the solid line in FIG. 11, the portion of the pipe 52, which is closer to the flange 52a than the valve member 59, is connected via the opening 56 to the downward semicircular sub-space 62. The portion of the pipe 52, which is closer to the flange 52b than the valve member 59, is connected via the opening 57 to the sub-space 64. In contrast with this, when the valve member 59 is held in the second closing position indicated by the two-dotted line in FIG. 11, the portion of the pipe 52, which is closer to the flange 52a than the valve member 59, is connected via the opening 57 to the sub-space 64. The portion of the pipe 52, which is closer to the flange 52b than the valve member 59, is connected via the opening 56 to the downward semicircular sub-space 62.

The thus constructed exhaust gas purifying unit 50B has a corresponding relationship with what is constructed in the mode shown in FIG. 6, which is given as below. A valve member 59 of the exhaust gas purifying unit 50B corresponds to the valve member of the emission switching valve 20 in the mode shown in FIG. 6. The portion of the pipe 52 of the exhaust gas purifying unit 50B, which is more proximal to the flange 52a than the valve member 59, corresponds to a part of the exhaust pipe 9 in the mode illustrated in FIG. 6. The portion, which is more proximal to the flange 52b than the valve member 59, corresponds to a part of the exhaust pipe 10 in the mode illustrated in FIG. 6. The downward semicircular sub-space 62 and the annular sub-space 60 of the exhaust gas purifying unit 50B correspond to the exhaust pipe 11 in the mode shown in FIG. 6, and the sub-space 64 of the exhaust gas purifying unit 50B corresponds to the exhaust pipe 12 in the mode illustrated in FIG. 6.

Figure 12:
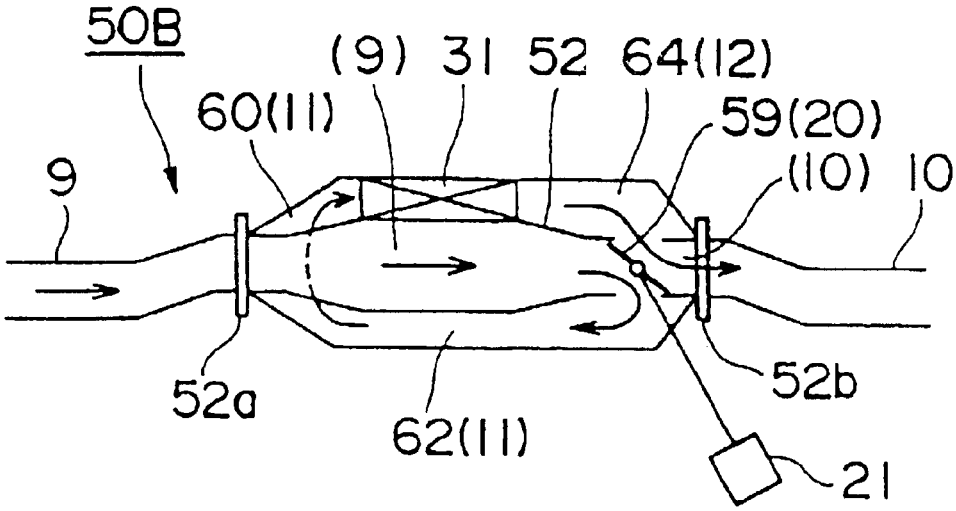
FIG. 12 is a diagram showing the principal components of the exhaust emission control system in the modified example of the first embodiment when the valve member is located in the forward flow position.
Figure 13:
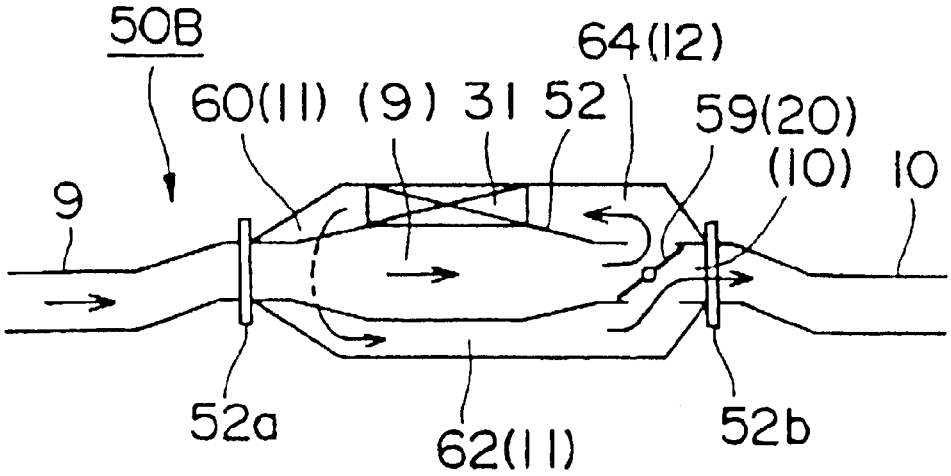
FIG. 13 is a diagram showing the principal components in the modified example shown in FIG. 12 when the valve member is located in the backward flow position.

FIGS. 12 and 13 are sectional views each showing the exhaust gas purifying unit 50B, wherein the bracketed numerals indicate components corresponding to those in FIG. 6. FIG. 12 illustrates a state where the exhaust gas flows through the $NO_x$ catalyst 31 along the forward flow. FIG. 13 illustrates a state where the exhaust gas flows through the $NO_x$ catalyst 31 along the backward flow. Note that in the case of being constructed as exemplified in this exhaust gas purifying unit 50b, its operation as an exhaust emission control system is the same as that in the first embodiment, of which the explanation is therefore omitted.

Second Embodiment

Figure 16:
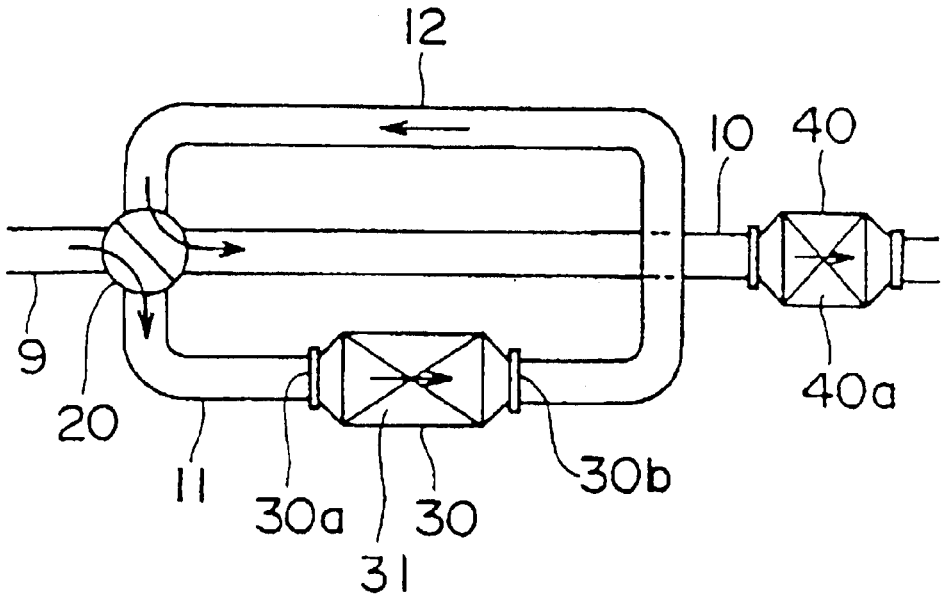
FIG. 16 is a diagram showing the principal components of the exhaust emission control system of the internal combustion engine in a second embodiment of the present invention when the emission switching valve is located in the forward flow position.

Next, a second embodiment of the exhaust emission control system of the internal combustion engine according to the present invention, will be described with reference to FIG. 16. FIG. 16 is a view of the principal components of the exhaust emission control system in the second embodiment, showing a state where the valve member of the exhaust switching member 20 is located in the forward flow position. A difference of the second embodiment from the first embodiment is only such a point that a sweeper 40 is provided midways of the exhaust pipe 10. The sweeper 40 is stored inside with a catalyst (e.g., a selective reduction type $NO_x$ catalyst for reducing or dissolving $NO_x$ under an existence of hydro carbon in an over-oxygen atmosphere) 40a for adsorbing oxygen when the air/fuel ratio of the exhaust gas is lean, and purging the exhaust gas of HC and CO with the oxygen adsorbed thereto when the air/fuel ratio of the exhaust gas is stoichiometric or rich.

As discussed above, the emission switching valve 20 presents a state where the exhaust pipe 9 is invariably connected to the exhaust pipe 10 in the middle of the operation of switching over the position of the valve member thereof, during which the exhaust gas the exhaust gas takes a short path from the exhaust pipe 9 to the exhaust pipe 10, and there might be such a possibility that HC and CO contained in the exhaust gas are discharged into the atmospheric air. It is required that this be given an attention in the case of the operation of switching over the position of the valve member of the emission switching valve 20 when the air/fuel ratio of the exhaust gas is stoichiometric or rich. A contrivance coping with this is just the sweeper 40 provided in the second embodiment.

With the sweeper 40 installed at the exhaust pipe 10, the catalyst 40a of the sweeper 40 adsorbs the oxygen when the engine 1 is operated at the lean air/fuel ratio. Then, the engine 1 comes into the stoichiometric ratio or rich air/fuel ratio operation, and the position of the valve member of the emission switching valve 20 is thereby switched over. For the duration of this switching operation, the exhaust gas exhibiting the stoichiometric ratio or rich air/fuel ratio takes the short path to the exhaust pipe 10, at which time HC and CO contained in the exhaust gas are oxidized by the oxygen adsorbed to the catalyst 40a of the sweeper 40, and the exhaust gas is thus purged of HC and CO and discharged into the atmospheric air.

Figure 17:
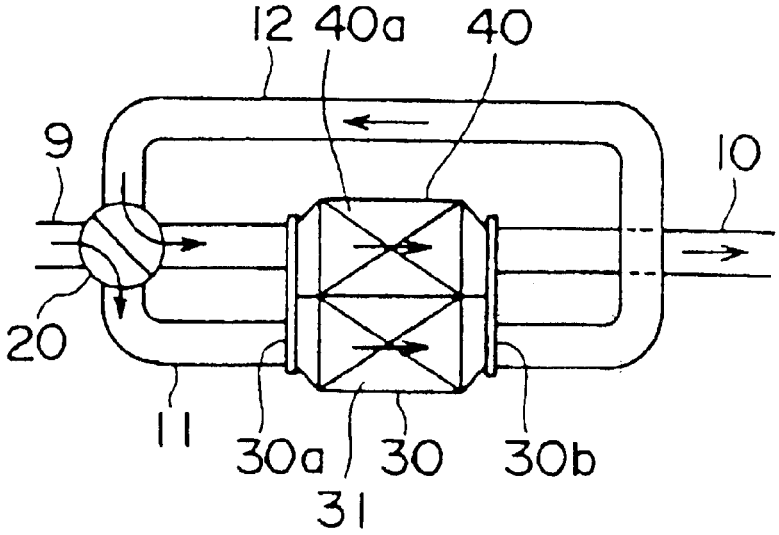
FIG. 17 is a diagram showing the principal components of the exhaust emission control system in a modified example of the second embodiment when the emission switching valve is located in the forward flow position.

FIGS. 17 [and] *to* 19 are diagrams each showing a modified example of the second embodiment of the exhaust emission control system. The respective modified examples will hereinafter be explained.

<Modified Example Shown in FIG. 17>

As shown in FIG. 17, the catalytic converter 30 is integrated with the sweeper 40 so that the exhaust gas is unable to flow between the converter 30 and the sweeper 40 but the heat can be transmitted therebetween. With this construction, a temperature of the catalyst 40a of the sweeper 40 can be kept as high as possible, which is advantageous in terms of activating the catalyst 40a of the sweeper 40. Incidentally, FIG. 17 shows a state where the valve member of the emission switching valve 20 is located in the forward flow position.

Figure 18:
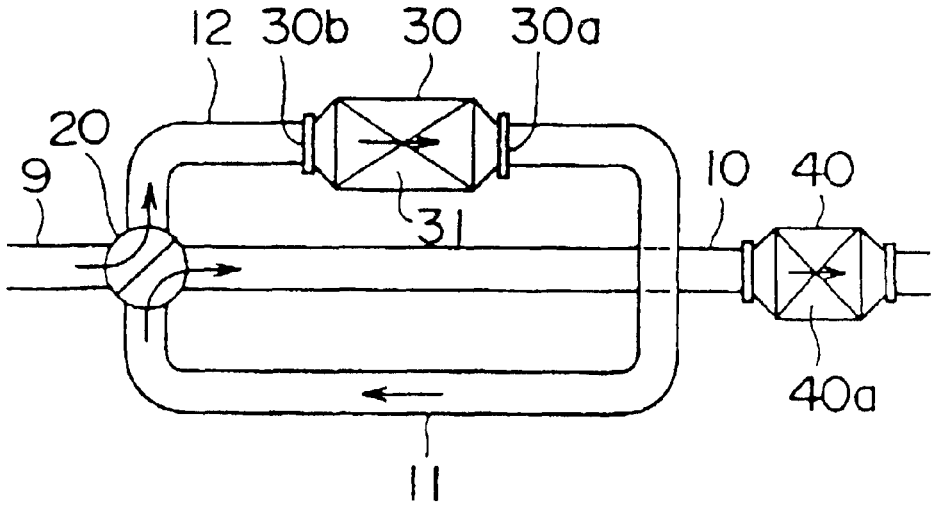
FIG. 18 is a diagram showing the principal components of the exhaust emission control system in the modified example of the second embodiment when the emission switching valve is located in the backward flow position.

*<Modified Example Shown in FIG. 18>*

*FIG. 18 shows an example of disposing the catalytic converter 30 with its outlet 30b positioned to be close to the exhaust switching valve 20, in order that the length of the exhaust pipe 12 connecting the exhaust switching valve 20 with the outlet 30b of the catalytic converter 30 is made as short as possible. With this arrangement, when the exhaust gas is flowed backward towards the catalytic converter 30 by switching over the valve body of the exhaust switching 20- to the backward flow position, as shown in FIG. 18, the exhaust flow length from the engine 1 to the catalytic converter 30 can be made shorter, thereby a increase of the temperature of the* $NO_x$ *catalyst 31 of the catalytic converter 30 can be promoted at the time of the* $SO_x$ *releasing process, and the catalytic temperature can also be raised, thereby the release of* $SO_x$ *is prompted.*

Figure 19:
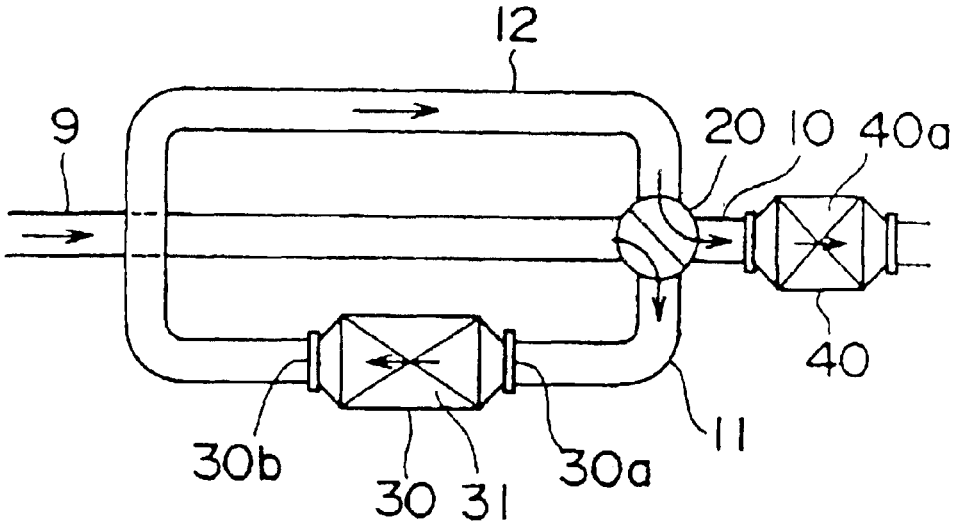
FIG. 19 is a diagram showing the principal components of the exhaust emission control system in another modified example of the second embodiment when the emission switching valve is located in the forward flow position.

<Modified Example Shown in FIG. 19>

FIG. 19 shows an example in which the emission switching valve 20 is disposed in close proximity to the sweeper 40 so as to elongate the flow path extending from the engine 1 to the emission switching valve 20 for the purpose of relieving a thermal load upon the emission switching valve 20. This has an advantage in terms of a durability of the emission switching valve 20. Note that FIG. 19 illustrates a state in which the valve member of the emission switching valve 20 is located in the forward flow position.

Third Embodiment

Figure 20:
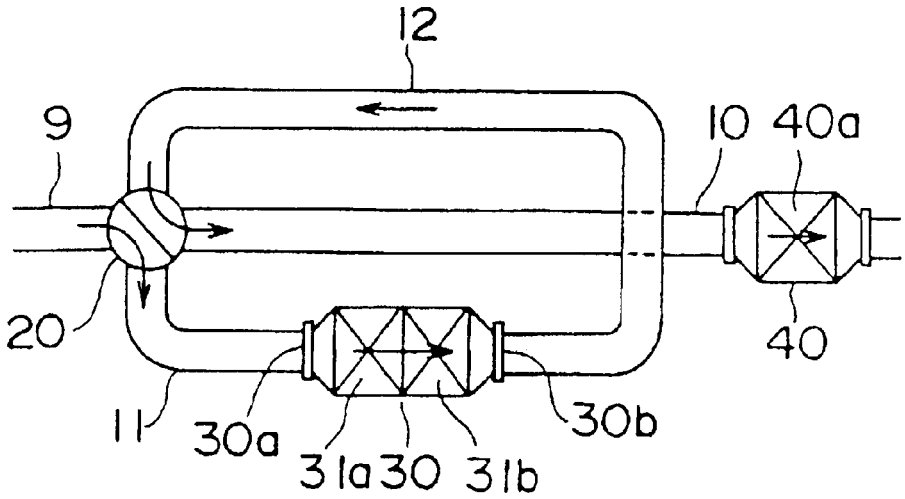
FIG. 20 is a diagram showing the principal components of the exhaust emission control system in a third embodiment of the present invention when the emission switching valve is located in the forward flow position.

Next, a third embodiment of the exhaust emission control system of the internal combustion engine according to the present invention will be discussed referring to FIG. 2. FIG. 20 is a diagram showing the principal components of the exhaust emission control system in the third embodiment. A difference of the third embodiment from the second embodiment illustrated in FIG. 16 is a $NO_x$ catalyst 31 accommodated in the catalytic converter 30.

To describe it more specifically, a $NO_x$ catalyst 31a having high $SO_x$ absorbing power is accommodated on the side of the inlet 30a of the catalytic converter 30, and a $NO_x$ catalyst 31b having comparatively low $SO_x$ absorbing power is accommodated on the side of the outlet 30b thereof. With this arrangement, when the exhaust gas flows through the catalytic converter 30 along the forward flow as shown in FIG. 20, $SO_x$ in the exhaust gas is absorbed only on the side of the inlet 30a of the catalytic converter 30 and is desorbed at a high efficiency when executing the $SO_x$ desorbing process in which the exhaust gas flows backward through the catalytic converter 30.

Note that what can be exemplified as a method of providing the $NO_x$ catalyst 31a having the high $SO_x$ absorbing power on the side of the inlet 30a of the catalytic converter 30 and the $NO_x$ catalyst 31b having the comparatively low $SO_x$ absorbing power on the side of the outlet 30b thereof, may be a method of bearing a larger amount of occlusion substance on the side of the inlet 30a than on the side of the outlet 30b, or bearing the occlusion substance having stronger occluding power on the side of the inlet 30a than on the side of the outlet 30b.

Figure 21:
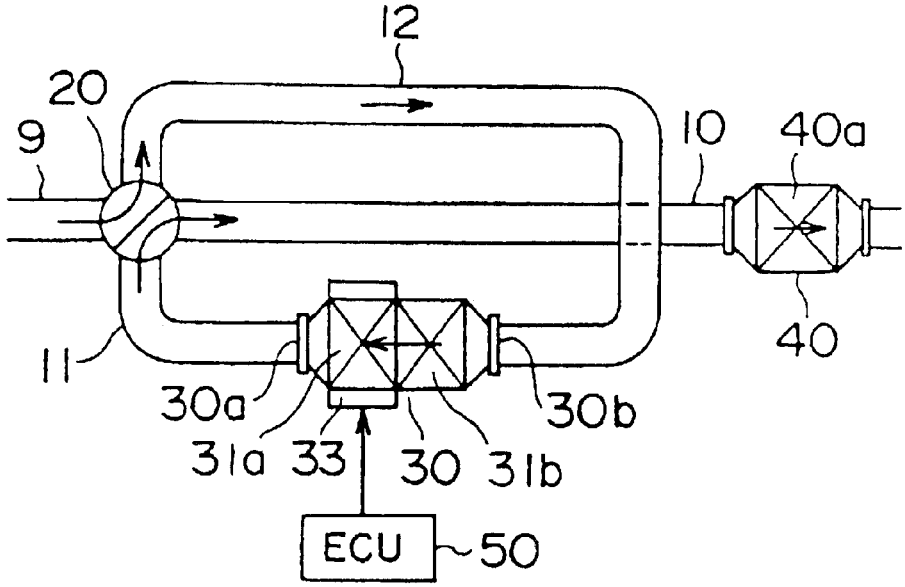
FIG. 21 is a diagram showing the principal components of the exhaust emission control system in a modified example of the third embodiment when the emission switching valve is located in the backward flow position.

FIG. 21 is a diagram showing a modified example of the third embodiment of the exhaust emission control system. In this modified example, an electric heater 33 for heating the $NO_x$ catalyst 31a exhibiting the high $SO_x$ absorbing power, is attached to an outer peripheral portion of the catalytic converter 30 on the inlet 30a side. As shown in FIG. 21, when the exhaust gas flows backward through the catalytic converter 30 to desorb $SO_x$ out of the $NO_x$ catalyst 31a, the ECU 100 performs control to switch ON the electric heater 33. When in the $SO_x$ desorbing process, the heater 33 forcibly heats up the $NO_x$ catalyst 31a to increase a catalyst temperature, thereby speeding up the desorption of $SO_x$. It is to be noted that the element for heating up the $NO_x$ catalyst 31a is not limited to the electric heater.

Fourth Embodiment

Figure 22:
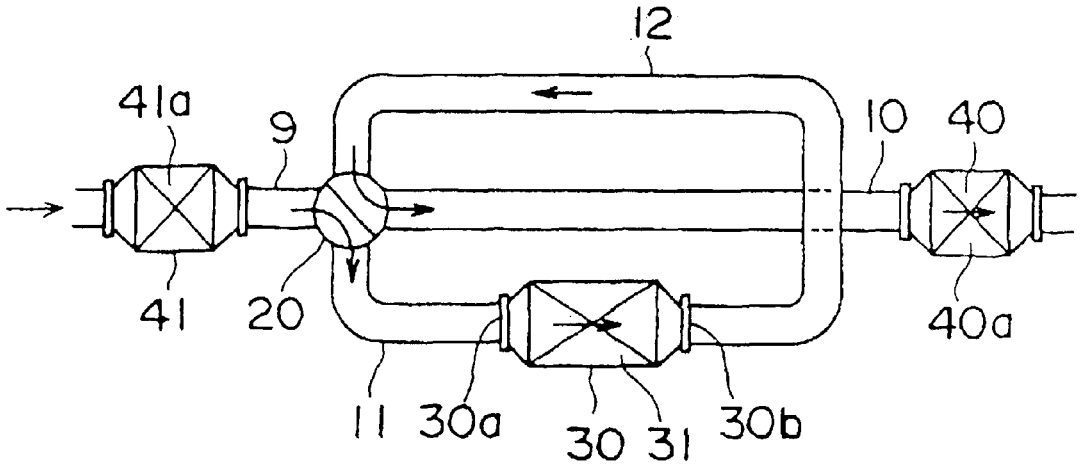
FIG. 22 is a diagram showing the principal components of the exhaust emission control system of the present invention in a fourth embodiment of the present invention when the emission switching valve is located in the forward flow position.
Figure 23:
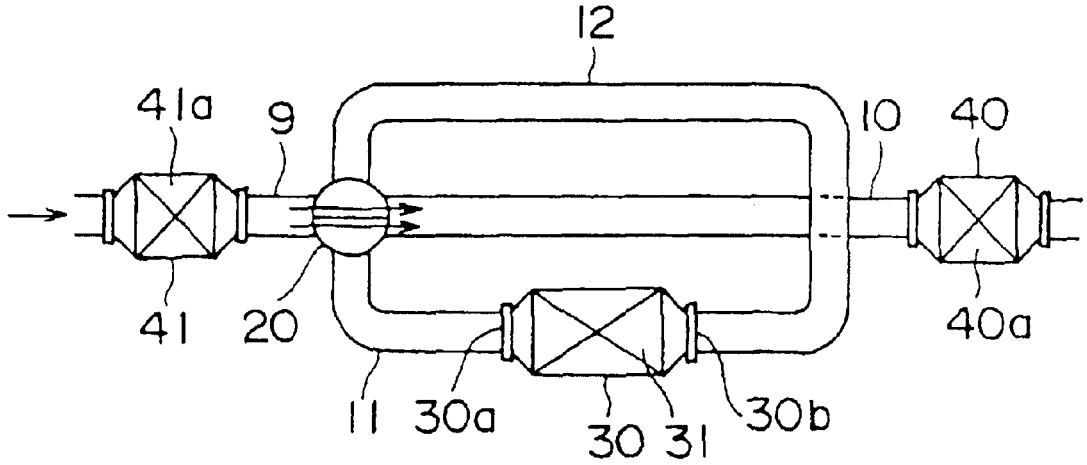
FIG. 23 is a diagram showing the principal components of the exhaust emission control system in the fourth embodiment when the emission switching valve is located in the neutral position between the forward flow position and the backward flow position.

Next, a fourth embodiment of the exhaust emission control system of the internal combustion engine according to the present invention will be discussed with reference to FIGS. 22 and 23. FIG. 22 is a diagram showing the principal components of the exhaust emission control system in the fourth embodiment. A difference of the fourth embodiment from the second embodiment illustrated in FIG. 16 is only such a point that a start catalyst (another catalyst) unit 41 is provided midways of the exhaust pipe 9.

The start catalyst unit 41 is stored inside with a catalyst 41a such as a three-way catalyst having a high activation.

Generally, the start catalyst unit is installed for raising the catalyst temperature as well as for speeding up the rise in the temperature of the posterior catalyst (which is the $NO_x$ catalyst 31 (of the catalytic converter 30 in the fourth embodiment) when starting up the engine. In the fourth embodiment, in addition to this operation, when the exhaust gas flows along the forward flow through the catalytic converter 30 as shown in FIG. 22, the reducing component in the exhaust gas is dissipated in the start catalyst unit 41, and therefore the reductive gas component in the exhaust gas flowing into the catalytic converter 30, is decreased. As a result, $NO_x$ and $SO_x$ are absorbed higher on the side of the inlet 30a to the $NO_x$ catalyst 31 of the catalytic converter 30. This facilitates the desorption of $NO_x$ and $SO_x$ from the $NO_x$ catalyst 31 when the exhaust gas flows backward through the catalytic converter 30.

Incidentally, it is preferable that the start catalyst unit be provided in a location (i.e., a position in which to take a short distance of the flow path from the engine 1) closer to the intake manifold.

Further, when installing the start catalyst unit 41, the $SO_x$ desorbing process from the $NO_x$ catalyst 31 of the catalytic converter 30 is executed by flowing through the catalytic converter 30 the exhaust gas having the stoichiometric ratio or rich air/fuel ratio. Thereupon, at an early stage of the $SO_x$ desorbing process, $SO_x$ is desorbed also from the catalyst 41a of the start catalyst unit 41. It is not preferable that the $SO_x$ desorbed out of the start catalyst unit 41 flows to the catalytic converter 30. Such being the case, in accordance with the fourth embodiment, when switching over the position of the valve member of the emission switching valve 20 in order to execute the $SO_x$ desorbing process, what should be done is not that the valve member of the emission switching valve 20 is immediately switched over from the forward flow position to the backward flow position, but that the ECU 100 controls the actuator 21 in order to let the exhaust gas take a short path from the exhaust pipe 9 to the exhaust pipe 10 by holding the valve member of the emission switching valve 20 in a neutral position as shown in FIG. 23 for a predetermined time since the exhaust gas exhibiting the stoichiometric ratio or rich air/fuel ratio started flowing to the start catalyst unit 41. Herein, if the predetermined time is set to a time enough to complete the desorption of $SO_x$ from the catalyst 41a for the start catalyst unit 41, it sis feasible to hinder the inflow, into the catalytic converter 30, of $SO_x$ desorbed from the start catalyst unit 41. Meanwhile, the exhaust gas containing $SO_x$ desorbed from the start unit 41 is purified by the sweeper 40. Then, after the predetermined time has elapsed, the valve member of the emission switching valve 20 is switched over to the backward flow position.

Fifth Embodiment

Figure 24:
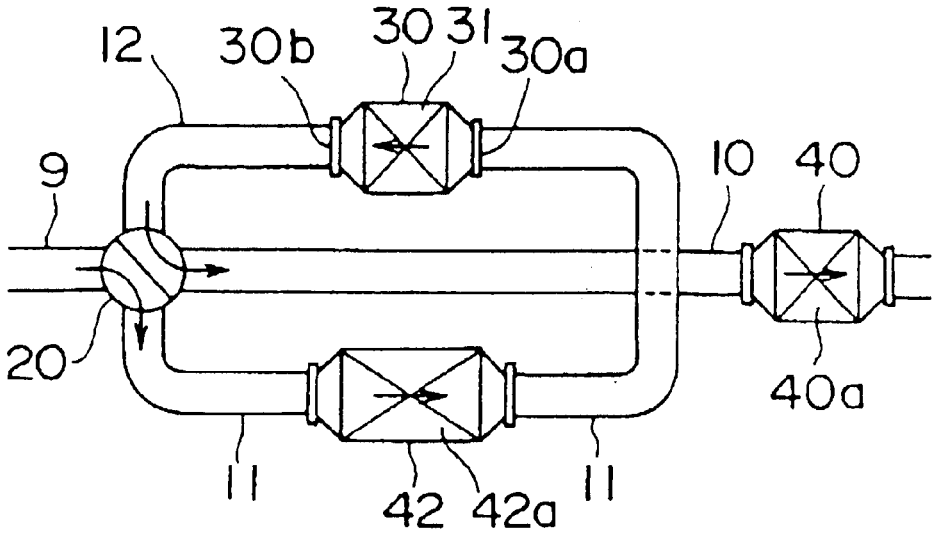
FIG. 24 is a diagram showing the principal components of the exhaust emission control system in a fifth embodiment of the present invention when the emission switching valve is located in the forward flow position.

Next, a fifth embodiment of the exhaust emission control system of the internal combustion engine according to the present invention will be discussed with reference to FIG. 24. FIG. 24 is a diagram showing the principal components of the exhaust emission control system in the fifth embodiment. A difference of the fifth embodiment from the modified example of the second embodiment which is illustrated in FIG. 18 is only such a point that an S-trap 42 is provided midways of the exhaust pipe 11.

The S-trap 42 is stored inside with an $SO_x$ absorbing agent 42a. The $SO_x$ absorbing agent 42a absorbs $SO_x$ when the air/fuel ratio of the inflow gas is lean, and, when a concentration of the oxygen of the inflow gas is low, desorbs $SO_x$ absorbed. What can be exemplified as the $SO_x$ absorbing agent 42a may be the three-way catalyst, the $NO_x$ catalyst exhibiting the high $SO_x$ absorbing power among the $NO_x$ storage-reduction catalyst, and also an agent of zeolite borne with platinum.

If the S-trap 42 is thus provided, as shown in FIG. 24, the S-trap 42 is disposed more upstream than the catalytic converter 30 when the valve member of the emission switching valve 20 is set in the forward flow position (i.e., when absorbing $NO_x$). Therefore, $SO_x$ contained in the exhaust gas is adsorbed to the $SO_x$ absorbing agent 42a in the S-trap 42, and can be thereby hindered from flowing into the catalytic converter 30, whereby the $NO_x$ catalyst 31 of the catalytic converter 30 can be prevented from the $SO_x$ poisoning. In the fifth embodiment, the $SO_x$ absorbing agent 42a in the S-trap 42 constitutes an exhaust gas purifying element.

In the fifth embodiment also, the exhaust gas can be flowed back to the S-trap 42 by switching over the valve member of the emission switching valve 20 to the backward flow position. At this time, the exhaust gas, of which the air/fuel ratio is stoichiometric or rich, is flowed, thereby making it possible to desorb $SO_x$ from the $SO_x$ absorbing agent 42a in the S-trap 42 and discharge it in the form of $SO_2$. Further, on this occasion, the ECU 100 calculates a target air/fuel ratio of the exhaust gas flowing into the S-trap 42, a target floor temperature of the S-trap 42 and, if the reducing agent adding device is provided, a target reducing agent quantity, which are optimal to the $SO_x$ desorption from the $SO_x$ absorbing agent in the S-trap 42. Then, ECU 100 controls the engine 1 and the reducing agent adding device etc to attain those target values, and it is preferable that the $SO_x$ desorbing process be thus executed.

Further, for increasing the floor temperature under the control of the floor temperature of the S-trap 42, it is also feasible to raise a temperature of the S-trap 42 by increasing the concentration of the oxygen in the exhaust gas flowing into the catalytic converter 30 and by raising an exhaust gas temperature with a heat emission due to oxidation through the $NO_x$ catalyst 31 of the catalytic converter 30.

Figure 25:
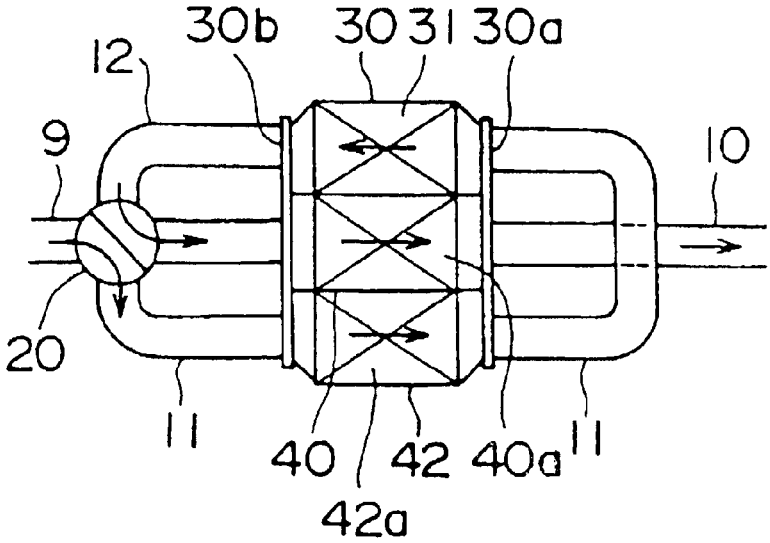
FIG. 25 is a diagram showing the principal components of the exhaust emission control system in a modified example of the fifth embodiment when the emission switching valve is located in the forward flow position.

FIG. 25 is a diagram showing a modified example of the above-described fifth embodiment of the exhaust emission control system. The catalytic converter 30, the sweeper 40 and the S-trap 42 are integrated into one unit so that the exhaust gas is not permitted to flow to each other but the heat can be transmitted to each other. With this configuration, the reaction heat in the catalyst can be effectively utilized, which is advantageous to every catalyst in terms of the activation. Incidentally, FIG. 25 shows a state where the valve member of the emission switching valve 20 is located in the forward flow position.

Note that a timing at which to switch over the position of the valve member of the emission switching valve 20 or of the valve member 59, i.e., a timing of switching over the exhaust gas flowing through the exhaust gas purifying element to the forward flow and the backward flow, is not limited to the timings explained in the first through fifth embodiments discussed above.

[Fir] *For* example, if the exhaust gas purifying element is defined as the $NO_x$ catalyst 31, the $NO_x$ catalyst 31 has a property of easily absorbing $SO_x$ and $SO_x$ when the exhaust gas temperature lowers and desorbing them when the exhaust gas temperature rises. Hence, the emission switching valve 20 or the valve member 59 may be so controlled as to be switched over so that when the exhaust gas temperature lowers, the position of the valve member of the emission switching valve 20 or of the valve member 59 is set to the forward flow position, and the exhaust gas flows along the forward flow through the $NO_x$ catalyst 31, and so that when the exhaust gas temperature rises, the position of the valve member of the emission switching valve 20 or of the valve member 59 is set to the backward flow position, and the exhaust gas flows along the backward flow through the $NO_x$ catalyst 31.

Moreover, depending on a deposit of which the exhaust gas purifying element should be purged of, the deposit to be eliminated is dissolved and desorbed as in the case of $H_2SO_4$ when the floor temperature of the exhaust gas purifying element becomes a predetermined temperature (e.g., 40° C.) or over, in which case when the floor temperature is lower than the predetermined temperature, the position of the valve member of the emission switching valve 20 or of the valve member 59 is set to the forward flow position, whereby the exhaust gas flows along the forward flow through the purifying element. When the floor temperature is over the predetermined temperature, the position of the valve member of the emission switching valve 20 or of the valve member 59 is switched over to the backward flow position, whereby the exhaust gas flows along the backward flow through the purifying element. The position of the valve member of the emission switching valve 20 or of the valve member 59 may be so controlled as to be switched over in this manner.

Sixth Embodiment

Next, a sixth embodiment of the exhaust emission control system of the internal combustion engine according to the present invention will be discussed with reference to FIGS. 26 and 28.

In the first through fifth embodiments discussed above, when the exhaust gas flows through the catalytic converter 30 or the S-trap 42, $SO_x$ contained in the exhaust gas is absorbed to the area close to the exhaust gas flow inlet of the catalytic converter 30 or the S-trap 42. Therefore, in the case of desorbing $SO_x$ from the catalytic converter 30 or the S-trap 42, when the exhaust gas exhibiting the stoichiometric ratio or rich air/fuel ratio in the opposite direction than in the direction when executing the absorbing process, $SO_x$ desorbed from the $NO_x$ catalyst 31 or from the $SO_x$ absorbing agent 42a can be discharged at a shorter distance from the catalytic converter 30 or the S-trap 42, and the $SO_x$ desorbing process can be executed at a higher efficiency. Based on this notion, the position of the valve member of the emission switching valve is so controlled as to be switched over.

By contrast, according to the sixth embodiment, when switching over the position of the valve member of the emission switching valve 20, there might change a length of the flow path till the exhaust gas flows into the catalytic converter 30. Giving attention to this point, a position of a valve member of an emission switching valve 30 is so controlled as to be switched over in relation to a temperature characteristic of the $NO_x$ catalyst 31.

Figure 26:
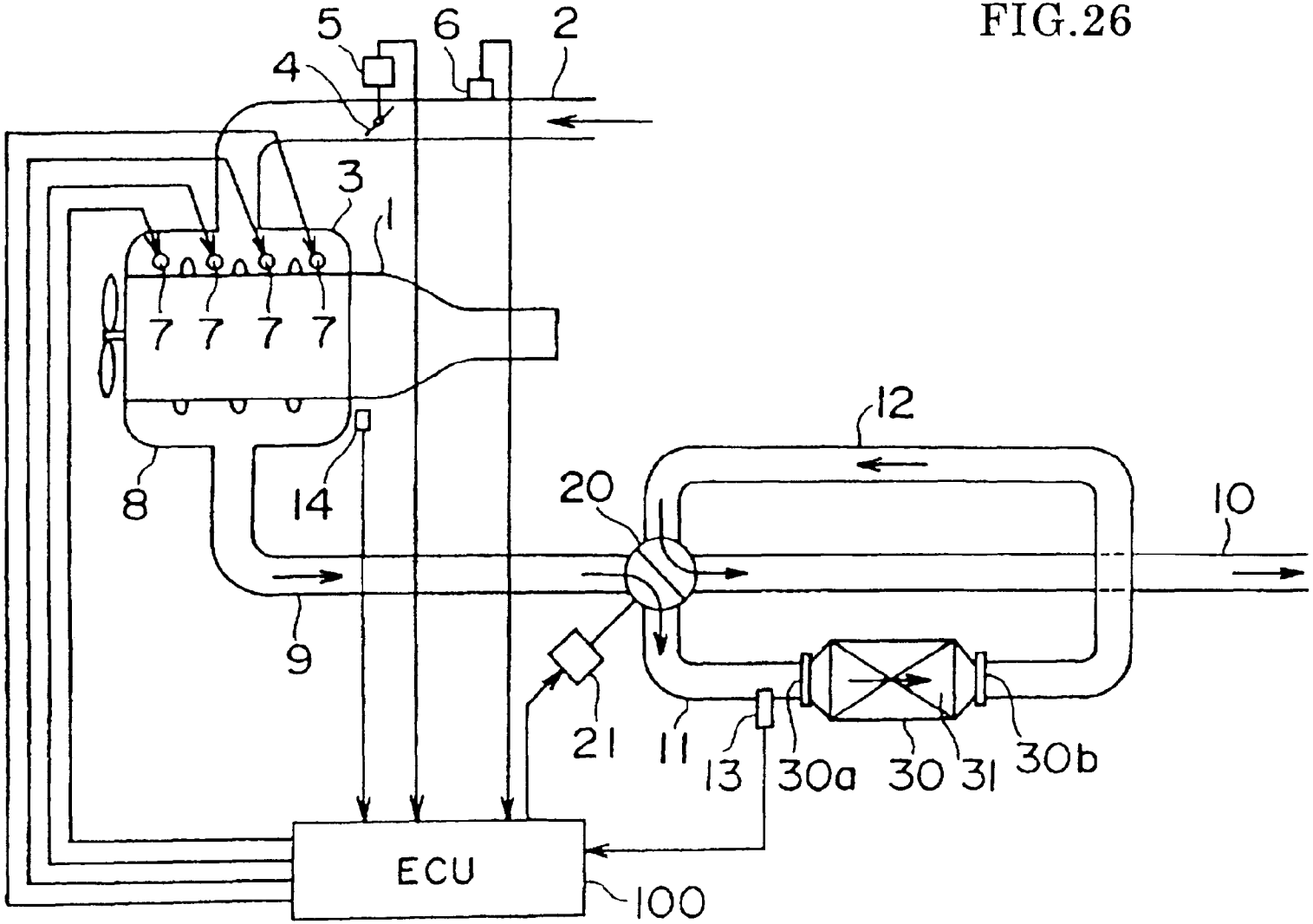
FIG. 26 is a schematic diagram showing a construction of the exhaust emission control system in a sixth embodiment of the present invention when the emission switching valve is located in the forward flow position.

FIG. 26 is a diagram schematically illustrating a construction of the exhaust emission control system in the sixth embodiment. The construction of this control system is, however, absolutely the same as that of the exhaust emission control system in the first embodiment shown in FIG. 1, of which the explanation is therefore omitted, and the operation in the sixth embodiment will hereinafter be described. Note that the $NO_x$ catalyst 31 constitutes an exhaust gas purifying element also in the sixth embodiment.

Figure 27:
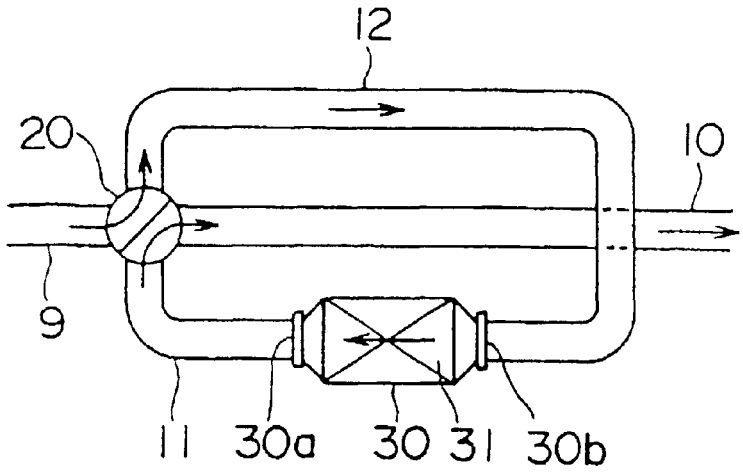
FIG. 27 is a diagram showing the principal components of the exhaust emission control system in sixth embodiment when the emission switching valve is located in the backward flow position.

FIG. 26 shows a state when the valve member of the emission switching valve 20 is located in the forward flow position. FIG. 27 shows a state when the valve member of the emission switching valve 20 is located in the backward flow position. It can be understood from FIGS. 26 and 27 that the length of the flow path till the exhaust gas flows into the catalytic converter 30 is smaller when the valve member of the emission switching valve 20 is located in the forward flow position than when located in the backward flow position.

Now, upon an inflow of the exhaust gas through the exhaust pipe, the temperature of the exhaust gas decreases due to a radiating phenomenon, and the decrease in the temperature becomes larger as the length of the flow path increases. Accordingly, the decrease in the exhaust gas temperature is larger till the exhaust gas flows into the catalytic converter 30 when the valve member of the emission switching valve 20 is located in the backward flow position than when located in the forward flow position.

Figure 28:
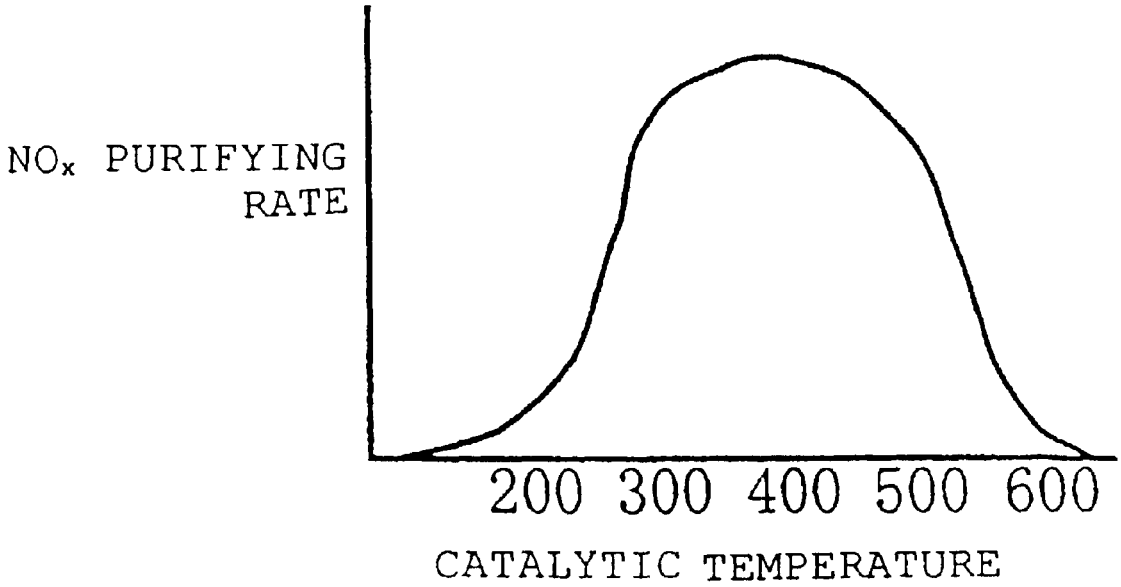
FIG. 28 is a diagram showing a temperature characteristic between the $NO_x$ storage-reduction catalyst $NO_x$ catalyst and a $NO_x$ purging rate.

On the other hand, as shown in FIG. 28, a $NO_x$ purging rate of the $NO_x$ catalyst 31 is correlated to a temperature of the catalyst, and has a temperature window optimal to the $NO_x$ absorption (which is hereinafter be termed a $NO_x$ absorbing window). When deviating from this $NO_x$ absorbing window, the $NO_x$ absorbing power largely declines. Further, when desorbing and reducing $NO_x$ from the $NO_x$ catalyst 31, $NO_x$ can be desorbed even if the temperature of the $NO_x$ catalyst 31 is not set so high. When desorbing $SO_x$ from the $NO_x$ catalyst 31, however, as explained above, $SO_x$ can be desorbed at the higher efficiency by setting high the temperature of the $NO_x$ catalyst 31.

Then, according to the exhaust emission control system in the sixth embodiment, the switch-over of the position of the calve member of the emission switching valve is controlled in the way that follows.

To begin with, when there is a condition under which $NO_x$ can be absorbed to the $NO_x$ catalyst 31, i.e., when the temperature of the $NO_x$ catalyst 31 is low (e.g., lower than 400® C.) and the air/fuel ratio of the exhaust gas is lean (i.e., when the engine 1 is operated at the lean air/fuel ratio), the valve member of the emission switching valve 20 is located in the forward flow position. With this setting, it is possible to decrease the length of the flow path till the exhaust gas flows into the catalytic converter 30, and there is diminished the decrease in the temperature of the exhaust gas till the exhaust gas flows into the catalytic converter 30. It is therefore feasible to restrain the drop in the temperature of the $NO_x$ catalyst 31 and to keep the $NO_x$ catalyst 31 at a temperature suited to the $NO_x$ absorption.

Next, when there is a condition under which $NO_x$ absorbed to the $NO_x$ catalyst 31 can be desorbed and reduced, i.e., when the temperature of the $NO_x$ catalyst 31 is low (e.g., 400° C. or lower) and the air/fuel ratio of the exhaust gas is stoichiometric or rich (i.e., when the engine 1 is operated at the stoichiometric ratio or rich air/fuel ratio), the valve member of the emission switching valve 20 is located in the forward flow position. With this setting, it is possible to decrease the length of the flow path till the exhaust gas flows into the catalytic converter 30, and there is diminished the decrease in the temperature of the exhaust gas till the exhaust gas flows into the catalytic converter 30. It is therefore feasible to restrain the drop in the temperature of the $NO_x$ catalyst 31 and to keep the $NO_x$ catalyst 31 at a temperature suited to the $NO_x$ desorption and reduction.

Further, when the temperature of the $NO_x$ catalyst 31 is high (e.g., 400° C. or higher) enough to deteriorate the $NO_x$ purging rate (i.e., when the engine 1 is operated at the lean air/fuel ratio), the valve member of the emission switching valve 20 is located in the backward flow position. With this setting, it is possible to increase the length of the flow path till the exhaust gas flows into the catalytic converter 30 and to thereby speed up the decrease in the temperature of the $NO_x$ catalyst 31. As a result, the $NO_x$ catalyst 31 can be kept at a temperature suited to the $NO_x$ absorption.

Moreover, when there is a condition under which $SO_x$ absorbed to the $NO_x$ catalyst 31 can be desorbed, i.e., when the temperature of the $NO_x$ catalyst 31 is high (e.g., 600° C. or higher) and the air/fuel ratio of the exhaust gas is stoichiometric or rich (i.e., when the engine 1 is operated at the stoichiometric ratio or rich air/fuel ratio), the valve member of the emission switching valve 20 is located in the forward flow position. With this setting, it is possible to decrease the length of the flow path till the exhaust gas flows into the catalytic converter 30, and there is diminished the decrease in the temperature of the exhaust gas till the exhaust gas flows into the catalytic converter 30. It is therefore feasible to restrain the drop in the temperature of the $NO_x$ catalyst 31 and to keep the $NO_x$ catalyst 31 at a temperature suited to the $SO_x$ desorption.

Note that an exhaust gas temperature detected by the exhaust gas temperature sensor 13 provided in the vicinity of the inlet 30a of the catalytic converter 30 serves as a substitute for the catalytic temperature of the $NO_x$ catalyst 31 in the sixth embodiment.

Seventh Embodiment

Figure 29:
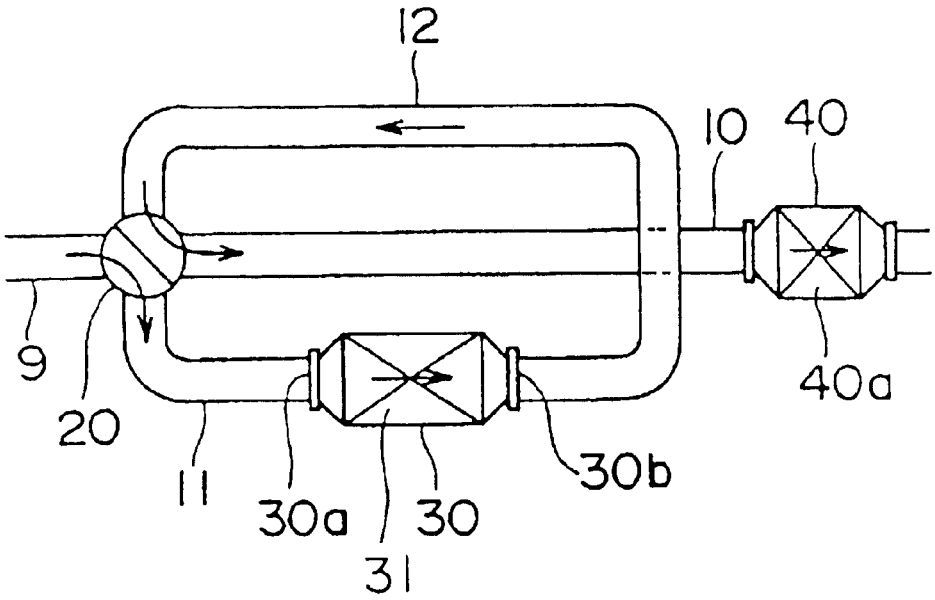
FIG. 29 is a diagram showing the principal components of the exhaust emission control system of the present invention in a seventh embodiment of the present invention when the emission switching valve is located in the forward flow position.

Next, a seventh embodiment of the exhaust emission control system of the internal combustion engine according to the present invention will be discussed with reference to FIGS. 29 and 30. FIG. 29 is a diagram showing the principal components of the exhaust emission control system in the seventh embodiment, wherein the valve member of the emission switching valve 20 is located in the forward flow direction. A difference of the seventh embodiment from the sixth embodiment is only such a point that the sweeper 40 is provided midways of the exhaust pipe 10. Note that the $NO_x$ catalyst 31 constitutes the exhaust gas purifying element also in the seventh embodiment.

The sweeper 40 is stored inside with a catalyst (e.g., the selective reduction type $NO_x$ catalyst for reducing or dissolving $NO_x$ under the existence of hydro carbon in the over-oxygen atmosphere) 40a for adsorbing the oxygen when the air/fuel ratio of the exhaust gas is lean, and purging the exhaust gas of HC and CO with the oxygen adsorbed thereto when the air/fuel ratio of the exhaust gas is stoichiometric or rich. Accordingly, in the lean-burn gasoline engine 1 in the seventh embodiment, when the engine 1 is operated at the lean air/fuel ratio, the catalyst 40a of the sweeper 40 adsorbs the oxygen in the exhaust gas.

In the sixth embodiment discussed above, when the temperature of the $NO_x$ catalyst 31 is high, and when the air/fuel ratio of the exhaust gas is lean, the valve member of the emission switching valve 20 is located in the backward flow position, thereby increasing the length of the flow path till the exhaust gas flows into the catalytic converter 30 and augmenting the drop in the temperature of the exhaust gas. With this contrivance, the temperature of the $NO_x$ catalyst 31 is controlled to fall within the $NO_x$ absorbing window. If done in this way, however, it might be considered that the temperature of the $NO_x$ catalyst 31 exceeds the $NO_x$ absorbing window.

The high-temperature exhaust gas is flowed in the state where the temperature of the $NO_x$ catalyst 31 exceeds the $NO_x$ absorbing window, and the exhaust gas still remains unpurified. On the contrary, it might happen that $NO_x$ catalyst 31 is deteriorated.

Figure 30:
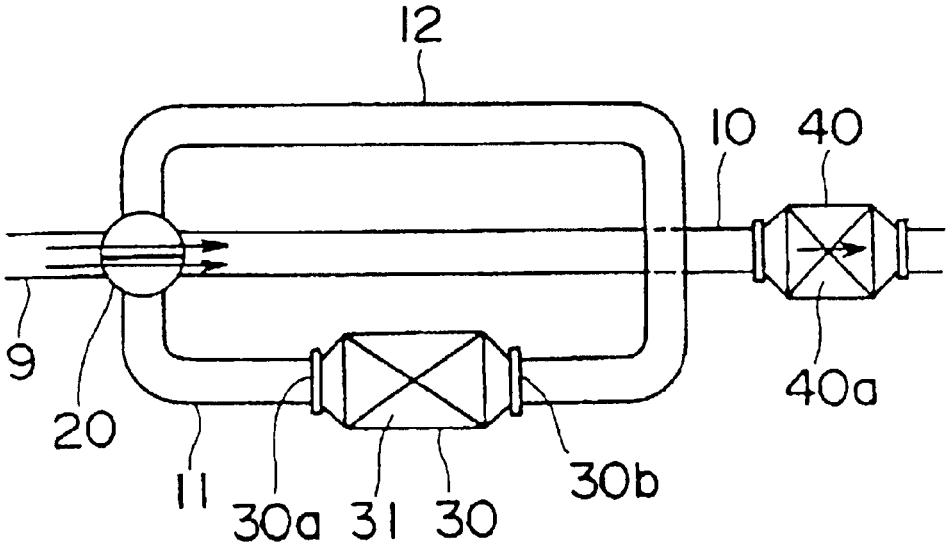
FIG. 30 is a diagram showing the principal components of the exhaust emission control system in the seventh embodiment when the emission switching valve is located in the neutral position between the forward flow position and the backward flow position.

This being the case, according to the exhaust emission control system in the seventh embodiment, when the air/fuel ratio of the exhaust gas is lean (i.e., when the engine 1 is operated at the lean air/fuel ratio), and when the temperature of the $NO_x$ catalyst 31 becomes high (e.g., 500® C. or higher) over the $NO_x$ absorbing window, as shown in FIG. 30, the valve member of the emission switching valve 20 is located in a neutral position between the forward flow position and the backward flow position. With this setting, the exhaust gas takes a short path from the exhaust pipe 9 to the exhaust pipe 10, and does not substantially flow to the catalytic converter 30. Then, the exhaust gas containing HC and Co which flows out to the exhaust pipe 10, is purged of HC and CO with the oxygen adsorbed to the catalyst 40a of the sweeper 40, and then discharged into the atmospheric air. Accordingly, the $NO_x$ catalyst 31 stored in the catalytic converter 30 can be prevented from being deteriorated.

Eighth Embodiment

Figure 31:
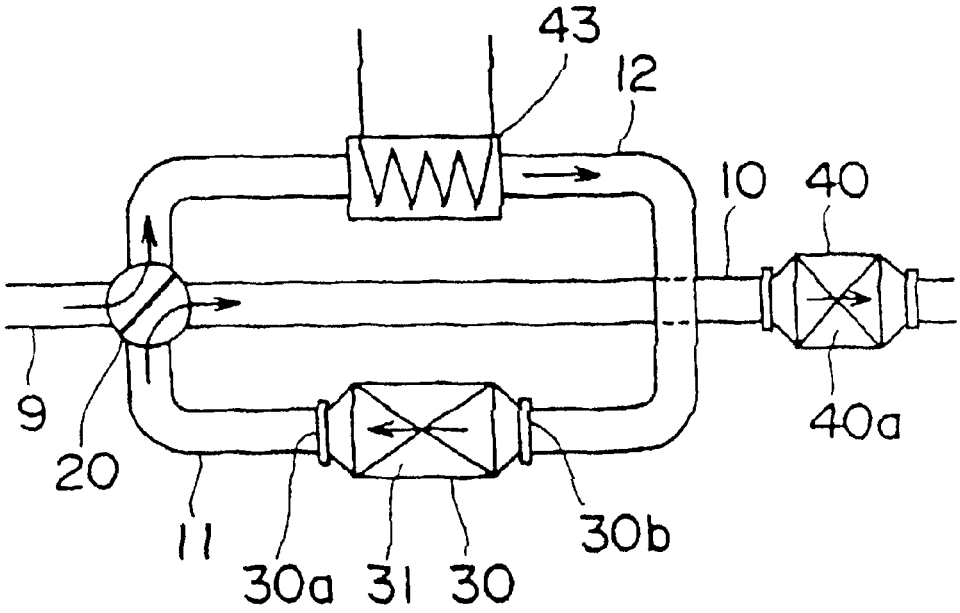
FIG. 31 is a diagram showing the principal components of the exhaust emission control system in an eighth embodiment of the present invention when the emission switching valve is located in the backward flow position.

Next, an eighth embodiment of the exhaust emission control system of the internal combustion engine according to the present invention will be discussed with reference to FIG. 31. FIG. 31 is a diagram of the principal components of the exhaust emission control system in the eighth embodiment, showing a state where the valve member of the emission switching valve 20 is located in the backward flow direction. A difference of the eighth embodiment from the seventh embodiment is only such a point that a cooler (cooling unit) 43 is provided midways of the exhaust pipe 12.

In the sixth embodiment discussed above, when the temperature of the $NO_x$ catalyst 31 is high, and when the air/fuel ratio of the exhaust gas is lean, the valve member of the emission switching valve 20 is located in the backward flow position, thereby increasing the length of the flow path till the exhaust gas flows into the catalytic converter 30 and augmenting the drop in the temperature of the exhaust gas. With this contrivance, the temperature of the $NO_x$ catalyst 31 is controlled to fall within the $NO_x$ absorbing window. If done in this way, however, it might be considered that the temperature of the $NO_x$ catalyst 31 exceeds the $NO_x$ absorbing window.

Then, according to the eighth embodiment, when the air/fuel ratio of the exhaust gas is lean (i.e., when the engine 1 is operated at the lean air/fuel ratio), and when the temperature of the $NO_x$ catalyst 31 becomes high (e.g., 500® C. or higher) over the $NO_x$ absorbing window, as shown in FIG. 31, the valve member of the emission switching valve 20 is located in the backward flow position, and the cooler is operated. If thus operated, it is feasible to increase the length of the flow path till the exhaust gas flows into the catalytic converter 30 and to augment the drop in the temperature of the exhaust gas till the exhaust gas flows into the catalytic converter 30. Besides, the temperature of the exhaust gas can be forcibly lowered by the cooler 43, and hence the decrease in the temperature of the $NO_x$ catalyst 31 can be speed up. As a consequence, the $NO_x$ catalyst 31 can be kept at a temperature suited to the $NO_x$ absorption.

Note that the cooler 43 may be of either a water cooling type or an air cooling type, and a structure thereof is not particularly limited. In short, the cooler 43 may incorporate a function capable of cooling the temperature of the exhaust gas flowing through the exhaust pipe 12.

Ninth Embodiment

Next, a ninth embodiment of will be described with reference to FIGS. 32 to 36.

Figure 32:
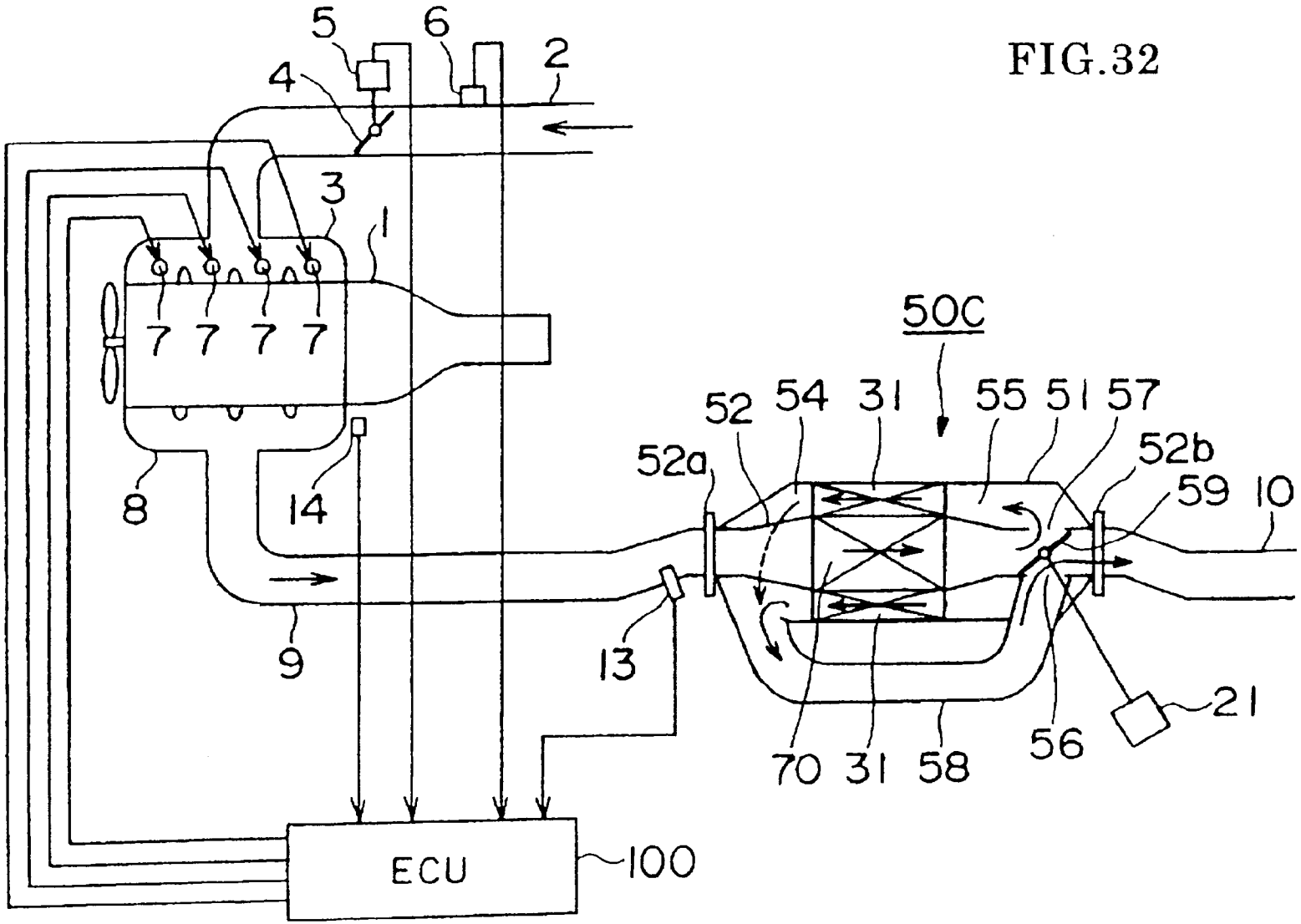
FIG. 32 is a schematic diagram showing a configuration of the exhaust emission control system in a ninth embodiment of the present invention when the valve member is located in the forward flow position.

FIG. 32 is a view schematically illustrating a construction of the exhaust emission control system of the internal combustion engine in the ninth embodiment. The engine 1 is classified as a lean-burn gasoline engine, wherein the intake air is supplied to each of the cylinders via the intake pipe 2 and the intake manifold 3. The fuel is injected out of the fuel injection valve 7 into each intake passageway communicating with each cylinder. The exhaust gas discharged from each cylinder is exhausted via the exhaust manifold 8 and the exhaust pipe 9. The intake pipe 2 is provided with the throttle valve 4 including the throttle position sensor 5, and the air-flow meter 6. The exhaust pipe 9 is provided with the exhaust gas temperature sensor 13. The engine speed sensor 14 is provided in the engine 1. Respective output signals of the throttle position sensor 5, the airflow meter 6, the exhaust gas temperature sensor 13 and the engine speed sensor 14, are outputted to the ECU 100. The operation of the fuel injection valve 7 is controlled based on the output signals transmitted from the ECU 100, and this construction is absolutely the same as that in the first embodiment discussed above.

The exhaust emission control system in the ninth embodiment has a different configuration on the downstream side of the exhaust pipe 9 from the configuration in the first embodiment, which will hereinafter be described in details.

A downstream-end of the exhaust pipe 9 is connected to an exhaust gas purifying unit 50C. The exhaust gas purifying unit 50C communicates with the atmospheric air via the exhaust pipe 10. A basic structure of the exhaust gas purifying unit 50C is the same as the exhaust gas purifying unit 50A in the modified example of the first embodiment which is illustrated in FIGS. 8 to 11. In FIGS. 32 through 36, the same components as those of the exhaust gas purifying unit 50A are marked with the same numerals, and a different point will hereinafter be explained. Note that the $NO_x$ catalyst 31 constitutes the exhaust gas purifying element also in the ninth embodiment.

In the exhaust gas purifying unit 50C in the ninth embodiment, a $SO_x$ absorbing agent 70 is provided approximately in an intermediate portion of the pipe 52 in the axial direction. Namely, in this exhaust gas purifying unit 50C, the $NO_x$ catalyst 31 and the $SO_x$ absorbing agent are concentrically disposed. What can be exemplified as the $SO_x$ absorbing agent 70 may be the $NO_x$ storage-reduction catalyst having the $SO_x$ absorbing power, the three-way catalyst, and the agent borne with platinum.

In the ninth embodiment, however, the $NO_x$ storage-reduction catalyst having the $SO_x$ absorbing power is used as the $SO_x$ absorbing agent 70. Accordingly, in the ninth embodiment, the $SO_x$ absorbing agent 70 incorporates both of the $SO_x$ absorbing/desorbing function and the $NO_x$ purging function.

Figure 36:
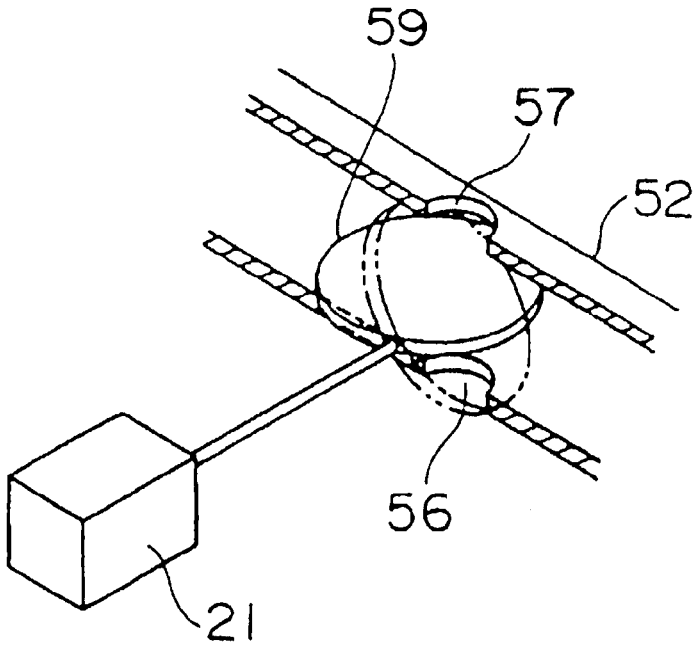
FIG. 36 is a detailed perspective view with a portion cutaway in the vicinity of the valve member of the exhaust emission control system in the ninth embodiment.

Further, in the case of the exhaust gas purifying unit 50C, when the valve member 59 is held in the first closing position indicated by the solid line in FIG. 36, the exhaust gas flows along the forward flow through the $NO_x$ catalyst 31. When the valve member 59 is held in the second closing position indicated by the one-dotted line in FIG. 36, the exhaust gas flows along the backward flow through the $NO_x$ catalyst 31.

More specifically, FIG. 32 shows the state where the valve member 59 is located in the forward flow position. At this time, the exhaust gas flowing into the pipe 52 via the exhaust pipe 9 flows in the sequence such as the $SO_x$ absorbing agent 70→the opening 57→the $NO_x$ catalyst 31→the sub-space 54→the connection pipe 58→the opening 58→the pipe 52→the exhaust pipe 10.

Figure 33:
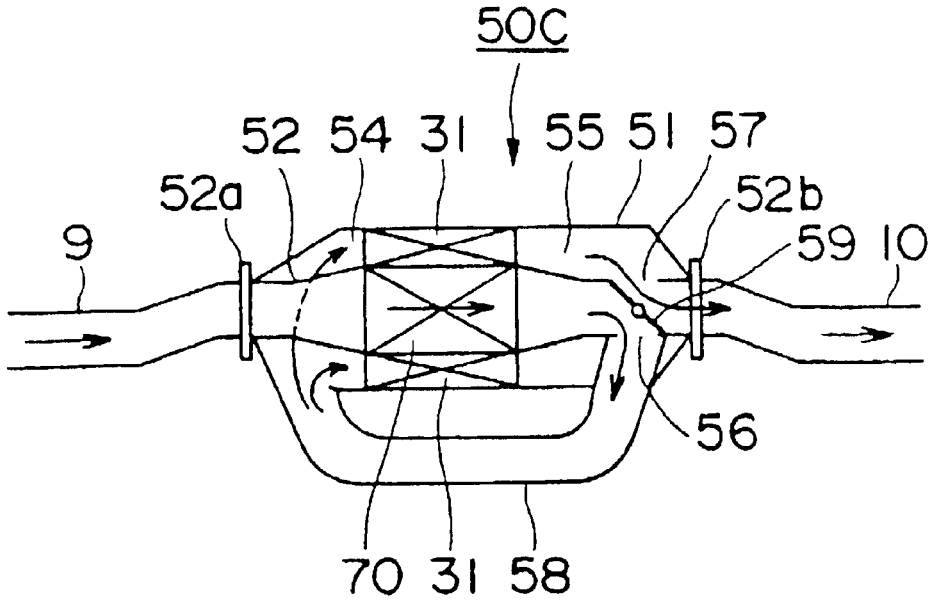
FIG. 33 is a diagram showing the principal components of the exhaust emission control system in ninth embodiment when the valve member is located in the backward flow position.

Moreover, FIG. 33 shows the state where the valve member 59 is located in the backward flow position. At this time, the exhaust gas flowing into the pipe 52 via the exhaust pipe 9 flows in the sequence such as the $SO_x$ absorbing agent 70→the opening 56→the connection pipe 58→the sub-space 54→the $NO_x$ catalyst 31→the sub-space space 55→the opening 57→the pipe 52→the exhaust pipe 10.

Accordingly, in the case of the exhaust gas purifying unit 50C, the length of the flow path till the exhaust gas flows into the $NO_x$ catalyst 31 is larger when the valve member 59 is set in the backward flow position than when the valve member 59 is set in the forward flow position. As a result, the decrease in the temperature of the exhaust gas till the exhaust gas flows into the $NO_x$ catalyst 31 is larger when the valve member 59 is set in the backward flow position than when the valve member 59 is set in the forward flow position.

Figure 34:
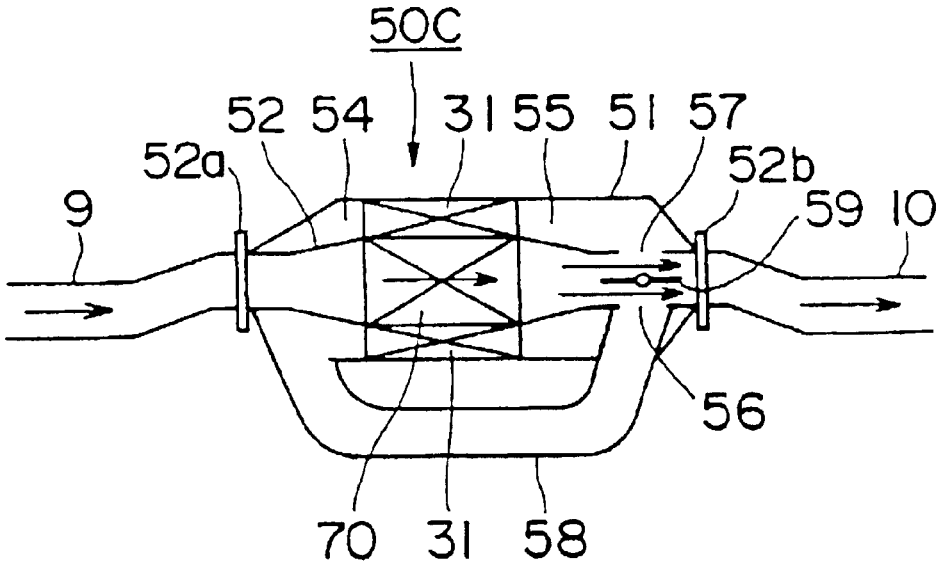
FIG. 34 is a diagram showing the principal components of the exhaust emission control system in the ninth embodiment when the emission switching valve is located in the neutral position between the forward flow position and the backward flow position.
Figure 35:
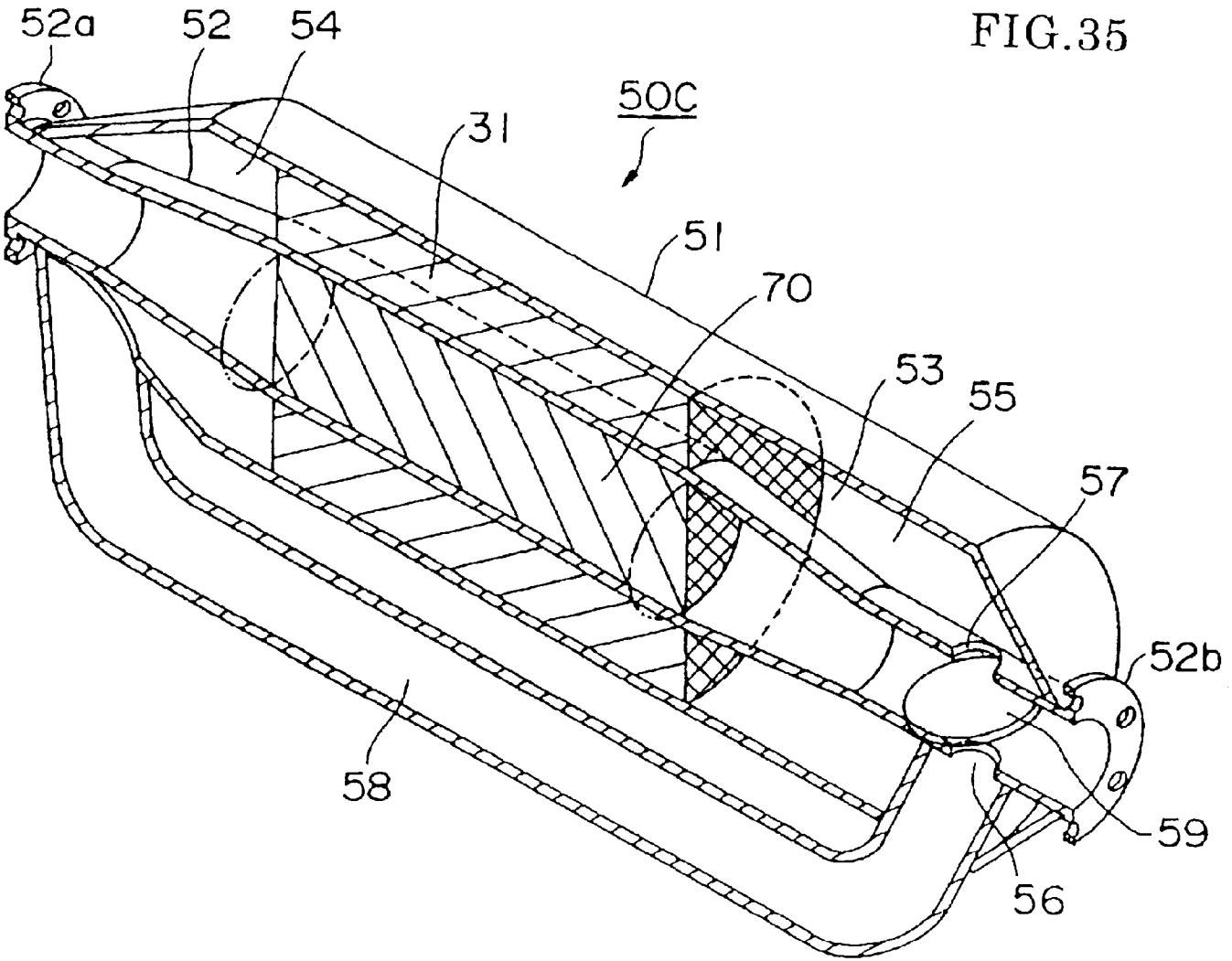
FIG. 35 is a diagram with the principal components cutaway in the exhaust emission control system in the ninth embodiment.

Furthermore, in the case of the exhaust gas purifying unit 50C, as shown in FIG. 34, the valve member 59 can be held also in the neutral position set along the axial line of the pipe 52. The structure is such that when the valve member 59 is thus located in the neutral position, there is produced no pressure difference between the inlet and the outlet of the $NO_x$ catalyst 31, and hence the exhaust gas does not substantially flows out to the sub-space 55 or the connection pipe 58 via the openings 56, 57 of the pipe 52 and flows along the short path from the exhaust pipe 9 via the pipe 52 to the exhaust pipe 10. Accordingly, the exhaust gas does not flow to the $NO_x$ catalyst 31.

Note that as explained in the sixth embodiment, FIG. 28 shows a relationship between the $NO_x$ purging rate and the catalytic temperature of the $NO_x$ catalyst ($NO_x$ storage-reduction catalyst) 31 disposed in the annular space 53.

In the exhaust emission control system in the ninth embodiment, the ECU 100 performs the control of switching over the position of the valve member 59 in the following manner.

To start with, the valve member 59 is located in the forward flow position as illustrated in FIG. 32, in which case the load of the engine 1 is comparatively small, the temperature of the $NO_x$ catalyst 31 is low (e.g., less than 400® C.), and the air/fuel ratio of the engine 1 is under the lean/rich spike control. If done in this way, it is possible to decrease both of the length of the flow path till the exhaust gas flows into the $NO_x$ catalyst 31 and the drop in the temperature of the exhaust gas till the exhaust gas flows into the $NO_x$ catalyst 31. Hence, it is feasible to restrain the decrease in the temperature of the $NO_x$ catalyst 31 and to keep the $NO_x$ catalyst 31 at a temperature suited to the $NO_x$ absorption and desorption.

Then, at this time, the exhaust gas flows through the $SO_x$ absorbing agent 70 and is thereafter discharged via the $NO_x$ catalyst 31. Hence, $SO_x$ contained in the exhaust gas is absorbed to the $SO_x$ absorbing agent 70, whereby the $NO_x$ catalyst 31 is prevented from the $SO_x$ poisoning. Further, $NO_x$ contained in the exhaust gas is absorbed to both of the $SO_x$ absorbing agent 70 and the $NO_x$ catalyst 31, and consequently the $NO_x$ purging rate becomes extremely high.

Next, the valve member 59 is located in the backward flow position as illustrated in FIG. 33, in which case the load of the engine 1 is comparatively large, the temperature of the $NO_x$ catalyst 31 is high (e.g., over 400® C.) enough to deteriorate the $NO_x$ purging rate, and the air/fuel ratio of the engine 1 is under the lean/rich spike control. With this operation, it is feasible to increase both of the length of the flow path till the exhaust gas flows into the $NO_x$ catalyst 31 and the drop in the temperature of the exhaust gas till the exhaust gas flows into the $NO_x$ catalyst 31. Hence, it is possible to speed up the drop in the temperature of the $NO_x$ catalyst 31 and, as a result, to keep the $NO_x$ catalyst 31 at a temperature suited to the $NO_x$ absorption and desorption.

Then, at this time also, the exhaust gas flows through the $SO_x$ absorbing agent 70 and is thereafter discharged via the $NO_x$ catalyst 31. Hence, $SO_x$ contained in the exhaust gas is absorbed to the $SO_x$ absorbing agent 70, whereby the $NO_x$ catalyst 31 is prevented from the $SO_x$ poisoning. Further, $NO_x$ contained in the exhaust gas is absorbed to both of the $SO_x$ absorbing agent 70 and the $NO_x$ catalyst 31, and consequently the $NO_x$ purging rate becomes extremely high.

As discussed above, the connection pipe 58 functions as a cooling device for decreasing the temperature of the exhaust gas. Therefore, if this connection pipe 58 is installed in a position where the pipe 58 receives the traveling wind, the cooling effect can be enhanced.

Further, in a state where the engine 1 continues to be in the operation at the stoichiometric ratio as it does when starting up the engine 1 and during an accelerating operation and a high-speed high-load operation, the valve member 59 is, as illustrated in FIG. 34, located in the neutral position. With this setting, as described above, the exhaust gas flows along the short path from the exhaust pipe 9 via the pipe 52 to the exhaust pipe 10 but does not flow to the $NO_x$ catalyst 31.

If the exhaust gas exhibiting the stoichiometric ratio continues to flow through the $SO_x$ absorbing agent 70 for a predetermined period or longer, though it should be considered as a matter of course when the temperature of the exhaust gas is high, even when the temperature of the exhaust gas is low, $SO_x$ is desorbed from the $SO_x$ absorbing agent 70. Thus, if $SO_x$ desorbed from the $SO_x$ absorbing agent 70 flows to the $NO_x$ catalyst 31, the $NO_x$ catalyst 31 suffers the $SO_x$ poisoning. Under this circumstance, if the exhaust gas of the stoichiometric ratio continues to flow, the valve member 59 is held in the neutral position, thereby preventing the exhaust gas from flowing to the $NO_x$ catalyst 31.

$SO_x$ desorbed from the $SO_x$ absorbing agent 70 is reduced to $SO_2$, and the exhaust gas flows out to the exhaust pipe 10.

Note that the exhaust gas temperature detected by the exhaust gas temperature sensor 13 provided in the vicinity of the flange 52a of the exhaust gas purifying unit 50A, is a substitute for the catalytic temperature of the $NO_x$ catalyst 31 in the ninth embodiment.

<Modified Examples Shown in FIGS. 37 to 41>

FIGS. 37 through 41 are diagrams each showing a modified example of the ninth embodiment of the exhaust emission control system, wherein the control system is constructed in a more compact configuration by eliminating the connection pipe 58 from the exhaust gas purifying unit 50C shown in FIGS. 32 to 36.

The following is an explanation of a difference of an exhaust gas purifying unit 50D in this modified example from the exhaust gas purifying unit 50C described above. The same components as those of the exhaust gas purifying unit 50C are marked with the same reference numerals in FIGS. 37 to 41, of which description is omitted. Note that the $NO_x$ catalyst 31 constitutes the exhaust gas purifying element also in this modified example.

The exhaust gas purifying unit 50D in this modified example is constructed such that an annular space formed between the casing 51 and the pipe 52 is sectioned into three spatial areas, i.e., the annular sub-space 60 formed at an end portion on the side of the flange 52a, and the sub-spaces 62, 63 each taking a sectionally semicircular shape which are vertically divided into two spatial areas by the partition plate 61 extending from the casing 51 to the pipe 52 and fixed thereto.

Figure 40:
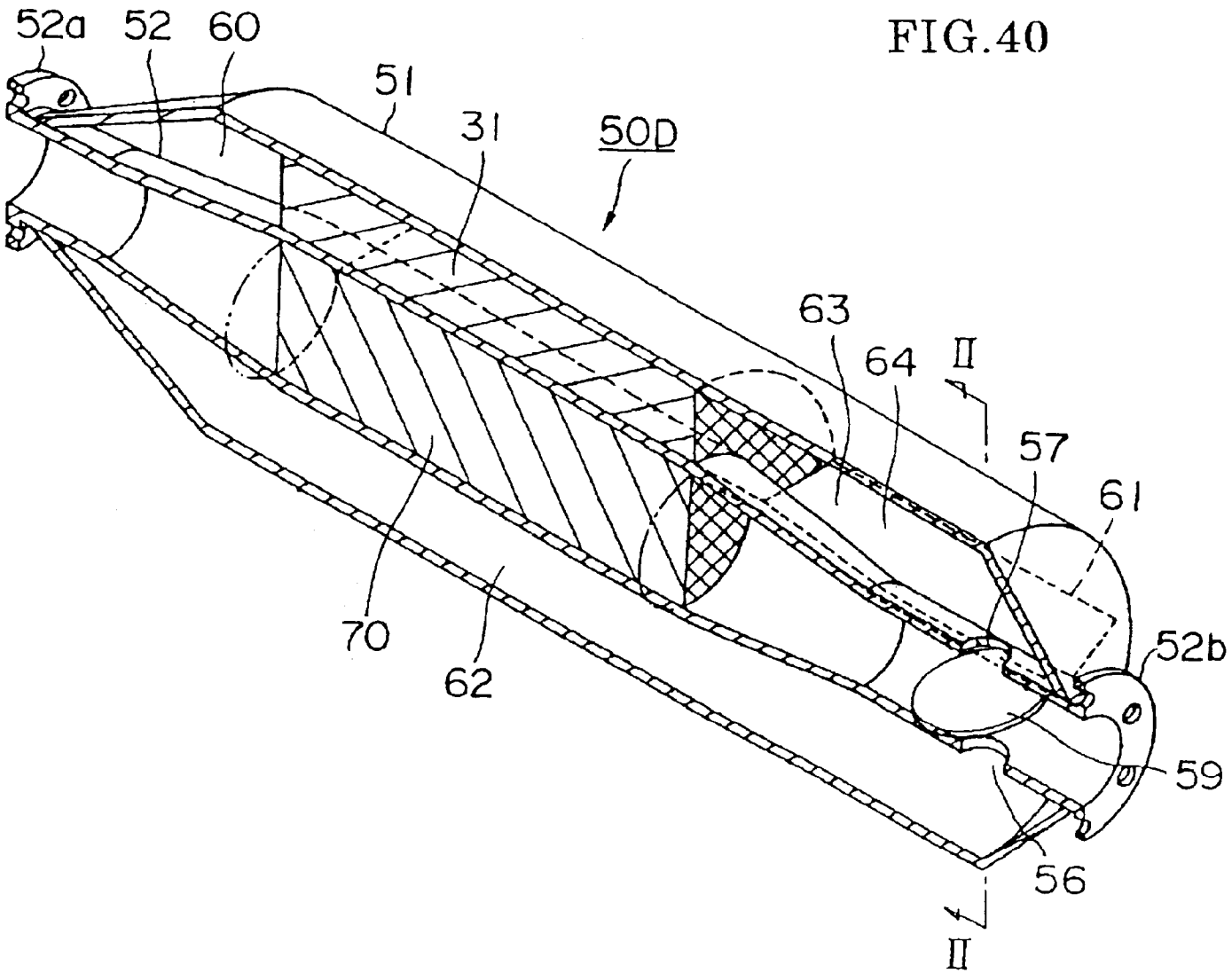
FIG. 40 is a perspective view with the principal components cutaway in the modified example shown in FIG. 37.
Figure 41:
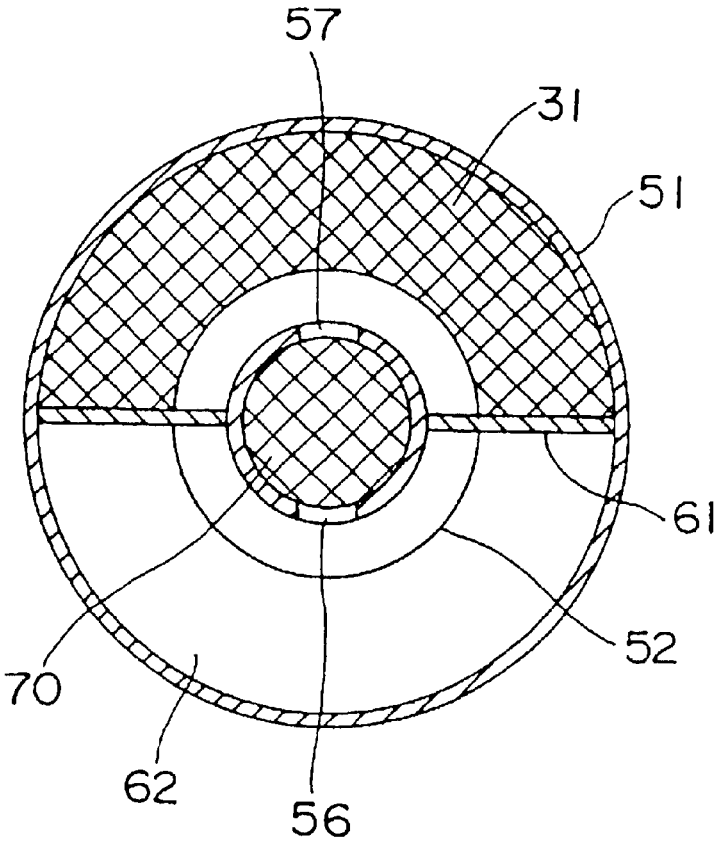
FIG. 41 is a sectional view taken in the arrow direction II—II in FIG. 40.

Then, referring to FIG. 40, the $NO_x$ catalyst 31 is disposed, in close proximity to the sub-space 60, within the semicircular sub-space 63 positioned upward. The sub-space 64 is formed in an area closer to the flange 52b than the $NO_x$ catalyst 31 within the subspace 63, and the opening 57 of the pipe 52 communicates with the sub-space 64. On the other hand, referring again to FIG. 40, the semicircular sub-space 62 positioned downward communicates with the annular sub-space 60 and with the opening 56 of the pipe 52.

A positional relationship between the valve member 59 and the openings 56, 57, and two closing positions of the valve member 59 for closing the pipe 52, are absolutely the same as those in the exhaust gas purifying unit 50C described above. Then, explaining the case of the exhaust gas purifying unit 50D in the present modified example with reference to 36, when the valve member 59 is held in the first closing position indicated by the solid line in FIG. 36, the portion of the pipe 52, which is closer to the $SO_x$ absorbing agent 70 than the valve member 59, is connected via the opening 57 to the sub-space 64. The portion of the pipe 52, which is closer to the flange 52b than the valve member 59, is connected via the opening 56 to the downward semicircular sub-space 62. In contrast with this, when the valve member 59 is held in the second closing position (backward flow position) indicated by the two-dotted line in FIG. 36, the portion of the pipe 52, which is closer to the $SO_x$ absorbing agent 70 than the valve member 59, is connected via the opening 56 to the downward semicircular sub-space 62. The portion of the pipe 52, which is closer to the flange 52b than the valve member 59, is connected via the opening 57 to the sub-space 64.

Figure 37:
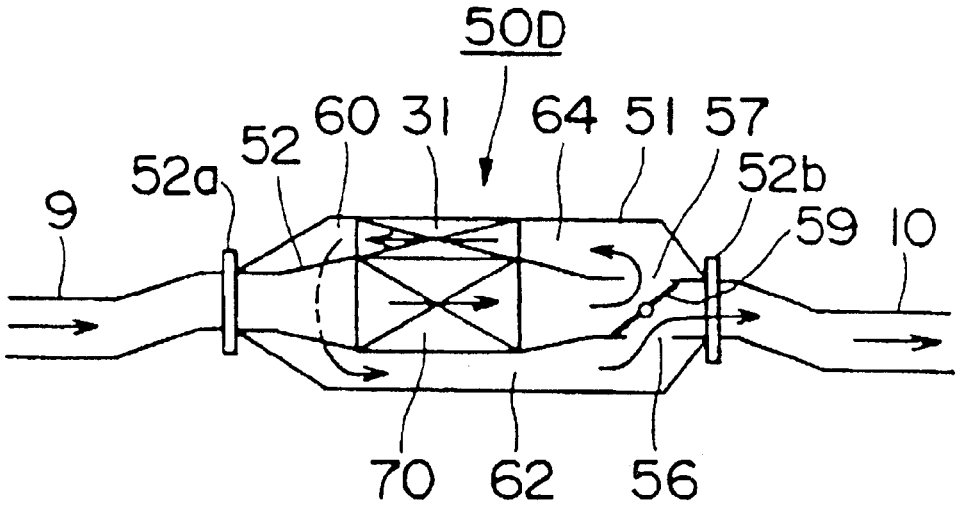
FIG. 37 is a diagram showing the principal components of the exhaust emission control system in the modified example of the ninth embodiment when the valve member is located in the forward flow position.
Figure 38:
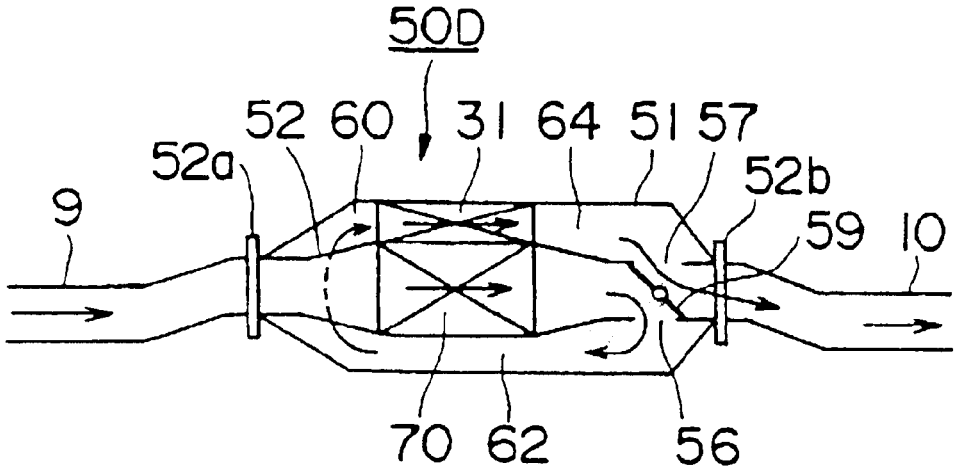
FIG. 38 is a diagram showing the principal components in the modified example shown in FIG. 37 when the valve member is located in the backward flow position.
Figure 39:
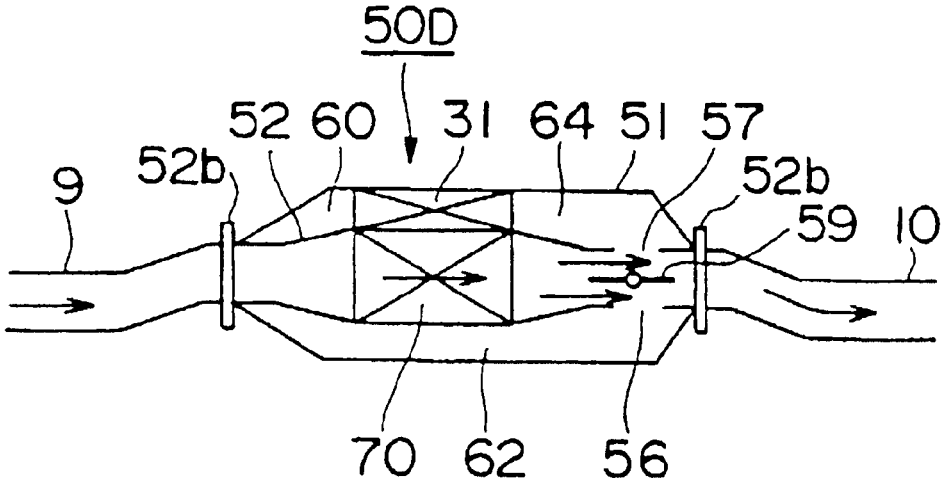
FIG. 39 is a diagram showing the principal components in the modified example illustrated in FIG. 37 when the valve member is located in the neutral position between the forward flow position and the backward flow position.

FIGS. 37 and 39 are sectional views each showing the exhaust gas purifying unit 50D. FIG. 37 illustrates a state where the exhaust gas flows through the $NO_x$ catalyst 31 along the forward flow. FIG. 38 illustrates a state where the exhaust gas flows through the $NO_x$ catalyst 31 along the backward flow. FIG. 39 shows a state where the valve member 59 is set in the neutral position, and the exhaust gas takes a short path without flowing through the $NO_x$ catalyst 31. It should be noted that when constructed as in the case of this exhaust gas purifying unit 50D, the operation of the exhaust emission control system is also the same as it operates with the exhaust gas purifying unit 50C provided in the ninth embodiment, and hence the explanation thereof is omitted.

Figure 42:
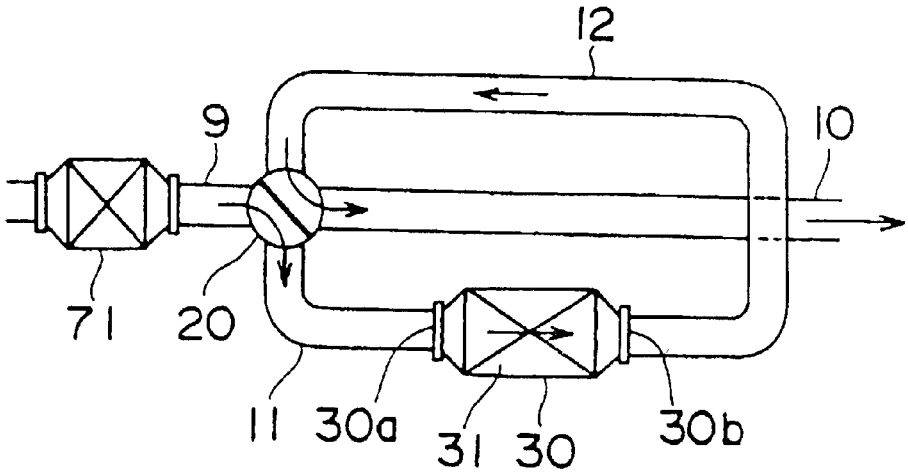
FIG. 42 is a diagram showing the principal components of the exhaust emission control system in the ninth embodiment when the emission switching valve is located in the forward flow position.
Figure 43:
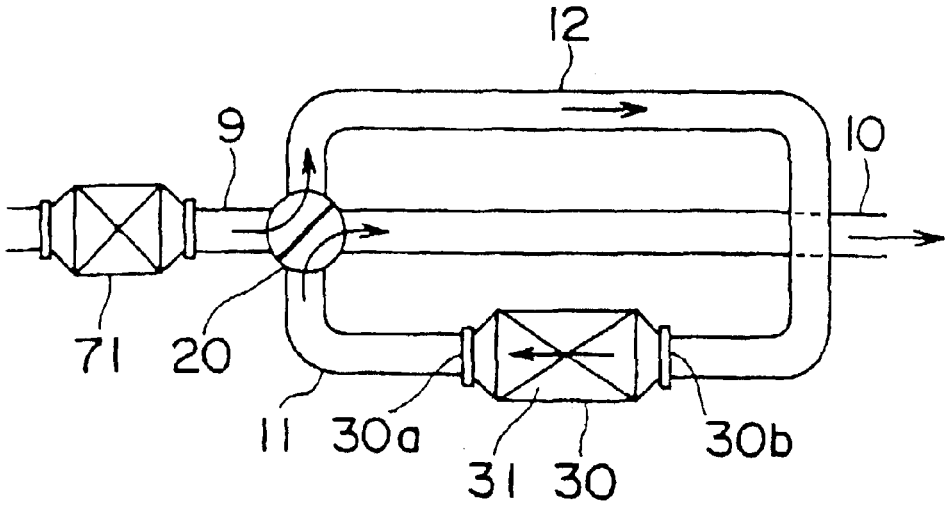
FIG. 43 is a diagram showing the principal components in the modified example shown in FIG. 42 when the emission switching valve is located in the backward flow position.
Figure 44:
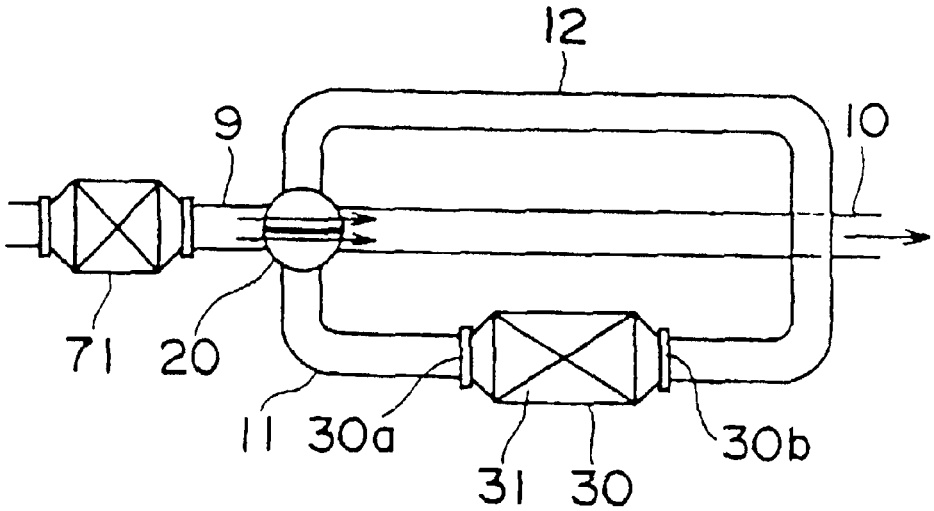
FIG. 44 is a diagram showing the principal components in the modified example shown in FIG. 42 when the emission switching valve is located in the neutral position between the forward flow position and the backward flow position.

<Modified Examples Shown in FIGS. 42 to 44>

FIGS. 42 to 44 are diagrams each showing a modified example of the ninth embodiment of the exhaust emission control system. A difference of the exhaust emission control system in this modified example from the exhaust emission control system in the mode shown in FIGS. 32 to 36, is only a point related to the exhaust pipe 9 and downstream-side portion thereof. This different point will be explained referring to FIGS. 42 to 44. Note that the $NO_x$ catalyst 31 constitutes the exhaust gas purifying element also in this modified example.

A $SO_x$ absorbing agent 71 is provided in the vicinity of the downstream-side end portion of the exhaust pipe 9. This absorbing agent 71 is composed of a three-way catalyst having a carrier including a basic site such as aluminum, and exhibits sufficient $SO_x$ absorbing power.

The exhaust pipe 9 disposed more downstream than the $SO_x$ absorbing agent 71 is connected to a first port of the emission switching valve 20 formed with four ports. The emission switching valve 20 is absolutely the same as the valve used in the exhaust emission control system in the first embodiment, and the configuration given downstream of the emission switching valve 20 is completely the same as that in the exhaust emission control system in the first embodiment. Then, the component provided downstream of the emission switching valve 20 are marked with the same numerals as those in the first embodiment, of which the explanation is omitted.

In this modified example, however, the valve member of the emission switching valve 20 can be held in the forward flow position when the exhaust gas flows along the forward flow through the $NO_x$ catalyst 31 as shown in FIG. 42, the backward flow position when the exhaust gas flows along the backward flow through the $NO_x$ catalyst 31 as shown in FIG. 43, and the neutral flow position when the exhaust gas takes the short path from the exhaust pipe 9 to the exhaust pipe 10 without flowing through the $NO_x$ catalyst 31 as shown in FIG. 44.

In this modified example also, the length of the flow path till the exhaust gas flows into the catalyst 31 is larger than when the valve member of the emission switching valve 20 is set in the backward flow position than when set in the forward flow position. As a result, the decrease in the temperature of the exhaust gas till the exhaust gas flows into the catalyst 31 is larger when the valve member of the emission switching valve 20 is set in the backward flow position than when set in the forward flow position.

In the exhaust emission control system in this modified example, the ECU 100 performs the control of switching over the position of the valve member 59 in the following manner.

To start with, the valve member of the emission switching valve 20 is located in the forward flow position as illustrated in FIG. 42, in which case the load of the engine 1 is comparatively small, the temperature of the $NO_x$ catalyst 31 is low (e.g., less than 400° C.), and the air/fuel ratio of the engine 1 is under the lean/rich spike control. If done in this way, it is possible to decrease both of the length of the flow path till the exhaust gas flows into the $NO_x$ catalyst 31 and the drop in the temperature of the exhaust gas till the exhaust gas flows into the $NO_x$ catalyst 31. Hence, it is feasible to restrain the decrease in the temperature of the $NO_x$ catalyst 31 and to keep the $NO_x$ catalyst 31 at a temperature suited to the $NO_x$ absorption and desorption.

Then, at this time, the exhaust gas flows through the $SO_x$ absorbing agent 71 and is thereafter discharged via the $NO_x$ catalyst 31. Hence, $SO_x$ contained in the exhaust gas is absorbed to the $SO_x$ absorbing agent 71, whereby the $NO_x$ catalyst 31 is prevented from the $SO_x$ poisoning.

Next, the valve member of the emission switching valve 20 is located in the backward flow position as illustrated in FIG. 43, in which case the load of the engine 1 is comparatively large, the temperature of the $NO_x$ catalyst 31 is high (e.g., over 400° C.) enough to deteriorate the $NO_x$ purging rate, and the air/fuel ratio of the engine 1 is under the lean/rich spike control. With this operation, it is feasible to increase both of the length of the flow path till the exhaust gas flows into the $NO_x$ catalyst 31 and the drop in the temperature of the exhaust gas till the exhaust gas flows into the $NO_x$ catalyst 31. Hence, it is possible to speed up the drop in the temperature of the $NO_x$ catalyst 31 and, as a result, to keep the $NO_x$ catalyst 31 at a temperature suited to the $NO_x$ absorption and desorption.

Then, at this time also, the exhaust gas flows through the $SO_x$ absorbing agent 71 and is thereafter discharged via the $NO_x$ catalyst 31. Hence, $SO_x$ contained in the exhaust gas is absorbed to the $SO_x$ absorbing agent 71, whereby the $NO_x$ catalyst 31 is prevented from the $SO_x$ poisoning.

Further, in a state where the engine 1 continues to be in the operation at the stoichiometric ratio as it does when starting up the engine 1 and during the accelerating operation and the high-speed high-load operation, the valve member of the emission switching valve 20 is, as illustrated in FIG. 44, located in the neutral position. With this setting, as described above, the exhaust gas flows along the short path from the exhaust pipe 9 via the pipe 52 to the exhaust pipe 10 but does not flow to the $NO_x$ catalyst 31. Accordingly, even when $SO_x$ is desorbed from the $SO_x$ absorbing agent 71, it never happens that the $NO_x$ catalyst 31 suffers the $SO_x$ poisoning. Further, at this time, the exhaust gas is purified by three-way activation of the $SO_x$ absorbing agent 71. Consequently, there is no necessity for providing the sweeper.

Moreover, in the case of this modified example, if there might be a possibility in which $SO_x$ absorbed to the $SO_x$ absorbing agent 71 reaches a predetermined quantity and is desorbed from the $SO_x$ absorbing agent 71 even in the rich spike for a short period of time under the lean/rich spike control, there is executed a regenerative process of desorbing $SO_x$ from the $SO_x$ absorbing agent 71. During this regenerative process, the valve member of the emission switching valve 20 is located in the neutral position shown in FIG. 44, thereby preventing the $SO_x$ desorbed out of the $SO_x$ absorbing agent 71 from flowing to the $NO_x$ absorbing agent 31.

Note that the regenerative process of the $SO_x$ absorbing agent 71 is executed by setting the air/fuel ratio to the stoichiometric ratio and making the operation state of the engine 1 continue for the predetermined time in which the temperature of the exhaust gas rises over a predetermined temperature (e.g., 600° C. or higher).

Further, what may be judged as a regenerative timing of the $SO_x$ absorbing agent 71 is a timing when, with a process of the ECU 100 estimating and integrating a $SO_x$ absorption quantity of the $SO_x$ absorbing agent 71 from a hysteresis of the operation state of the engine 1, this estimated/integrated value reaches a predetermined quantity, or a timing when, with a process of an S sensor($SO_x$ sensor) being provided at the exhaust pipe 9 disposed downstream of the $SO_x$ absorbing agent 71 and so structured as to be capable of detecting an $SO_2$ concentration in the exhaust gas which flows out of the $SO_x$ absorbing agent 71, an $SO_2$ desorption peak value when in the rich spike during an execution of the lean/rich spike control comes to a predetermined value.

Tenth Embodiment

Next, a tenth embodiment of the exhaust emission control system of the internal combustion engine according to the present invention will hereinafter be explained with reference to FIGS. 45 and 46.

Figure 45:
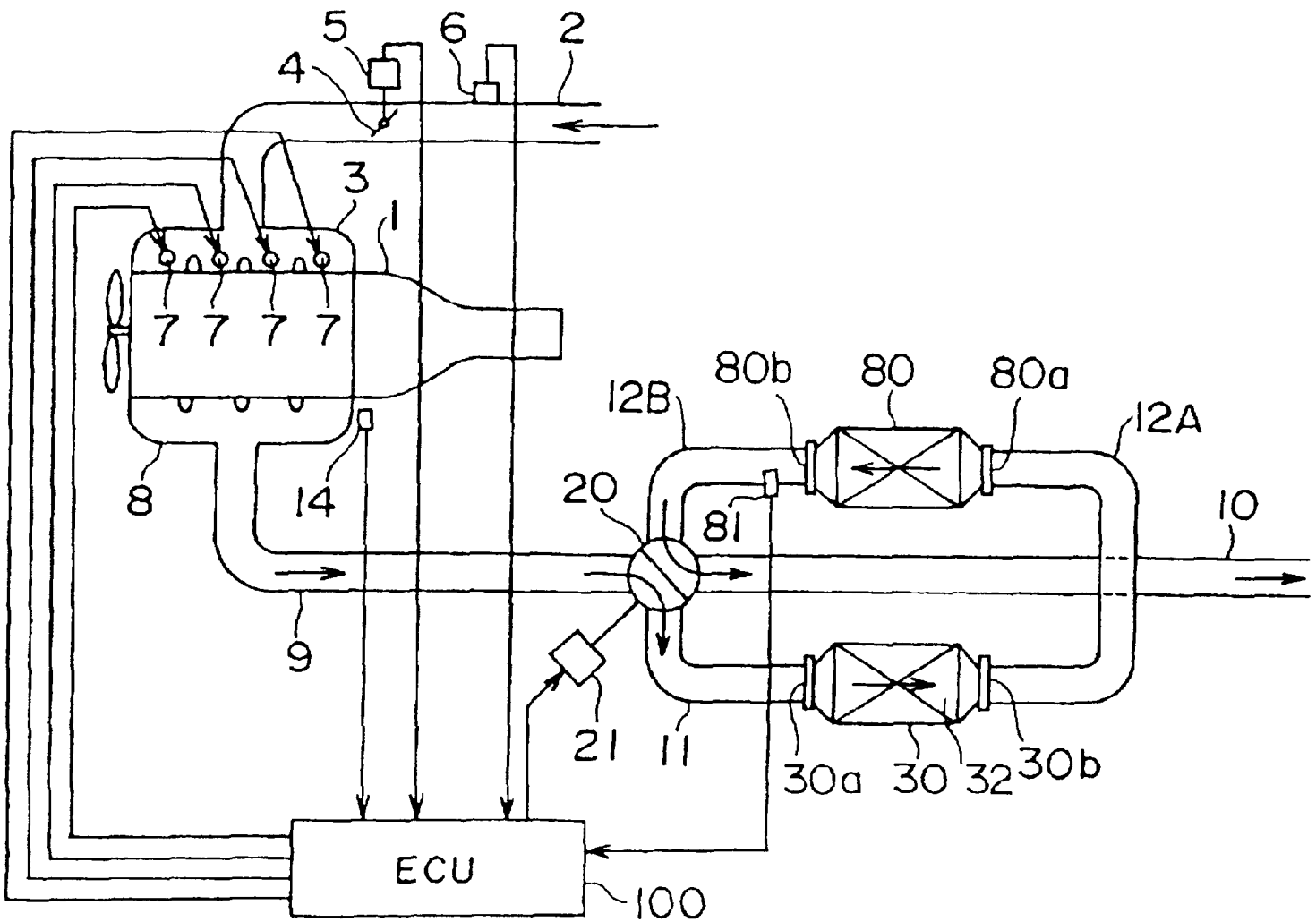
FIG. 45 is a schematic diagram showing a construction of the exhaust emission control system in a tenth embodiment of the present invention when the emission switching valve is located in the forward flow position.

FIG. 45 is a diagram schematically showing a construction of the exhaust emission control system of the internal combustion engine in the tenth embodiment. The engine 1 is classified as a lean-burn gasoline engine, wherein the intake air is supplied to each of the cylinders via the intake pipe 2 and the intake manifold 3. The fuel is injected out of the fuel injection valve 7 into each intake passageway communicating with each cylinder. The exhaust gas discharged from the respective cylinders is exhausted via the exhaust manifold 8 and the exhaust pipe 9. The intake pipe 2 is provided with the throttle valve 4 including the throttle position sensor 5, and the airflow meter 6. The engine speed sensor 14 is provided in the engine 1. Respective output signals of the throttle position sensor 5, the airflow meter 6 and the engine speed sensor 14, are outputted to the ECU 100. The operation of the fuel injection valve 7 is controlled based on the output signals transmitted from the ECU 100, and this construction is absolutely the same as that in the first embodiment discussed above. The exhaust pipe (the fist exhaust passageway) 9 is connected to the first port of the emission switching valve (the flow direction switching unit) 20 formed with four ports. The second port of the emission switching valve 20 communicates with the atmospheric air via the exhaust pipe (the second exhaust passageway) 10. This arrangement and the structure of the emission switching valve 20 are completely the same as those in the first embodiment.

The following is a different point of the exhaust emission control system in the tenth embodiment from the first embodiment.

In the tenth embodiment, the third port of the emission switching valve 20 is connected to the inlet 30a of the catalytic converter 30 via the exhaust pipe (the third exhaust passageway) 11. The outlet 30b of the catalytic converter 30 is connected to an inlet 80a of an HC adsorbing agent 80 via an exhaust pipe 12A, and an outlet 80b of the HC adsorbing agent 80 is connected to the fourth port of the emission switching valve 20 via an exhaust pipe 12B. In the tenth embodiment, the exhaust pipes 12A, 12B constitute a fourth exhaust passageway, and HC adsorbing agent 80 is provided in the fourth exhaust passageway.

The catalytic converter 30 contains at least a catalyst (an exhaust gas purifying element) 32 capable of purging the exhaust gas of hydro carbon (HC). The $NO_x$ storage-reduction catalyst and the selective reduction type $NO_x$ catalyst may be exemplified as the catalyst 32.

The HC adsorbing agent 80 has a nature of adsorbing the hydro carbon (HC) when a temperature of the adsorbing agent is a predetermined temperature or under, and desorbing HC adsorbed thereto when exceeding the predetermined temperature. The HC adsorbing agent 80 may be composed of a porous substance such as, e.g., zeolite etc.

An exhaust gas temperature sensor 81 for outputting to the ECU 100 an output signal corresponding to a temperature of the exhaust gas flowing within the exhaust pipe 12B, is attached to the exhaust pipe 12B in the vicinity of the outlet 80b of the HC adsorbing agent 80.

Note that the emission switching valve 20 is driven by the actuator 21, thereby switching over the position of the valve member thereof. The actuator 21 is the same as that in the first embodiment in terms of its being controlled by the ECU 100.

FIG. 45 shows the state where the valve member of the emission switching valve 20 is set in the forward flow position. At this time, the exhaust gas flows in the sequence such as the exhaust pipe 9→the exhaust pipe 11→the catalytic converter 30→the exhaust pipe 12A→the HC adsorbing agent 80→the exhaust pipe 12B→the exhaust pipe 10, and is discharged into the atmospheric air. FIG. 46 shows the state where the valve member of the emission switching valve 20 is set in the backward flow position. At this time, the exhaust gas flows in the sequence such as the exhaust pipe 9→the exhaust pipe 12B→the HC adsorbing agent 80→the exhaust pipe 12A→the catalytic converter 30→the exhaust pipe 11→the exhaust pipe 10, and is discharged into the atmospheric air.

I the exhaust emission control system in the tenth embodiment, the ECU 100 performs the control of switching over the position of the valve member of the emission switching valve 20 in the following manner.

Now, it is assumed that the HC adsorbing agent 80 adsorbs HC when the temperature of the adsorbing agent is 150° C. or lower and desorbs HC adsorbed thereto when exceeding 150° C. It is also assumed that the catalyst 32 exhibits a predetermined purging performance at over 200° C. defined as an active temperature. Further, the exhaust gas temperature detected by an exhaust gas temperature sensor 81 provided in the vicinity of the outlet 80b of the HC adsorbing agent 80, is a substitute for the adsorbing agent temperature of the HC adsorbing agent 80.

At first, when the exhaust gas temperature is low as in the case of starting up the engine 1, and when the exhaust gas temperature detected by the exhaust gas temperature sensor 81 is under 150° C., the valve member of the emission switching valve 20 is located in the forward flow position as shown in FIG. 45. With this setting, the exhaust gas flows through the HC adsorbing agent 80 after passing through the catalytic converter 30, and is discharged into the atmospheric air.

At this time, the catalyst 32 of the catalytic converter 30 does not yet reach the active temperature (200° C.), and consequently the exhaust gas is not substantially purified and flows through the catalytic converter 30. Then, thereafter, when the exhaust gas flows through the HC adsorbing agent 80, HC in the exhaust gas is adsorbed to the HC adsorbing agent 80. Till the exhaust gas temperature detected by the exhaust gas temperature sensor 81 comes to 150° C., the exhaust gas continues to flow along the forward flow in this way. Accordingly, even when the temperature of the catalyst 32 does not reach the active temperature as in the case of the start-up at a low temperature, it never happens that HC in the exhaust gas is discharged into the atmospheric air.

Herein, the exhaust pipe 12A extends between the catalytic converter 30 and the HC absorbing agent 80. The catalytic converter 30 and the HC absorbing agent 80 have their own thermal capacities, and therefore a temperature of the catalyst 32 of the catalytic converter 30 is not the same as a temperature of the HC absorbing agent 80 when the exhaust gas temperature is in the process of its rise. During the forward flow of the exhaust gas, the catalyst 32 assumes a higher temperature than that of the HC adsorbing agent 80. Then, in accordance with the tenth embodiment, when the exhaust gas flows along the forward flow, and when the temperature of the HC adsorbing agent 80 reaches 150° C., a length of the exhaust pipe 12A is set so that the temperature of the catalyst 32 comes to 200° C. or higher.

Figure 46:
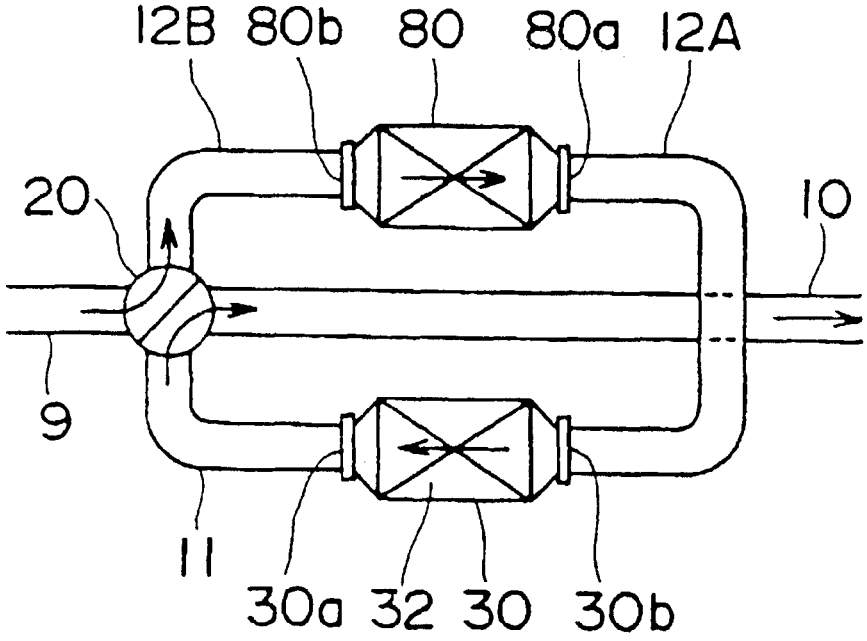
FIG. 46 is a diagram showing the principal components of the exhaust emission control system in the tenth embodiment of the present invention when the emission switching valve is located in the backward flow position.

Next, when the exhaust gas temperature rises, and when the exhaust gas temperature detected by the exhaust gas temperature sensor 81 exceeds 150° C., it is required that the valve member of the emission switching valve 20 be, as illustrated in FIG. 46, controlled in relation to the switching control. Note that as a method of adding the reducing agent, for example, the reducing agent may be added directly to the exhaust pipe 9, or the fuel may be sub-injected out of the fuel injection valve during an expansion stroke or exhaust stroke of each cylinder of a diesel engine.

Moreover, the first to ninth embodiments aim at desorbing $SO_x$ out of the $NO_x$ catalyst or the $SO_x$ absorbing agent. For this purpose, when desorbing $SO_x$, the air/fuel ratio of the exhaust gas is set stoichiometric or rich, and the exhaust gas temperature is set high. These settings are not necessarily done depending on a category of the deposit to be desorbed out of the exhaust gas purifying element. For instance, if the deposit can be desorbed out of the exhaust gas purifying element simply by setting the exhaust gas at the stoichiometric ratio or the rich air/fuel ratio, the air/fuel ratio of the exhaust gas may merely be set stoichiometric or rich when removing the deposit, and there is no necessity for raising the exhaust gas temperature. Further, if the deposit can be desorbed out of the exhaust gas purifying element simply by increasing the temperature of, the exhaust gas temperature may be merely increased, and there is no necessity for setting the exhaust gas at the stoichiometric ratio or rich air/fuel ratio.

According to the exhaust emission control system of the internal combustion engine of the present invention, it is feasible to selectively switch over the flow direction of the exhaust gas flowing through the exhaust gas purifying element in either the forward flow direction or the backward flow direction simply by switching over the flow direction switching device to the first or second position. This might simplify the structure of the exhaust emission control system, which leads to a decrease in the costs.

In the exhaust emission control system of the internal combustion engine according to the present invention, the exhaust purifying element is structured as the $NO_x$ storage-reduction catalyst, and, when in the $SO_x$ desorbing process of desorbing $SO_x$ absorbed to the $NO_x$ storage-reduction catalyst from this $NO_x$ storage-reduction catalyst, the flow direction switching device is switched over to the first or second position, thus changing the flow direction of the exhaust gas flowing through the $NO_x$ storage-reduction catalyst to a direction opposite to that when absorbing $NO_x$. In this case, $SO_x$ can be desorbed at a high efficiency from the $NO_x$ storage-reduction catalyst.

In the exhaust emission control system of the internal combustion engine according to the present invention, as for the exhaust gas purifying element composed of the $NO_x$ storage-reduction catalyst, the $NO_x$ storage-reduction catalyst disposed on the inlet-side in the flow direction of the exhaust gas when absorbing $NO_x$, exhibits higher $SO_x$ absorbing power than that of the $NO_x$ storage-reduction catalyst disposed on the outlet-side in the flow direction of the exhaust gas when absorbing $NO_x$. In this case, $SO_x$ can be desorbed out of the $NO_x$ storage-reduction catalyst at the high efficiency.

In the exhaust emission control system of the internal combustion engine according to the present invention, the exhaust gas purifying element is composed of the $NO_x$ storage-reduction catalyst, there is provided a heating element for heating the potion close to the inlet of the $NO_x$ storage-reduction catalyst in the flow direction of the exhaust gas when absorbing $NO_x$. In this case, the $SO_x$ desorption out of the $NO_x$ storage-reduction catalyst can be more speeded up.

In the exhaust emission control system of the internal combustion engine according to the present invention, the exhaust gas purifying element is composed of the $NO_x$ storage-reduction catalyst, and the flow direction switching device is switched over to the first or second position, whereby lengths of the third exhaust passageway and of the fourth exhaust passageway are set so that a distance from the internal combustion engine to the $NO_x$ storage-reduction catalyst is shorter [than when in the $SO_x$ desorbing process] *when in the $SO_x$ desorbing process than when absorbing $NO_x$*. In this case, it is feasible to speed up both of a rise in temperature of the $NO_x$ storage-reduction catalyst and the $SO_x$ desorption when in the $SO_x$ desorbing process.

In the exhaust emission control system of the internal combustion engine according to the present invention, the exhaust gas purifying element is composed of the $NO_x$ storage-reduction catalyst, and the sweeper is provided at the second exhaust passageway. In this case, even when the flow of the exhaust gas is bypassed without flowing through the exhaust gas purifying element in the process of the switching process by the flow direction switching device, the exhaust gas is purified by the sweeper and can be then discharged into the atmospheric air.

In the exhaust emission control system of the internal combustion engine according to the present invention, the exhaust gas purifying element is composed of the $NO_x$ storage-reduction catalyst, another catalyst is provided at the first exhaust passageway, and the sweeper is provided at the second exhaust passageway. The flow direction switching device is switched over to a third position for connecting the first port to the second port for an initial predetermined time during the $SO_x$ desorbing process, and switches over the flow direction of the exhaust gas flowing though the $NO_x$ storage-reduction catalyst in a direction opposite to that when absorbing $NO_x$ after the predetermined has elapsed. In this case, even when $SO_x$ is desorbed from another catalyst at the initial stage of the $SO_x$ desorbing process, $SO_x$ desorbed therefrom does not flow into the $NO_x$ storage-reduction catalyst, and hence the $NO_x$ strage-reduction catalyst is prevented from $SO_x$ poisoning. Besides, the sweeper is capable of purifying $SO_x$ desorbed from another catalyst.

If the $NO_x$ storage-reduction catalyst and the sweeper are integrated into one unit so that the exhaust gas can not flow therebetween and the heat can be transmitted therebetween, a temperature of the sweeper can be kept high, and a purging performance can be enhanced.

In the exhaust emission control system of the internal combustion engine according to the present invention, the exhaust gas purifying element is composed of the $NO_x$ storage-reduction catalyst, and the lengths of the third and fourth exhaust passageways are set so that the distance from the internal combustion engine to the exhaust gas purifying element becomes different by switching over the flow direction switching device to the first or second position. Then, the flow direction switching device is switched over by selecting a flow path having a shorter distance from the internal combustion engine to the $NO_x$ storage-reduction catalyst during the $SO_x$ desorbing process of desorbing $SO_x$ absorbed to the $NO_x$ storage-reduction catalyst out of this $NO_x$ storage-reduction catalyst. In this case, the higher-temperature exhaust gas can be flowed through the $NO_x$ storage-reduction catalyst. As a result, $SO_x$ can be desorbed at a higher efficiency.

In the exhaust emission control system of the internal combustion engine according to the present invention, the exhaust gas purifying element is composed of the $NO_x$ storage-reduction catalyst, and the lengths of the third and fourth exhaust passageways are set so that the distance from the internal combustion engine to the exhaust gas purifying element becomes different by switching over the flow direction switching device to the first or second position. Then, the flow direction switching device is switched over by selecting a flow path having a longer distance from the internal combustion engine to the $NO_x$ storage-reduction catalyst when the $NO_x$ storage-reduction catalyst absorbs $NO_x$ and when the exhaust gas temperature or the temperature of the $NO_x$ storage-reduction catalyst is over a predetermined temperature, and selecting a flow path having a shorter distance from the internal combustion engine to the $NO_x$ storage-reduction catalyst when the $NO_x$ storage-reduction catalyst absorbs $NO_x$ and when the exhaust gas temperature or the temperature of the $NO_x$ storage-reduction catalyst is lower than the predetermined temperature. In this case, the $NO_x$ storage-reduction catalyst can be kept within a temperature range suited to the $NO_x$ absorption, and the $NO_x$ purging rate can be enhanced.

In the exhaust emission control system of the internal combustion engine according to the present invention, the exhaust gas purifying element is composed of the $NO_x$ storage-reduction catalyst, and the lengths of the third and fourth exhaust passageways are set so that the distance from the internal combustion engine to the exhaust gas purifying element becomes different by switching over the flow direction switching device to the first or second position. The sweeper is provided at the second exhaust passageway, and the flow direction switching device can be switched over to a third position in which the first port can be connected to the second port. When *the exhaust gas temperature or* the temperature of the $NO_x$ storage-reduction catalyst is higher than a $NO_x$ absorbable temperature range of the $NO_x$ storage-reduction catalyst, the flow direction switching device is selectively switched over to the third position. In this case, the high-temperature exhaust gas can takes a short path from the first exhaust passageway to the second exhaust passageway without flowing though the $NO_x$ storage-reduction catalyst, thereby preventing the $NO_x$ storage-reduction catalyst from being deteriorated due to the high temperature.

In the exhaust emission control system of the internal combustion engine according to the present invention, a cooling device for cooling the exhaust gas is provided at either the third exhaust passageway or the fourth exhaust passageway, which increases the distance from the internal combustion engine to the $NO_x$ storage-reduction catalyst. In this case, the $NO_x$ storage-reduction catalyst can be held more surely within the temperature range suited to the $NO_x$ absorption by the $NO_x$ storage-reduction catalyst.

In the exhaust emission control system of the internal combustion engine according to the present invention, the exhaust gas purifying element is composed of the $NO_x$ storage-reduction catalyst, and the first exhaust passageway is provided with the $SO_x$ absorbing agent for absorbing $SO_x$ when the air/fuel ratio of the inflow exhaust gas is lean, and desorbs $SO_x$ absorbed thereto when a concentration of oxygen in the inflow exhaust gas decreases. The flow direction switching device can be switched over to the third position in which to connect the first port to the second port, and is selectively switched over to the third position when the internal combustion engine comes to a continuous stoichiometric ratio operation. In this case, even if the exhaust gas exhibiting the stoichiometric ratio flows into the $SO_x$ absorbing agent and $SO_x$ is desorbed from the $SO_x$ absorbing agent, it is possible to prevent $SO_x$ from flowing into the $NO_x$ storage-reduction catalyst and to prevent the $NO_x$ storage-reduction catalyst from suffering the $SO_x$ poisoning.

If the $SO_x$ absorbing agent and the $NO_x$ storage-reduction catalyst are concentrically disposed, the exhaust emission control system can be structured in a compact configuration.

In the exhaust emission control system of the internal combustion engine according to the present invention, the exhaust gas purifying element is composed of the $NO_x$ storage-reduction catalyst, and the first exhaust passageway is provided with a three-way catalyst exhibiting $SO_x$ absorbing power. The flow direction switching device can be switched over to the third position in which to connect the first port to the second port, and is selectively switched over to the third position when the internal combustion engine comes to a continuous stoichiometric ratio operation. In this case, even if the exhaust gas exhibiting the stoichiometric ratio flows into the three-way catalyst and $SO_x$ is desorbed from the three-way catalyst, it is possible to prevent $SO_x$ from flowing into the $NO_x$ storage-reduction catalyst and to prevent the $NO_x$ storage-reduction catalyst from suffering from the $SO_x$ poisoning.

In the exhaust emission control system of the internal combustion engine according to the present invention, the exhaust gas purifying element is composed of the catalyst, any one of the third and fourth exhaust passageways is provided with an HC adsorbing agent for adsorbing hydro carbon. The flow direction switching device is switched over to select a flow path on which the catalyst is positioned more upstream than the HC adsorbing agent when the temperature of the exhaust gas or of the HC adsorbing agent is in a temperature region where the HC adsorbing agent adsorbs the hydro carbon, and to select a flow path on which the HC adsorbing agent is positioned more upstream than the catalyst when the temperature of the exhaust gas or of the HC adsorbing agent is in a temperature region where the HC adsorbing agent desorbs the hydro carbon. In this case, HC can not be discharged even when the temperature of the exhaust gas is low.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

[1. An exhaust emission control system of an internal combustion engine, comprising:

exhaust gas purifying means provided in an exhaust passageway of said internal combustion engine;

flow direction switching means including four ports and provided at an exhaust passageway disposed more upstream than said exhaust gas purifying means;

a first exhaust passageway connected to said internal combustion engine and further to a first port of said flow direction switching means;

a second exhaust passageway communicating with the atmospheric air and further to a second port of said flow direction switching means;

a third exhaust passageway connected to one side of said exhaust gas purifying means and further to a third port of said flow direction switching means; and a fourth exhaust passageway connected to the other side of said exhaust gas purifying means and further to a fourth port of said flow direction switching means, wherein said flow direction switching means can be switched over to a first position for permitting the exhaust gas to flow in a direction through said exhaust gas purifying means by connecting the first port to the third port and connecting the second port to the fourth port, to a second position for permitting the exhaust gas to flow in a direction opposite to the first direction through said exhaust gas purifying means by connecting the first port to the fourth port and connecting the second port to the third port, and to a third position in which the first port is connectable to the second port.]

[2. An exhaust emission control system of an internal combustion engine according to claim 1, wherein said exhaust gas purifying means is an $NO_x$ storage-reduction catalyst for absorbing $NO_x$ when an air/fuel ratio of the inflow exhaust gas is lean, and desorbing $NO_x$ absorbed thereto when a concentration of oxygen in the inflow exhaust gas decreases.]

3. [An exhaust emission control system of an internal combustion engine according to claim 2,] *An exhaust emission control system of an internal combustion engine, comprising:*

*exhaust gas purifying means provided in an exhaust passageway of said internal combustion engine;*

*flow direction switching means including four ports and provided at an exhaust passageway disposed more upstream than said exhaust gas purifying means;*

*a first exhaust passageway connected to said internal combustion engine and further to a first port of said flow direction switching means;*

*a second exhaust passageway communicating with the atmospheric air and further to a second port of said flow direction switching means;*

*a third exhaust passageway connected to one side of said exhaust gas purifying means and further to a third port of said flow direction switching means; and*

*a fourth exhaust passageway connected to the other side of said exhaust gas purifying means and further to a fourth port of said flow direction switching means,*

*wherein said flow direction switching means is switched over to a first position for permitting the exhaust gas to flow in a first direction through said exhaust gas purifying means by connecting the first port to the third port and connecting the second port to the fourth port, to a second position for permitting the exhaust gas to flow in a direction opposite to the first direction through said exhaust gas purifying means by connecting the first port to the fourth port and connecting the second port to the third port, and to a third position in which the first port is connectable to the second port,*

*wherein said exhaust gas purifying means is an $NO_x$ storage-reduction catalyst for absorbing $NO_x$ when an air/fuel ratio of the inflow exhaust gas is lean, and desorbing $NO_x$ absorbed thereto when a concentration of oxygen in the inflow exhaust gas decreases,* wherein when in a $SO_x$ desorbing process of desorbing $SO_x$ absorbed to said $NO_x$ storage-reduction catalyst from said $NO_x$ storage-reduction catalyst, said flow direction switching means is switched over to the first position and the second position, thereby making a flow direction of the exhaust gas flowing through said $NO_x$ storage-reduction catalyst opposite to the direction when absorbing $NO_x$.

4. An exhaust emission control system of an internal combustion engine according to claim 3, wherein said exhaust gas purifying means composed of said $NO_x$ storage-reduction catalyst *is such that, a $NO_x$ storage-reduction catalyst disposed on inlet side in the flow direction of the exhaust gas when absorbing $NO_x$* exhibits higher $SO_x$ absorbing power than that of an $NO_x$ storage-reduction catalyst disposed on an outlet side in the flow direction of the exhaust gas when absorbing $NO_x$.

5. An exhaust emission control system of an internal combustion engine according to claim 3, further comprising heating means for heating a portion close to an inlet of said $NO_x$ storage-reduction catalyst in the flow direction of the exhaust gas when said $NO_x$ storage-reduction catalyst absorbs $NO_x$.

6. An exhaust emission control system of an internal combustion engine according to claim 3, wherein the switchover of said flow direction switching means when in the $SO_x$ desorbing process is executed when an exhaust gas temperature or a catalytic temperature of said $NO_x$ storage-reduction catalyst rises.

7. An exhaust emission control system of an internal combustion engine according to claim 3, wherein lengths of said third exhaust passageway and of said fourth exhaust passageway are set so that a distance from said internal combustion engine to said $NO_x$ storage-reduction catalyst is shorter *when in the $SO_x$ desorbing process than* when absorbing $NO_x$ [than when in the $SO_x$ desorbing process] by switching over said flow direction switching means to the first position or the second position.

[8. An exhaust emission control system of an internal combustion engine according to claim 2, wherein a sweeper is provided at said second exhaust passageway.]

9. [An exhaust emission control system of an internal combustion engine according to claim 8,] *An exhaust emission control system of an internal combustion engine, comprising:*

*exhaust gas purifying means provided in an exhaust passageway of said internal combustion engine;*

*flow direction switching means including four ports and provided at an exhaust passageway disposed more upstream than said exhaust gas purifying means;*

*a first exhaust passageway connected to said internal combustion engine and further to a first port of said flow direction switching means;*

*a second exhaust passageway communicating with the atmospheric air and further to a second port of said flow direction switching means;*

*a third exhaust passageway connected to one side of said exhaust gas purifying means and further to a third port of said flow direction switching means; and*

*a fourth exhaust passageway connected to the other side of said exhaust gas purifying means and further to a fourth port of said flow direction switching means,*

*wherein said flow direction switching means is switched over to a first position for permitting the exhaust gas to flow in a first direction through said exhaust gas purifying means by connecting the first port to the third port and connecting the second port to the fourth port, to a second position for permitting the exhaust gas to flow in a direction opposite to the first direction through said exhaust gas purifying means by connecting the first port to the fourth port and connecting the second port to the third port, and to a third position in which the first port is connectable to the second port,*

*wherein said exhaust gas purifying means is an $NO_x$ storage-reduction catalyst for absorbing $NO_x$ when an air/fuel ratio of the inflow exhaust gas is lean, and desorbing $NO_x$ absorbed thereto when a concentration of oxygen in the inflow exhaust gas decreases,*

*wherein a sweeper is provided at said second exhaust passageway, and* wherein said sweeper is a selective reduction type $NO_x$ catalyst for reducing or dissolving $NO_x$ under an existence of hydro carbon in an over-oxygen atmosphere.

10. [An exhaust emission control system of an internal combustion engine according to claim 8,] *An exhaust emission control system of an internal combustion engine, comprising:*

*exhaust gas purifying means provided in an exhaust passageway of said internal combustion engine;*

*flow direction switching means including four ports and provided at an exhaust passageway disposed more upstream than said exhaust gas purifying means;*

*a first exhaust passageway connected to said internal combustion engine and further to a first port of said flow direction switching means;*

*a second exhaust passageway communicating with the atmospheric air and further to a second port of said flow direction switching means;*

*a third exhaust passageway connected to one side of said exhaust gas purifying means and further to a third port of said flow direction switching means; and*

*a fourth exhaust passageway connected to the other side of said exhaust gas purifying means and further to a fourth port of said flow direction switching means,*

*wherein said flow direction switching means is switched over to a first position for permitting the exhaust gas to flow in a first direction through said exhaust gas purifying means by connecting the first port to the third port and connecting the second port to the fourth port, to a second position for permitting the exhaust gas to flow in a direction opposite to the first direction through said exhaust gas purifying means by connecting the first port to the fourth port and connecting the second port to the third port, and to a third position in which the first port is connectable to the second port,*

*wherein said exhaust gas purifying means is an $NO_x$ storage-reduction catalyst for absorbing $NO_x$ when an air/fuel ratio of the inflow exhaust gas is lean, and desorbing $NO_x$ absorbed thereto when a concentration of oxygen in the inflow exhaust gas decreases,*

*wherein a sweeper is provided at said second exhaust passageway,* wherein another catalyst is provided in said first exhaust passageway, and said flow direction switching means is switched over to the third position for connecting the first port to the second port for an initial predetermined time during the $SO_x$ desorbing process and, after the predetermined time has elapsed, switched over to make the flow direction of the exhaust gas flowing though said $NO_x$ storage-reduction catalyst opposite to the direction when absorbing $NO_x$.

11. [An exhaust emission control system of an internal combustion engine according to claim 8,] *An exhaust emission control system of an internal combustion engine, comprising:*

*exhaust gas purifying means provided in an exhaust passageway of said internal combustion engine;*

*flow direction switching means including four ports and provided at an exhaust passageway disposed more upstream than said exhaust gas purifying means;*

*a first exhaust passageway connected to said internal combustion engine and further to a first port of said flow direction switching means;*

*a second exhaust passageway communicating with the atmospheric air and further to a second port of said flow direction switching means;*

*a third exhaust passageway connected to one side of said exhaust gas purifying means and further to a third port of said flow direction switching means; and*

*a fourth exhaust passageway connected to the other side of said exhaust gas purifying means and further to a fourth port of said flow direction switching means,*

*wherein said flow direction switching means is switched over to a first position for permitting the exhaust gas to flow in a first direction through said exhaust gas purifying means by connecting the first port to the third port and connecting the second port to the fourth port, to a second position for permitting the exhaust gas to flow in a direction opposite to the first direction through said exhaust gas purifying means by connecting the first port to the fourth port and connecting the second port to the third port, and to a third position in which the first port is connectable to the second port,*

*wherein said exhaust gas purifying means is an $NO_x$ storage-reduction catalyst for absorbing $NO_x$ when an air/fuel ratio of the inflow exhaust gas is lean, and desorbing $NO_x$ absorbed thereto when a concentration of oxygen in the inflow exhaust gas decreases, and*

*wherein a sweeper is provided at said second exhaust passageway,* wherein said $NO_x$ storage-reduction catalyst and said sweeper are integrated into one unit so that the exhaust gas [can not] *cannot* flow therebetween and the heat [can be] *is* transmitted therebetween.

12. [An exhaust emission control system of an internal combustion engine according to claim 2,] *An exhaust emission control system of an internal combustion engine, comprising:*

*exhaust gas purifying means provided in an exhaust passageway of said internal combustion engine;*

*flow direction switching means including four ports and provided at an exhaust passageway disposed more upstream than said exhaust gas purifying means;*

*a first exhaust passageway connected to said internal combustion engine and further to a first port of said flow direction switching means;*

*a second exhaust passageway communicating with the atmospheric air and further to a second port of said flow direction switching means;*

*a third exhaust passageway connected to one side of said exhaust gas purifying means and further to a third port of said flow direction switching means; and*

*a fourth exhaust passageway connected to the other side of said exhaust gas purifying means and further to a fourth port of said flow direction switching means,*

*wherein said flow direction switching means is switched over to a first position for permitting the exhaust gas to flow in a first direction through said exhaust gas purifying means by connecting the first port to the third port and connecting the second port to the fourth port, to a second position for permitting the exhaust gas to flow in a direction opposite to the first direction through said exhaust gas purifying means by connecting the first port to the fourth port and connecting the second port to the third port, and to a third position in which the first port is connectable to the second port,*

*wherein said exhaust gas purifying means is an $NO_x$ storage-reduction catalyst for absorbing $NO_x$ when an air/fuel ratio of the inflow exhaust gas is lean, and desorbing $NO_x$ absorbed thereto when a concentration of oxygen in the inflow exhaust gas decreases,* wherein said first exhaust passageway is provided with a $SO_x$ absorbing agent for absorbing $SO_x$ when the air/fuel ratio of the inflow exhaust gas is lean, and desorbs $SO_x$ absorbed thereto when a concentration of oxygen in the inflow exhaust gas decreases, and said flow direction switching means [can be] *is* switched over to the third position in which to connect the first port to the second port, and is selectively switched over to the third position when said internal combustion engine comes to a continuous stoichiometric ratio operation.

13. An exhaust emission control system of an internal combustion engine according to claim 12, wherein said $SO_x$ absorbing agent and said $NO_x$ storage-reduction catalyst are concentrically disposed.

14. [An exhaust emission control system of an internal combustion engine according to claim 2,] *An exhaust emission control system of an internal combustion engine, comprising:*

*exhaust gas purifying means provided in an exhaust passageway of said internal combustion engine;*

*flow direction switching means including four ports and provided at an exhaust passageway disposed more upstream than said exhaust gas purifying means;*

*a first exhaust passageway connected to said internal combustion engine and further to a first port of said flow direction switching means;*

*a second exhaust passageway communicating with the atmospheric air and further to a second port of said flow direction switching means;*

*a third exhaust passageway connected to one side of said exhaust gas purifying means and further to a third port of said flow direction switching means; and*

*a fourth exhaust passageway connected to the other side of said exhaust gas purifying means and further to a fourth port of said flow direction switching means,*

*wherein said flow direction switching means is switched over to a first position for permitting the exhaust gas to flow in a first direction through said exhaust gas purifying means by connecting the first port to the third port and connecting the second port to the fourth port, to a second position for permitting the exhaust gas to flow in a direction opposite to the first direction through said exhaust gas purifying means by connecting the first port to the fourth port and connecting the second port to the third port, and to a third position in which the first port is connectable to the second port,*

*wherein said exhaust gas purifying means is an $NO_x$ storage-reduction catalyst for absorbing $NO_x$ when an air/fuel ratio of the inflow exhaust gas is lean, and desorbing $NO_x$ absorbed thereto when a concentration of oxygen in the inflow exhaust gas decreases,* wherein said first exhaust passageway is provided with a three-way catalyst exhibiting $SO_x$ absorbing power, and said flow direction switching means [can be] *is* switched over to the third position in which the first port is connectable to the second port, and is selectively switched over to the third position when said internal combustion engine comes to a continuous stoichiometric ratio operation.

[15. An exhaust emission control system of an internal combustion engine according to claim 1, wherein lengths of said third exhaust passageway and of said fourth exhaust passageway are set so that a distance from said internal combustion engine to said exhaust gas purifying means becomes different by switching over said flow direction switching means to the first position or the second position.]

16. An exhaust emission control system of an internal combustion engine according to claim 13, wherein the switch-over of said flow direction switching means is executed based on an exhaust gas temperature or a temperature of said exhaust gas purifying means.

17. An exhaust emission control system of an internal combustion engine according to claim 16, wherein said exhaust gas purifying means is an $NO_x$ storage-reduction catalyst for absorbing $NO_x$ when an air/fuel ratio of the inflow exhaust gas is lean, and desorbing $NO_x$ absorbed thereto when a concentration of oxygen in the inflow exhaust gas decreases.

18. An exhaust emission control system of an internal combustion engine according to claim 17, wherein said flow direction switching means is switched over by selecting a flow path having a shorter distance from said internal combustion engine to said $NO_x$ storage-reduction catalyst when in the $SO_x$ desorbing process of desorbing $SO_x$ desorbed to said $NO_x$ storage-reduction catalyst from said $NO_x$ storage-reduction catalyst.

19. An exhaust emission control system of an internal combustion engine according to claim 17, wherein said flow direction switching means is switched over by selecting a flow path having a longer distance from said internal combustion engine to said $NO_x$ storage-reduction catalyst when said $NO_x$ storage-reduction catalyst absorbs $NO_x$ and when the exhaust gas temperature or the catalytic temperature of said $NO_x$ storage-reduction catalyst is over a predetermined temperature, and selecting a flow path having a shorter distance from said internal combustion engine to said $NO_x$ storage-reduction catalyst when said $NO_x$ storage-reduction catalyst absorbs $NO_x$ and when the exhaust gas temperature or the catalytic temperature is lower than the predetermined temperature.

20. An exhaust emission control system of an internal combustion engine according to claim 17, wherein a cooling device for cooling the exhaust gas is provided at either said third exhaust passageway or said fourth exhaust passageway, which increases the distance from said internal combustion engine to said $NO_x$ storage-reduction catalyst.

21. An exhaust emission control system of an internal combustion engine according to claim 17, wherein a sweeper is provided at said second exhaust passageway, and said flow direction switching means [can be] *is* switched over to a third position in which the first port can be connected to the second port, when *the exhaust gas temperature or* the catalytic temperature of said $NO_x$ storage-reduction catalyst is higher than a $NO_x$ absorbable temperature range of said $NO_x$ storage-reduction catalyst, said flow direction switching means is selectively switched over to the third position.

[22. An exhaust emission control system of an internal combustion engine according to claim 1, wherein said exhaust gas purifying means is a catalyst, any one of said third exhaust passageway and of said fourth exhaust passageway is provided with an HC adsorbing agent for adsorbing hydro carbon, and said flow direction switching means is switched over to select a flow path on which said catalyst is positioned more upstream than said HC adsorbing agent when the temperature of the exhaust gas or of said HC adsorbing agent is in a temperature region where said HC adsorbing agent adsorbs the hydro carbon, and to select a flow path on which said HC adsorbing agent is positioned more upstream than said catalyst when the temperature of the exhaust gas or of said HC adsorbing agent is in a temperature region where said HC adsorbing agent desorbs the hydro carbon.]

* * * * *